(12) United States Patent
Firey

(10) Patent No.: US 8,387,570 B2
(45) Date of Patent: Mar. 5, 2013

(54) COKE BURNING ENGINE

(76) Inventor: Joseph Carl Firey, Seattle, WA (US)

( * ) Notice: Subject to any disclaimer, the term of this patent is extended or adjusted under 35 U.S.C. 154(b) by 1087 days.

(21) Appl. No.: 12/316,571

(22) Filed: Dec. 15, 2008

(65) Prior Publication Data
US 2010/0147233 A1 Jun. 17, 2010

(51) Int. Cl.
F02B 43/08 (2006.01)
F02B 45/00 (2006.01)
(52) U.S. Cl. .............................. 123/23; 123/3
(58) Field of Classification Search ................ 123/3, 23; 60/39.12
See application file for complete search history.

(56) References Cited

U.S. PATENT DOCUMENTS

| 4,653,436 | A | * | 3/1987 | Firey | 123/23 |
| 5,485,812 | A | * | 1/1996 | Firey | 123/23 |
| 5,613,626 | A | * | 3/1997 | Firey | 222/217 |
| 5,899,195 | A | * | 5/1999 | Firey | 123/531 |
| 7,334,390 | B2 | * | 2/2008 | Firey | 60/39.12 |
| 2011/0108404 | A1 | * | 5/2011 | Firey | 202/84 |

* cited by examiner

Primary Examiner — Lindsay Low
Assistant Examiner — Tea Holbrook

(57) ABSTRACT

A coke burning engine is described wherein hot coke fuel chunks are first compressed with air and reacted therewith to form a carbon monoxide rich gas, during a compression cycle time period. Next these primary reacted gases are mixed into and burned with secondary air during a blowdown cycle time period. These fully reacted gases are expanded though an expander engine whose power output drives the air compressor, and yields a net useful engine power output.

15 Claims, 36 Drawing Sheets

FIGURE 19 CBU 1

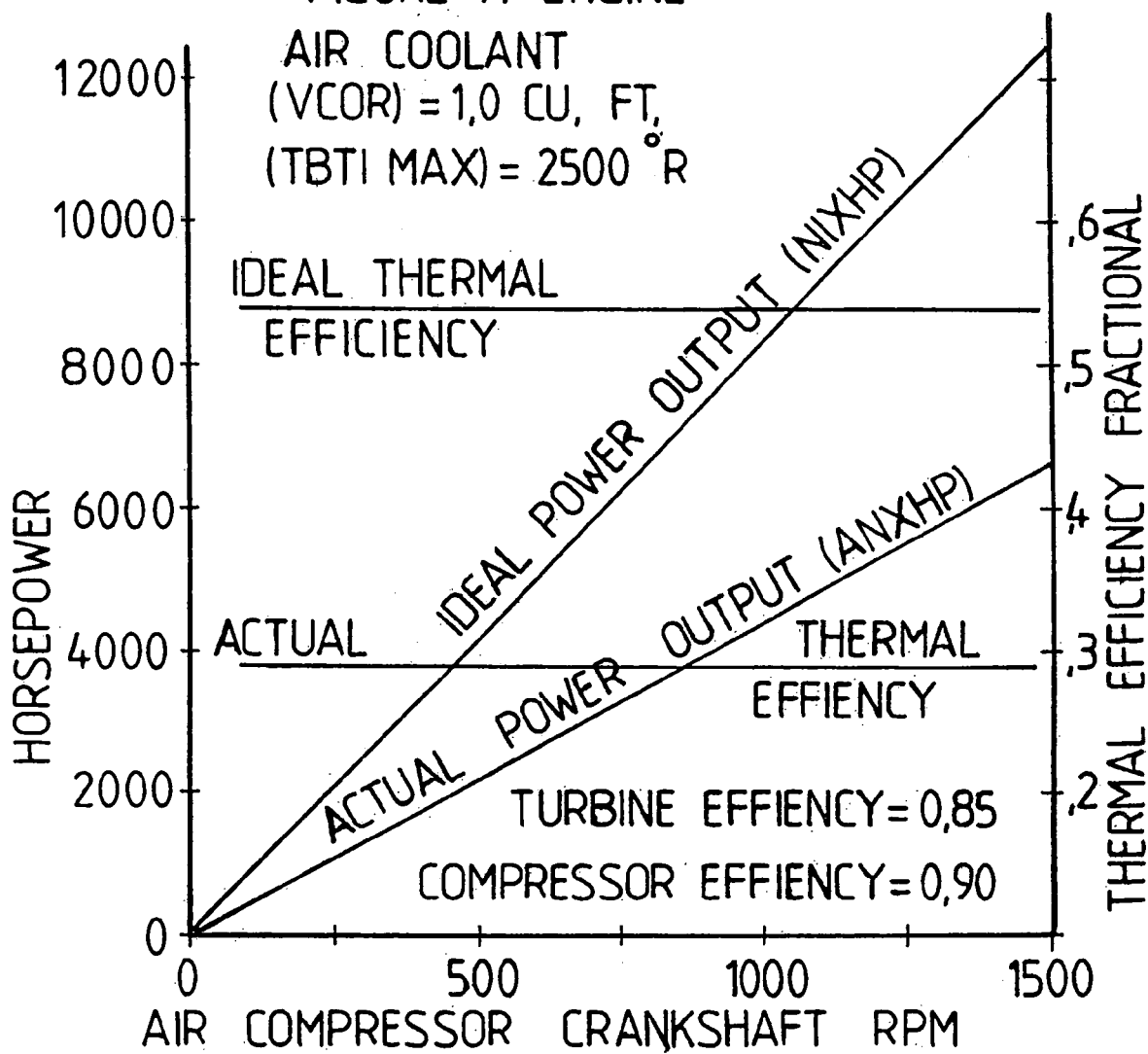

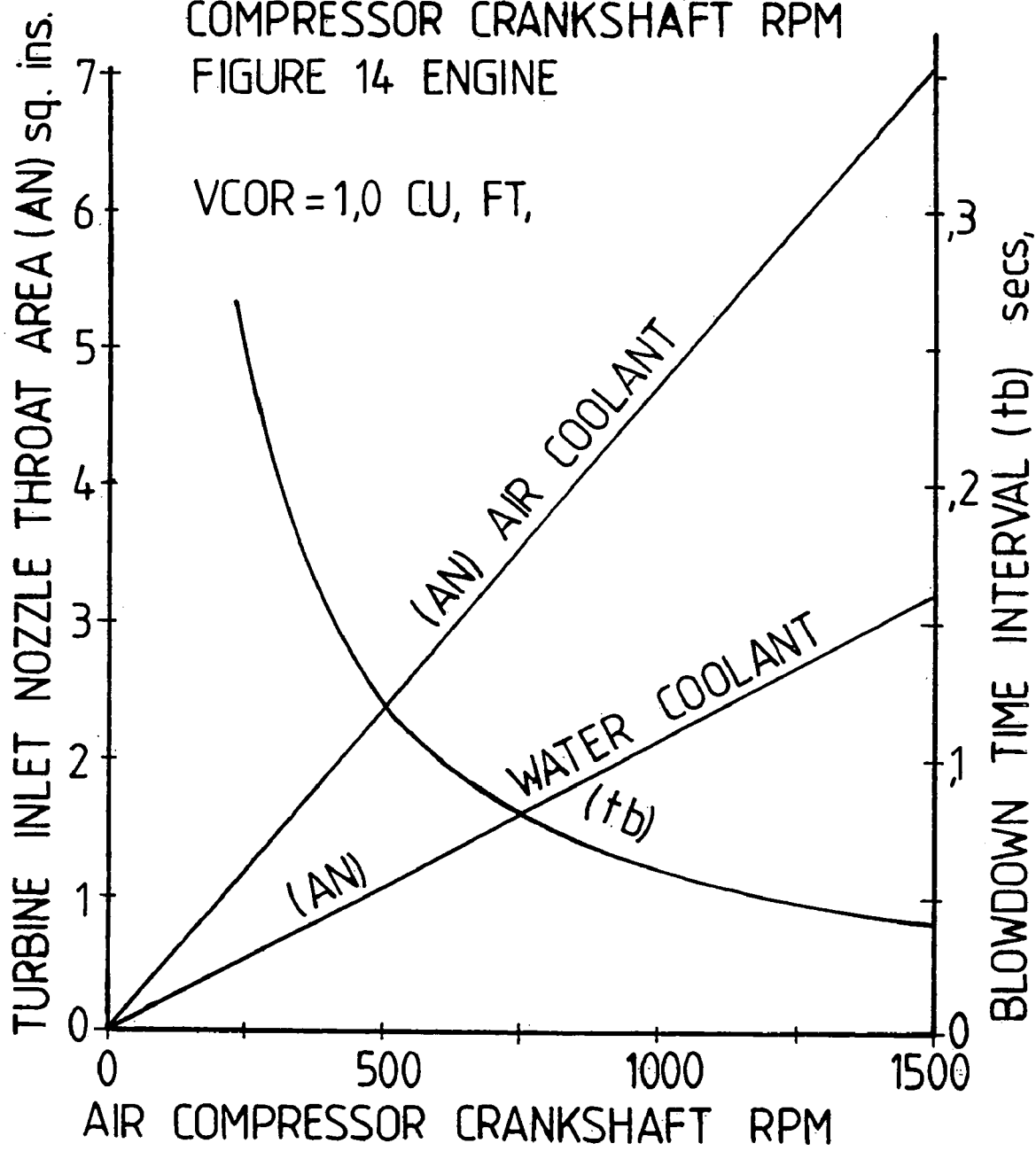

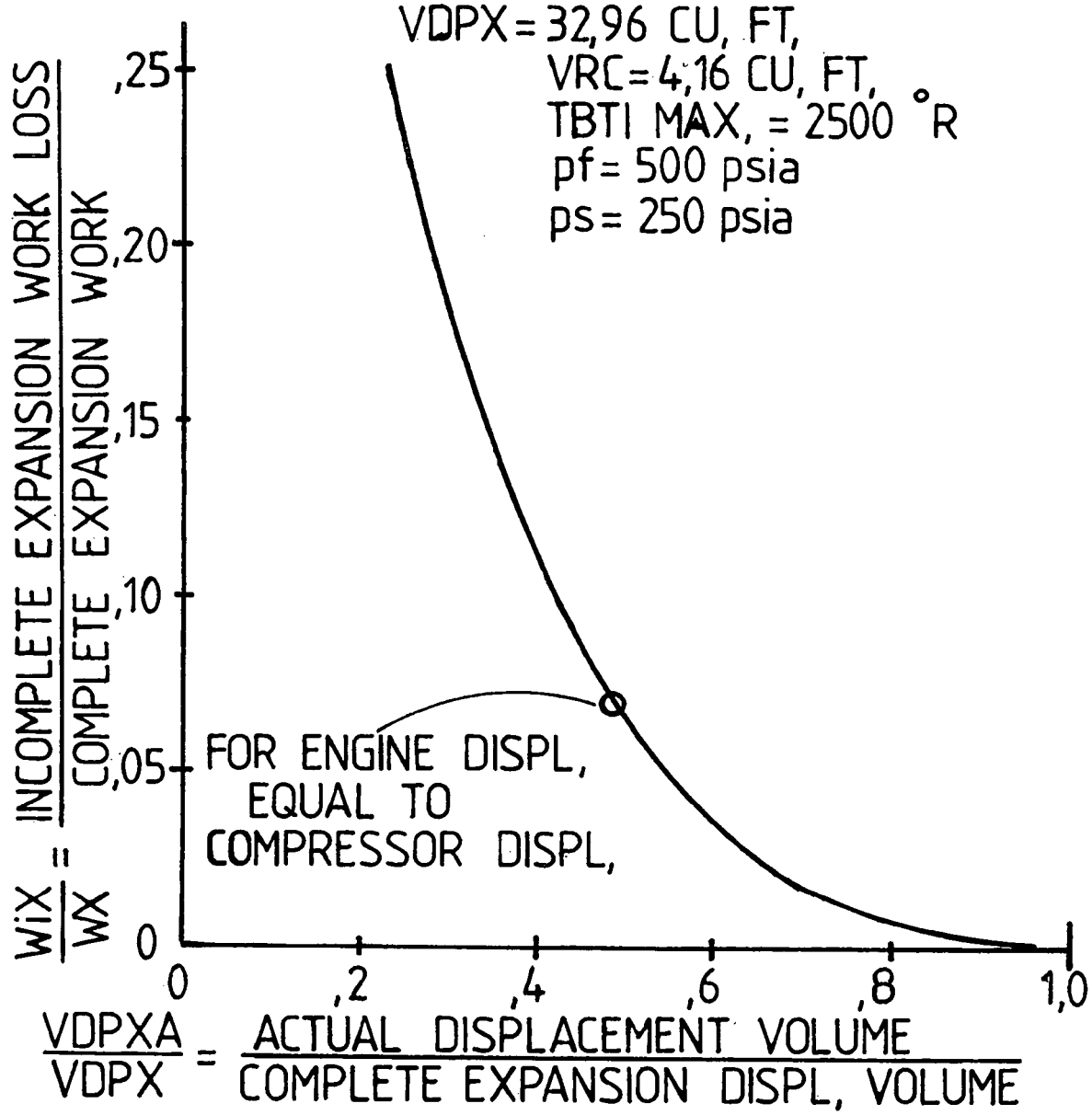

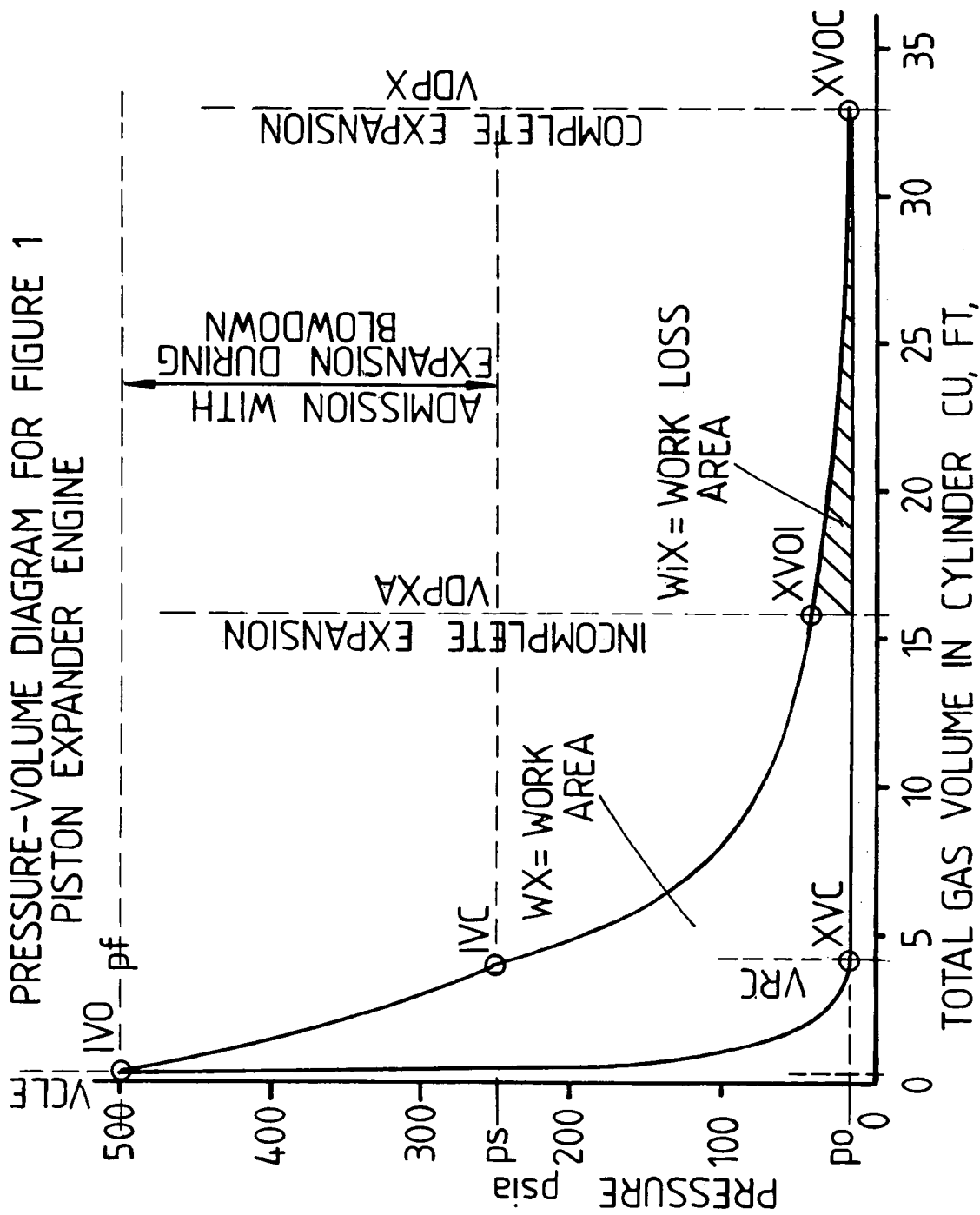

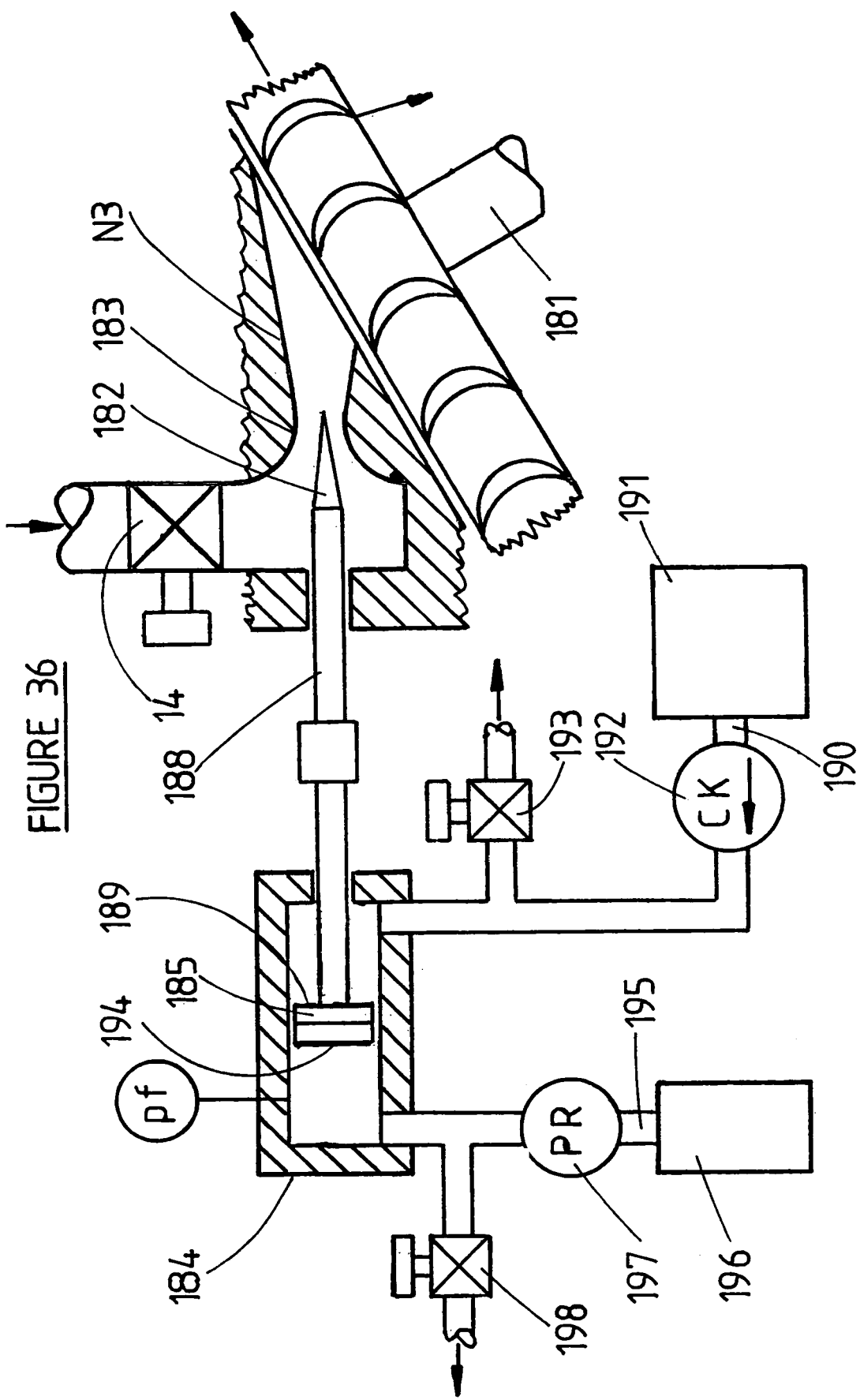

US 8,387,570 B2

COKE BURNING ENGINE

CROSS REFERENCE TO RELATED APPLICATIONS

Refuel and ash removal mechanisms, suitable for use with coke burning engines of this invention, are described in the following US Patents:
(1) U.S. Pat. No. 4,653,436; Firey, 31 Mar. 1987
(2) U.S. Pat. No. 5,485,812; Firey, 23 Jan. 1996
(3) U.S. Pat. No. 5,613,626; Firey, 25 Mar. 1997

The coal reactor, described in the following U.S. Patent, can be used to produce a porous coke fuel, suitable for use in a coke burning engine, as well as to produce a partially oxidized volatile matter product, suitable for further reacting into liquid fuels, from bituminous coal.
(4) U.S. Pat. No. 7,334,390; Firey, 26 Feb. 2008

BACKGROUND OF THE INVENTION

National concern about our heavy dependence on energy supplies from unreliable overseas sources has generated widespread interest in alternative energy supplies from domestic sources. Coal is our principal domestic energy source, and is being more widely utilized in stationary energy plants, such as for electric power generation. But efforts to use coal as an energy source for our critical transportation industry have been disappointing.

In a coal fired steam electric plant, the coal combustion products do not pass though the power generating steam turbine. But in the internal combustion engines, used for transportation power, the fuel combustion products are the working fluid inside the power producing engine, whether piston engine or gas turbine engine, and the combustion products from coal, such as ashes, create engine wear problems. Railroad diesel engines operated on slurry fuels of finely divided coal particles, suspended in water, ran satisfactorily, but experienced increased ring and liner wear, and severe fuel injection nozzle wear. These extensive experiments are summarized in the referenced, "Coal Fueled Diesel Engines," 1993, J. Caton and H. Webb, ASME Publication ICE-Vol 19. The piston engine described in U.S. Pat. No. 4,412,511, Firey, 1983, sought to avoid these ash wear problems by burning the coal as chunks, in a separate combustion chamber, from which the ashes were separately removed, thus avoiding ash contact with the engine pistons and cylinders. To secure sufficient coal chunk surface area, for adequate coal burning rate, a large coal combustion chamber was required. The consequent low engine compression ratio created a low fuel efficiency.

United States coal reserves are very large, having approximately ten times the energy content of worldwide petroleum reserves. Indeed, worldwide coal reserves have approximately thirty times the energy content of worldwide petrol reserves. Clearly our national effort to achieve energy independence would be greatly facilitated if internal combustion engines were available, for our transportation industry, which could operate on coal or coal derived fuel.

SUMMARY OF THE INVENTION

Coke fuel chunks are burned, in coke burning engines of this invention, by compressing air into the coke pore spaces, in a primary reactor, during each compression cycle time interval, where the large surface area causes rapid reaction to primary reacted gas rich in carbon monoxide. During a following blowdown cycle time interval these primary reacted gases are mixed with additional secondary compressed air, and reacted to fully reacted carbon dioxide in a secondary reactor. These fully reacted gases are mixed with coolant compressed air, or water and then flow into an expander engine, during each blowdown cycle time interval, to produce a power output, a portion of which is used to drive the air compressor, the remainder being a useful engine power output from this coke burning engine. Each compression cycle time interval is followed by a blowdown cycle time interval. Coke ashes are removed from the primary reactor and do not pass into the expander engine or air compressor, thus avoiding ash particle engine wear problems. In this way, coke fuel, derived from our plentiful and low cost coal resources, can be used to energize our critical transportation industry, by use of coke burning engines of this invention.

The expander engine can be of the piston, cylinder and crank type or of the turbine nozzle and rotating blade type.

BRIEF DESCRIPTION OF THE DRAWINGS

An example coke burning engine is shown schematically in FIG. 1, and comprises an air compression unit, 2, for compressing air into two two step coke burning units, 3, 4, during a compression cycle time interval. During a following blowdown cycle time interval the reacted gases formed in the coke burning units are expanded through the piston and cylinder expander engines, 5,6, one at a time, to generate power for driving the air compression means, 2, plus a net useful power output.

The relative timing of compression cycles, and blowdown cycles, for the two two step coke burning units of FIG. 1 are shown in FIG. 2, together with the expansion and exhaust steps of the two piston expander engines, relative to the two piston and cylinder air compressors of the air compression unit. Cycle timing cams for us on the FIG. 1 two step coke burning units are illustrated on FIG. 3 and FIG. 4.

Figure 5:
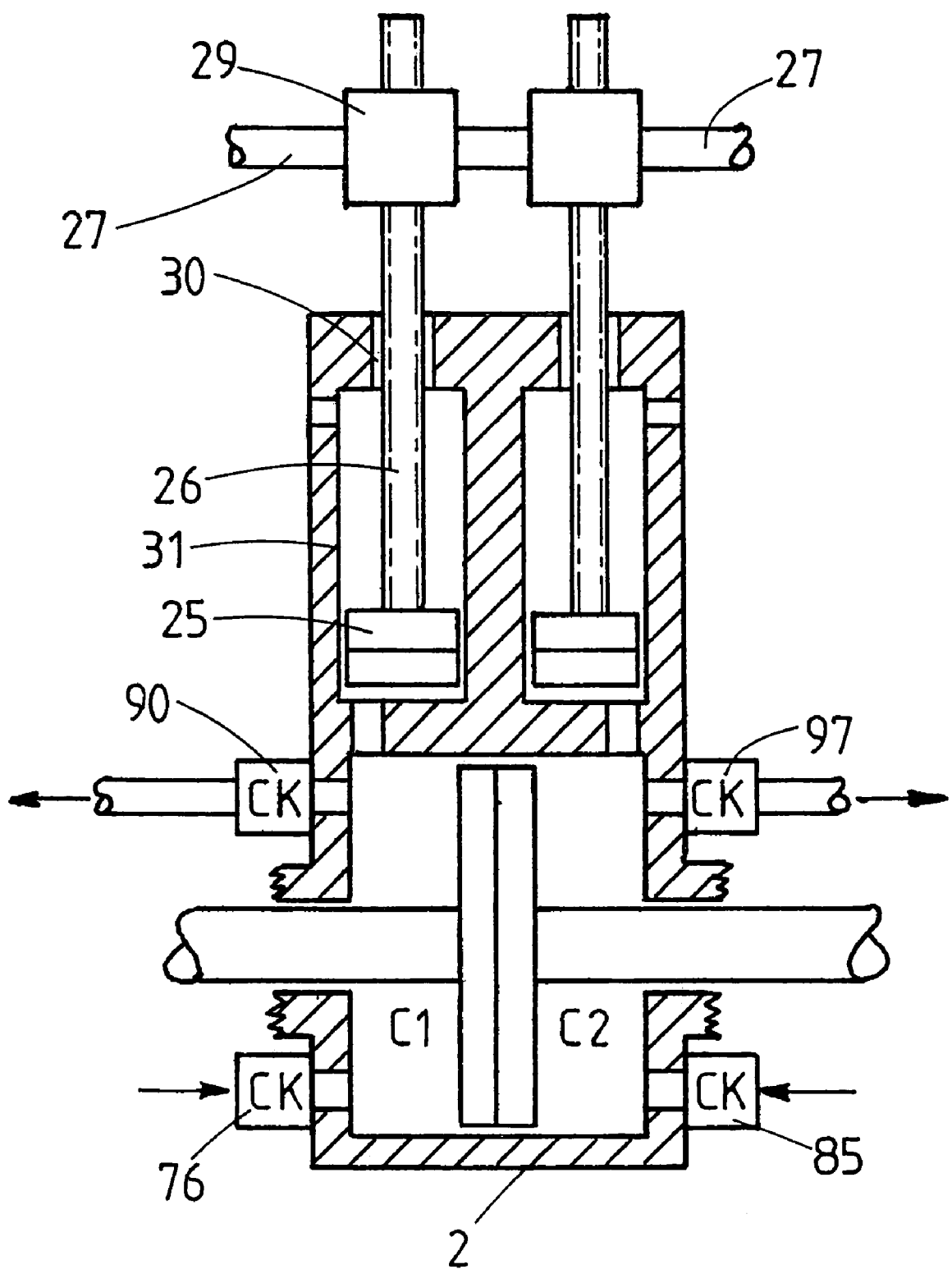
Figure 6:
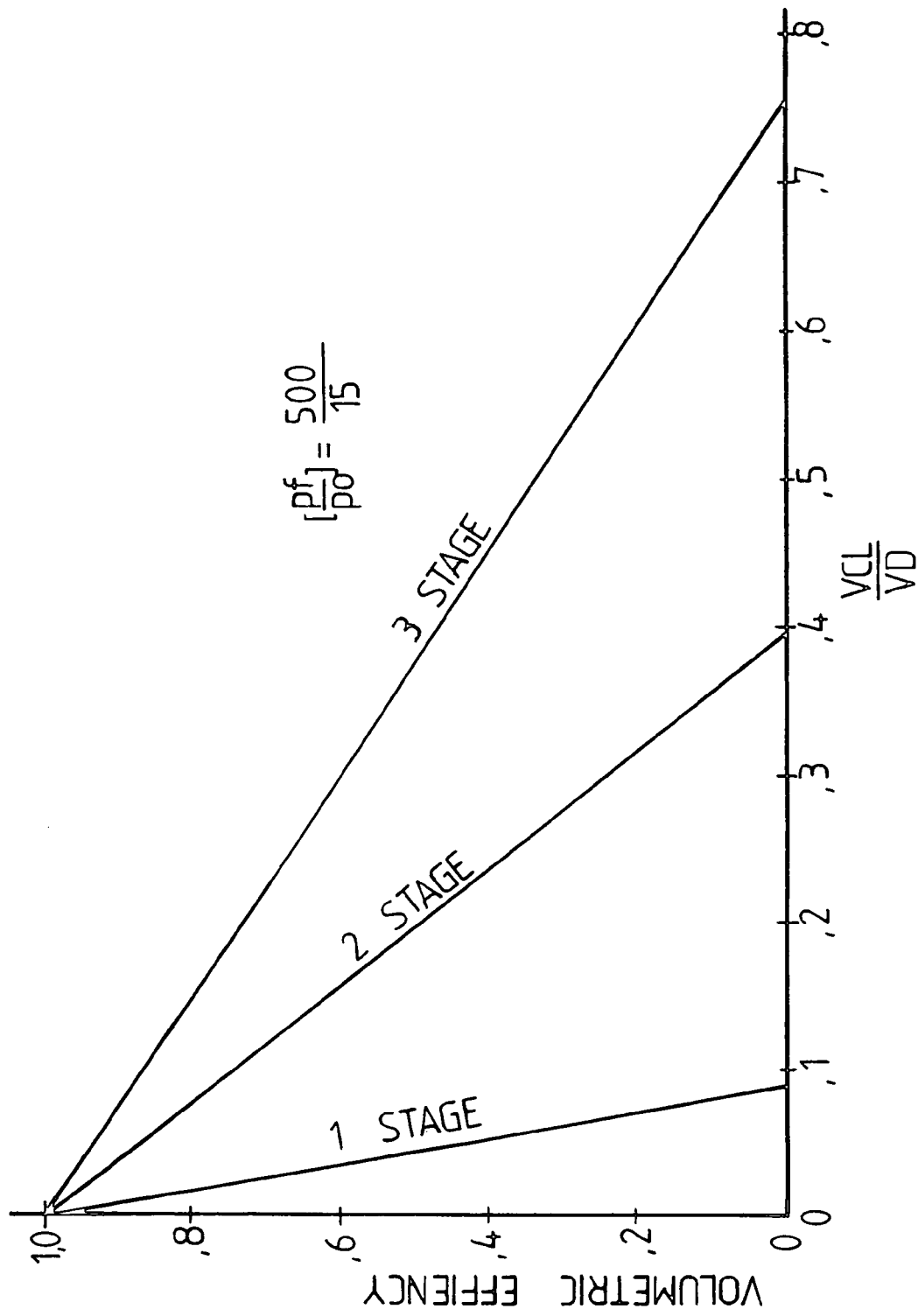

Apparatus for adjusting the volumetric efficiency of piston and cylinder air compressors is illustrated on FIG. 5 and FIG. 6.

Figure 7:
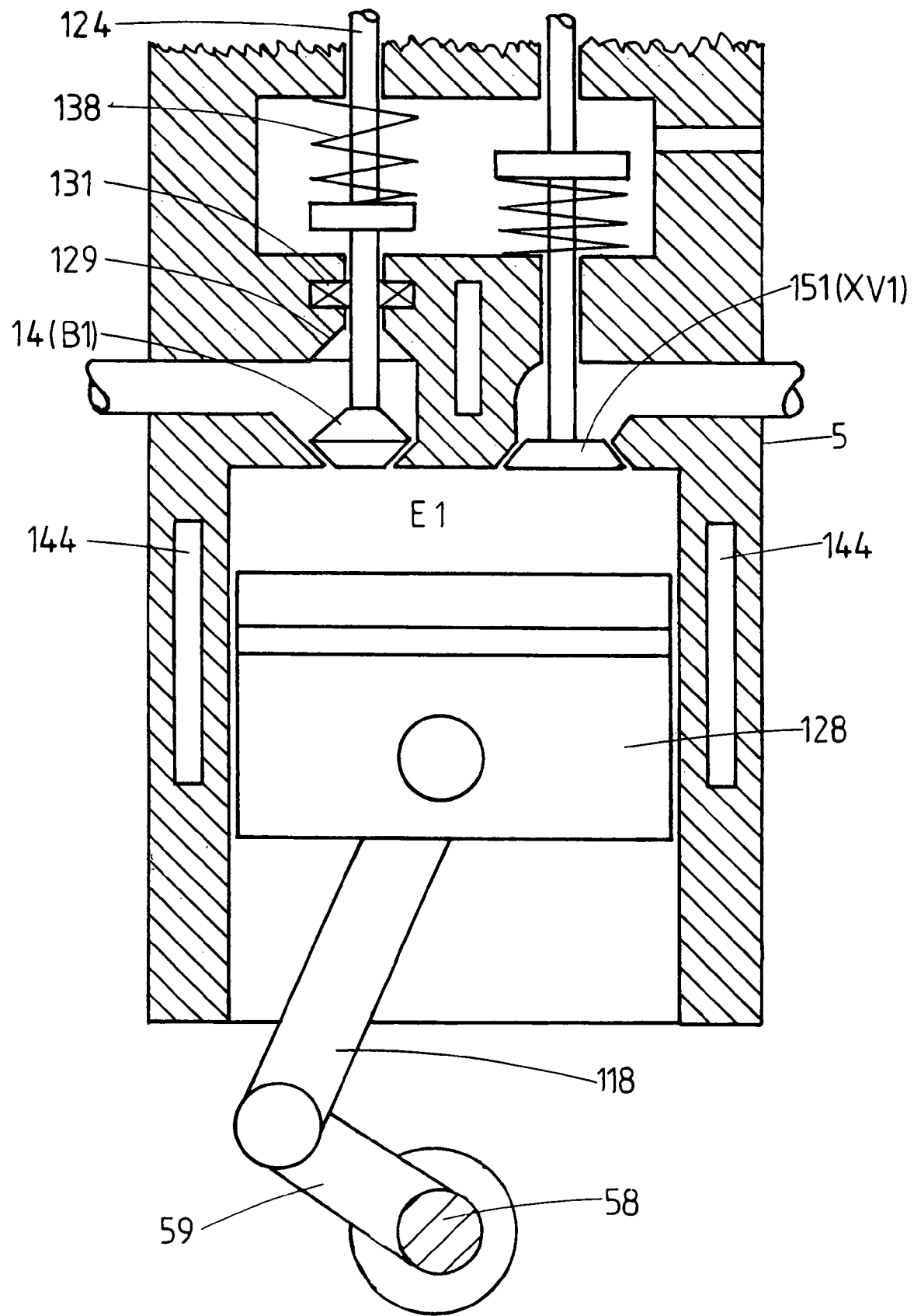
Figure 8:
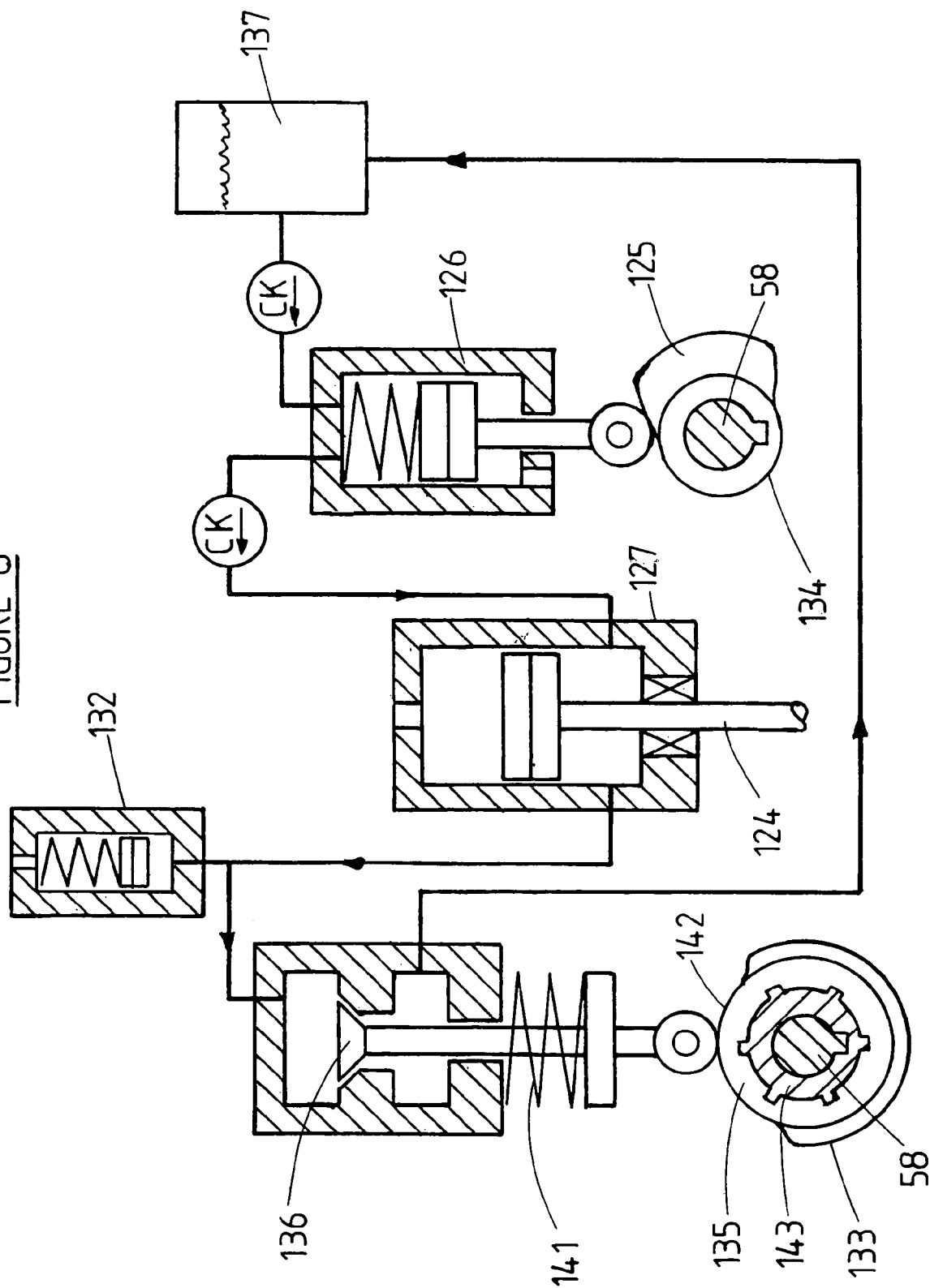

Details of a piston expander engine are illustrated on FIG. 7. An example apparatus for adjustably closing the expander inlet valve is shown in FIG. 8.

Figure 9:
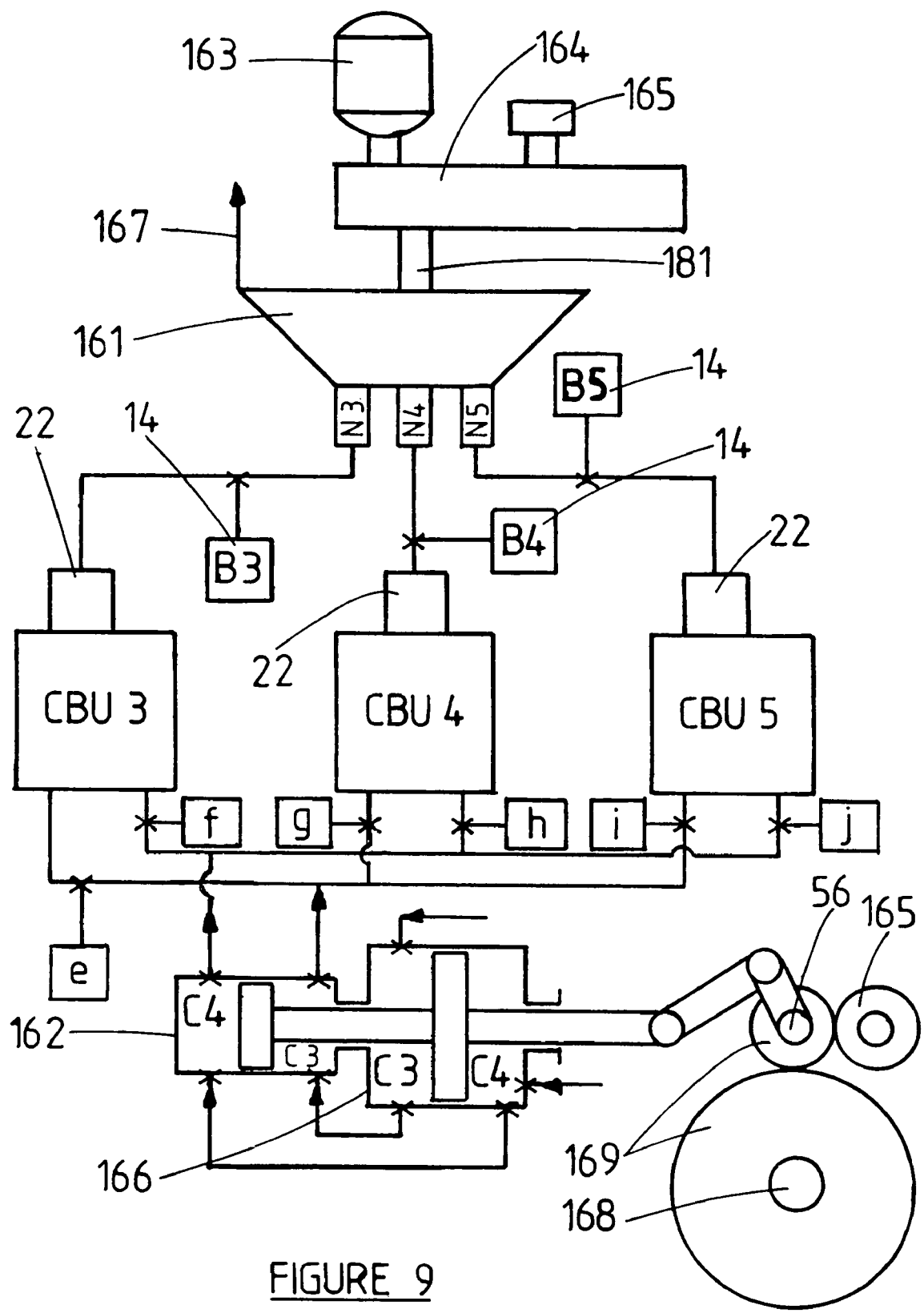
Figure 10:
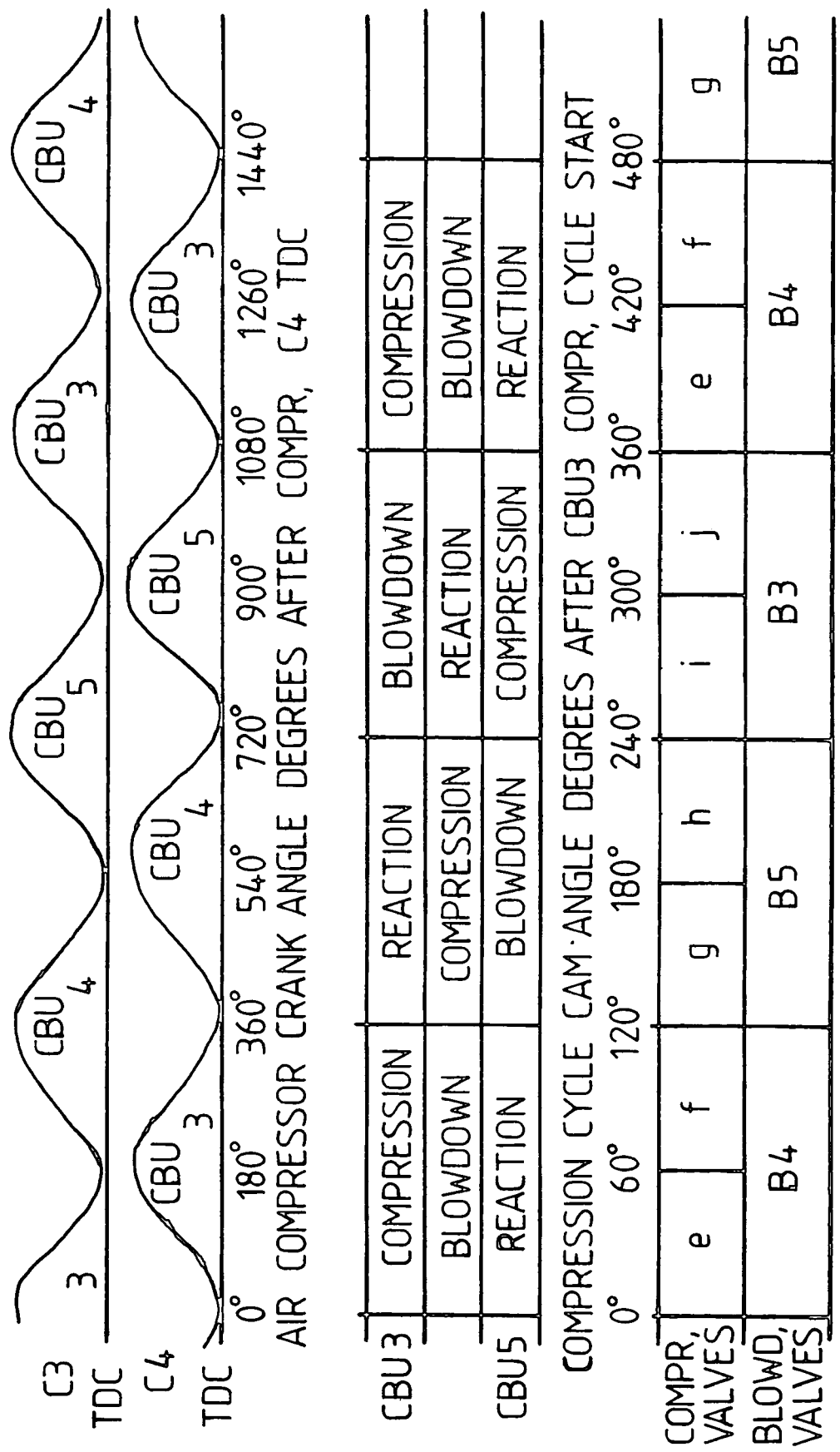
Figure 11:
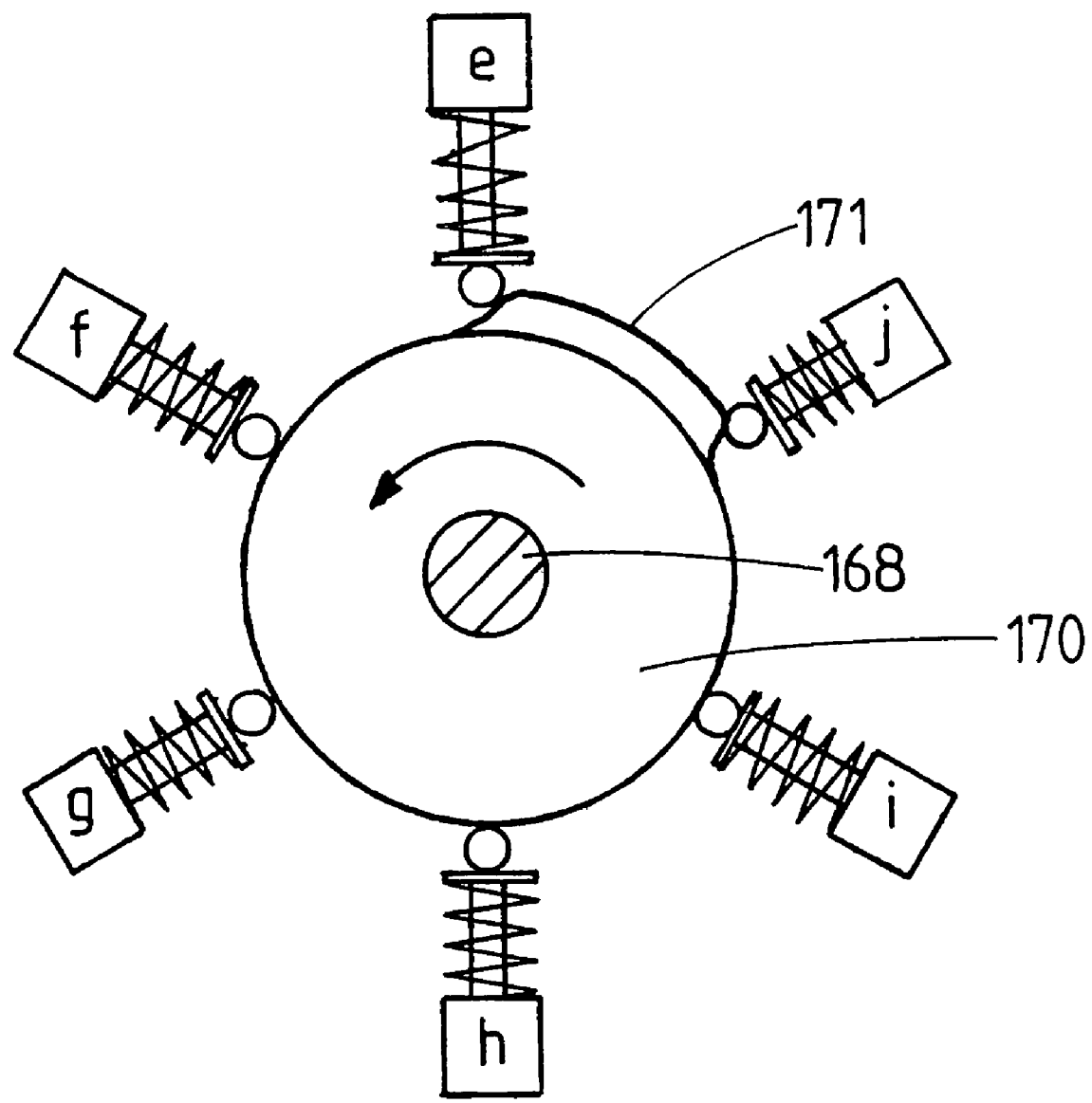
Figure 12:
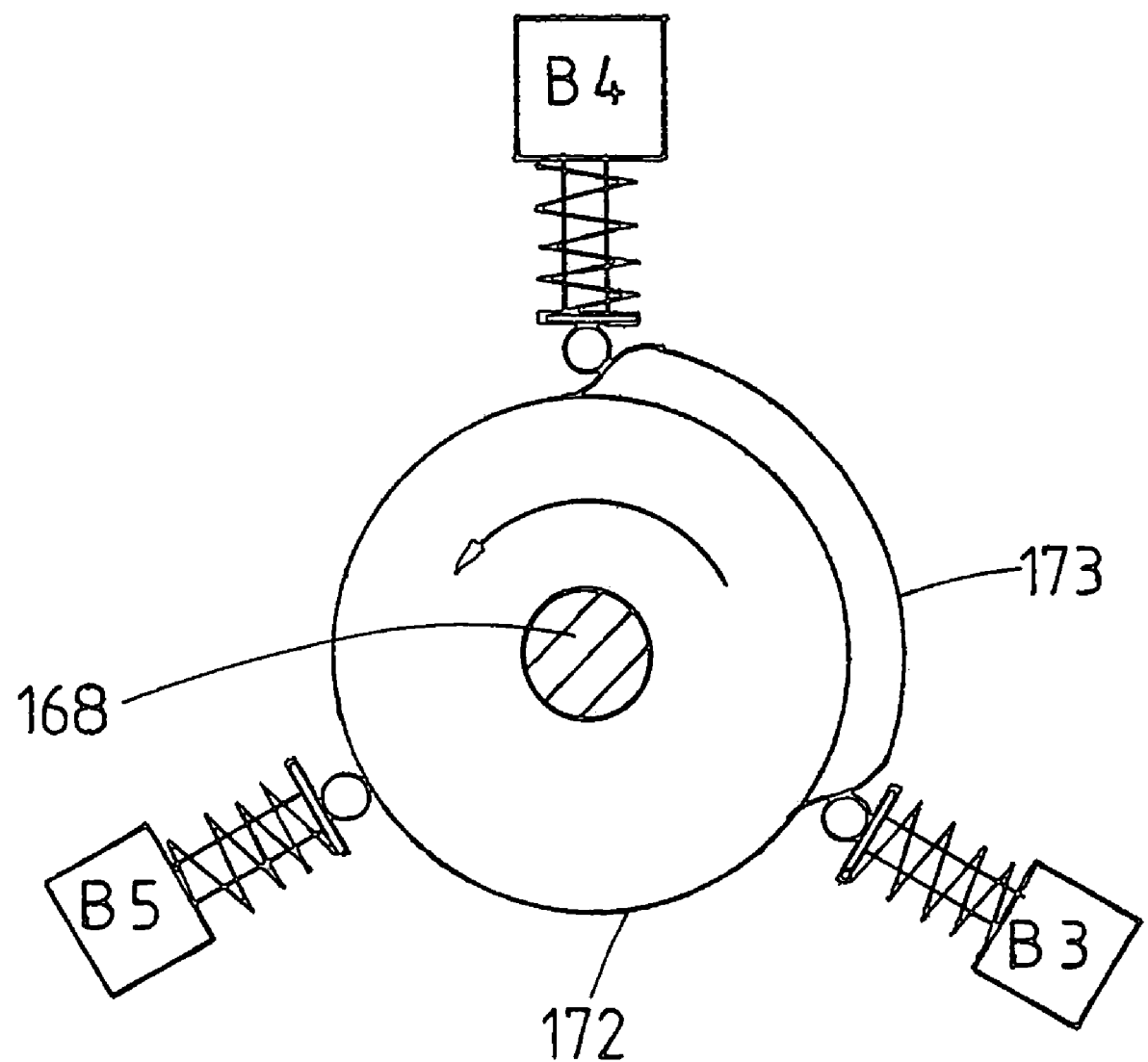

Another example coke burning engine is shown in FIG. 9 wherein the expander engine is a turbine expander engine. The timing of compression cycles and blowdown cycles, for this FIG. 9 coke burning engine, is illustrated on FIG. 10, with the timer cams shown on FIG. 11 and FIG. 12.

Figure 13:
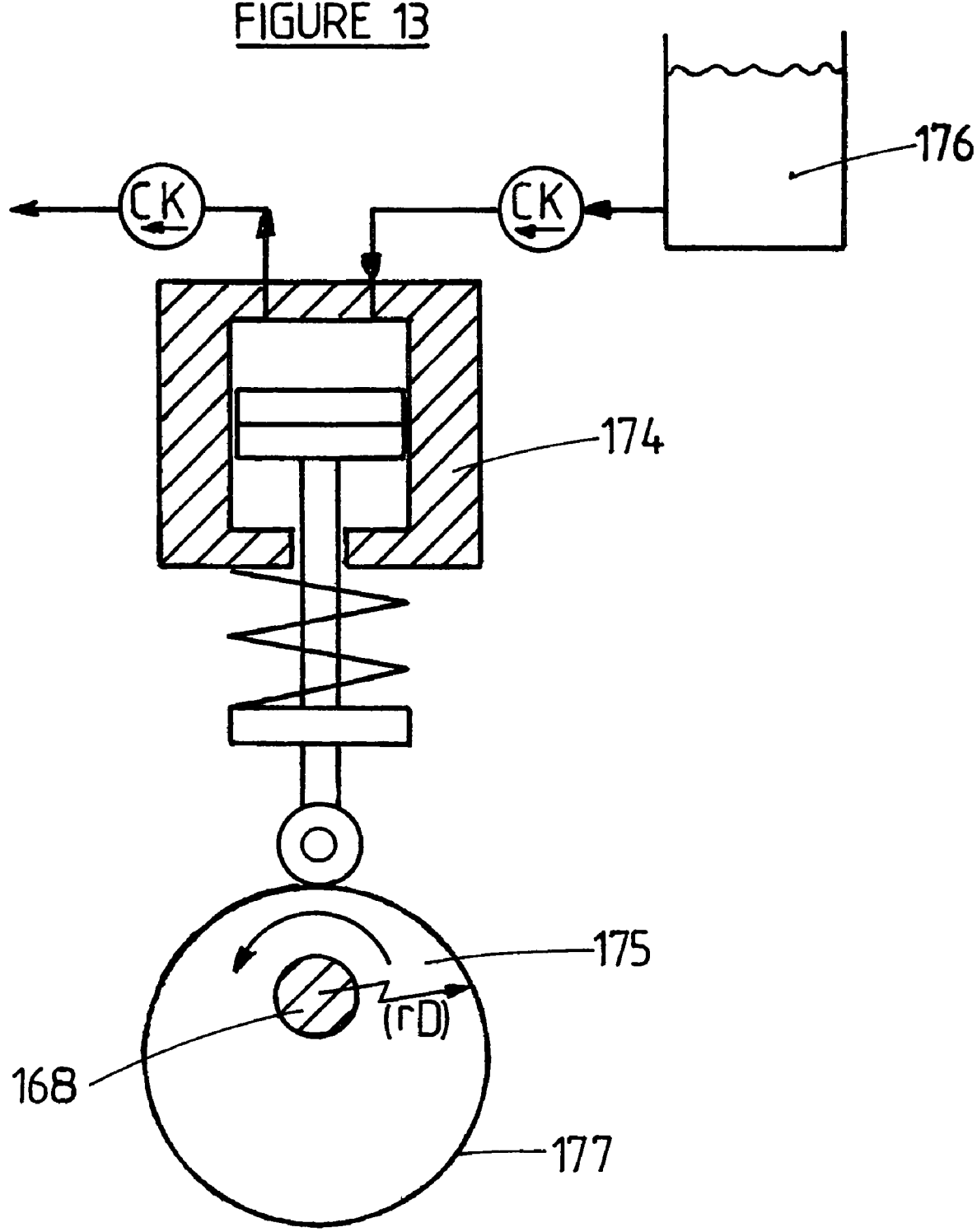

An example cam driven pump for supplying cooling water into the fully reacted gases prior to entry into the expander engine is illustrated in FIG. 13.

Figure 14:
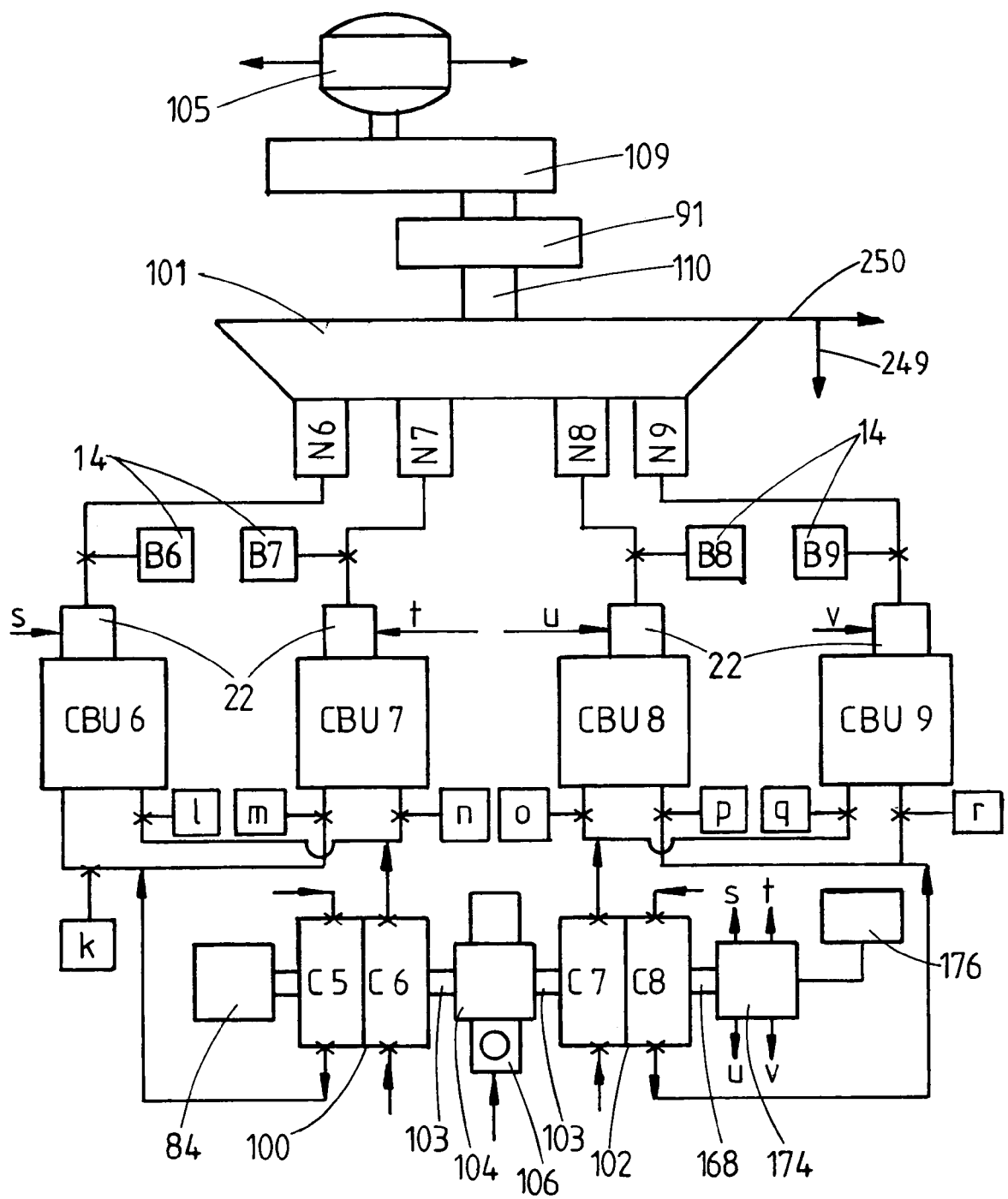
Figure 15:
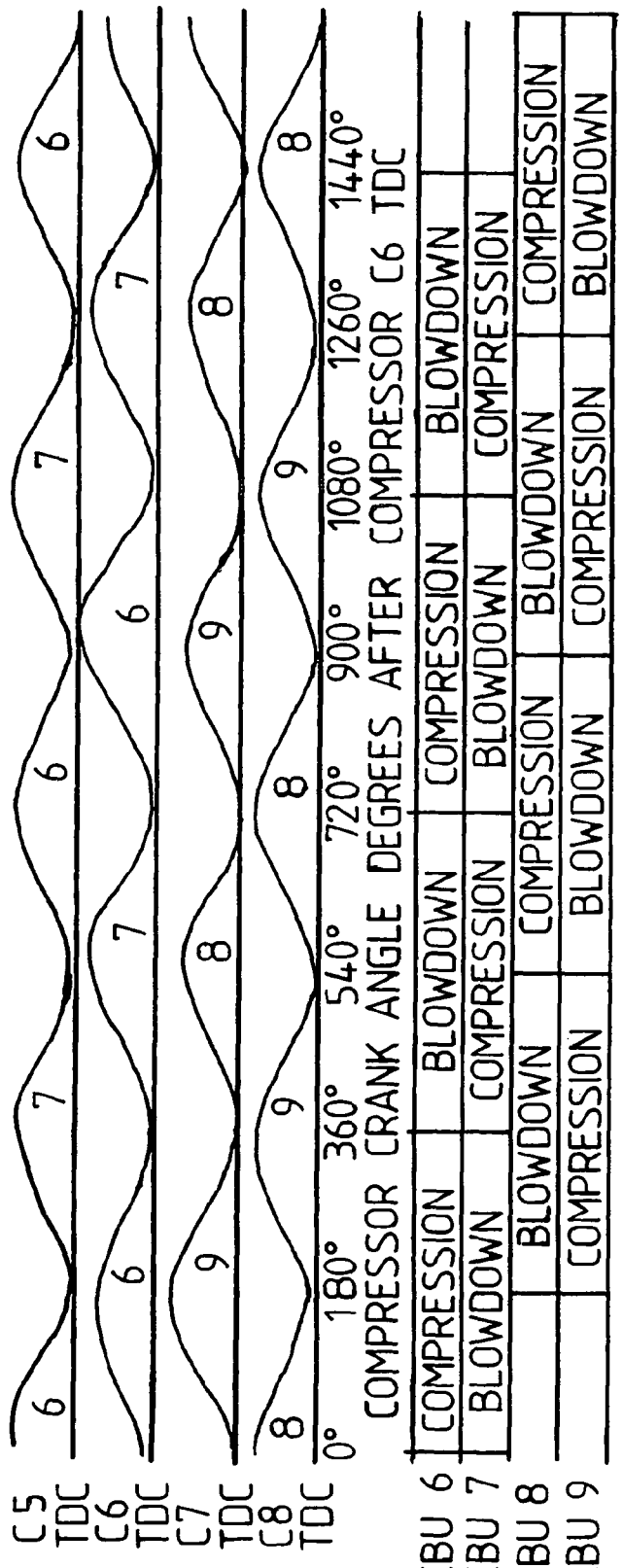
Figure 16:
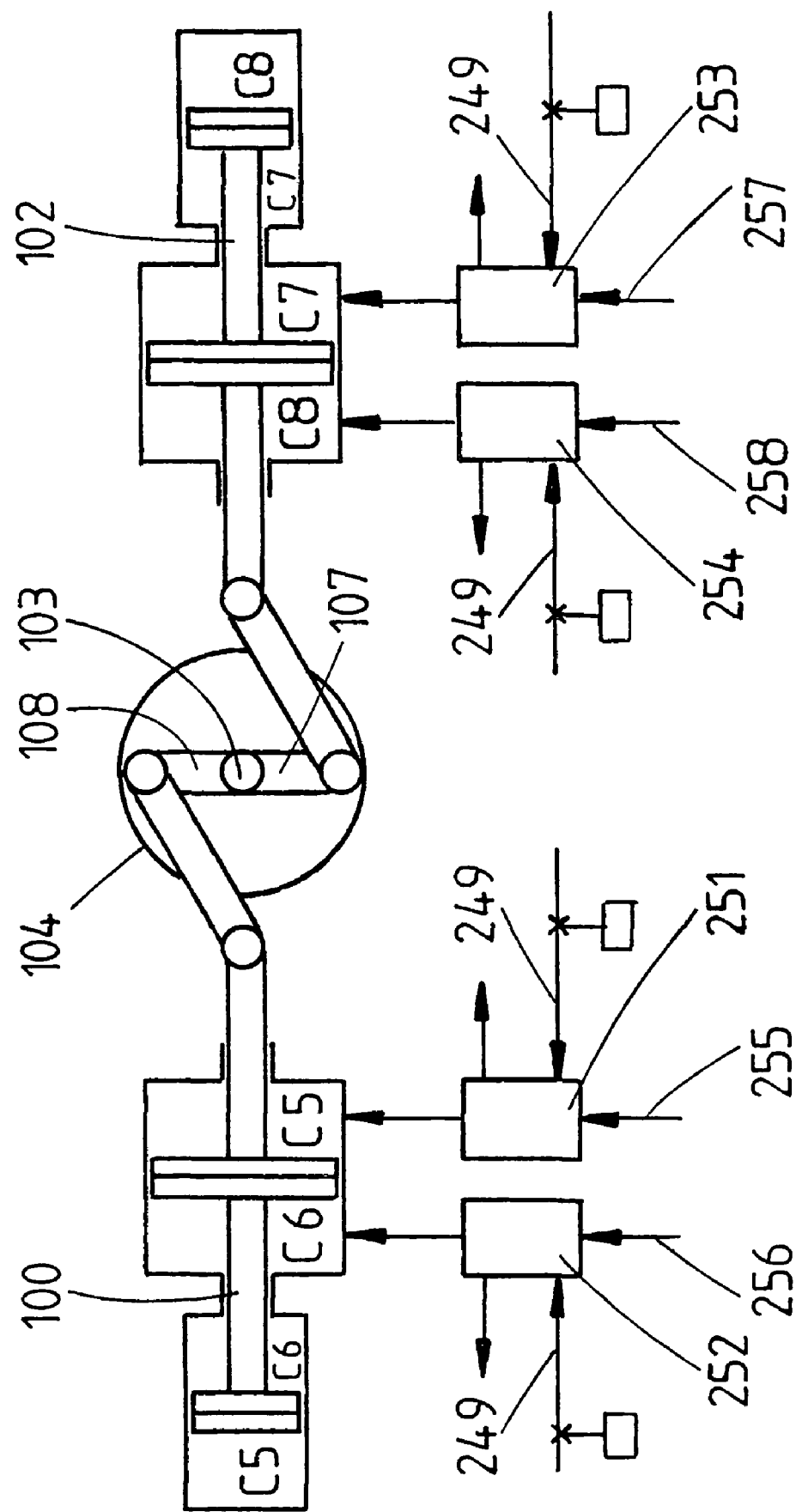

The turbine expander engine of the FIG. 14 coke burning engine drives an electric generator, a portion of whose power output is used to operate a variable speed electric motor to drive the air compressors. FIG. 15 illustrates the cycle timing of the FIG. 14 coke burning engine. FIG. 16 shows details of an air compression unit for the FIG. 14 example coke burning engine.

Figure 17:
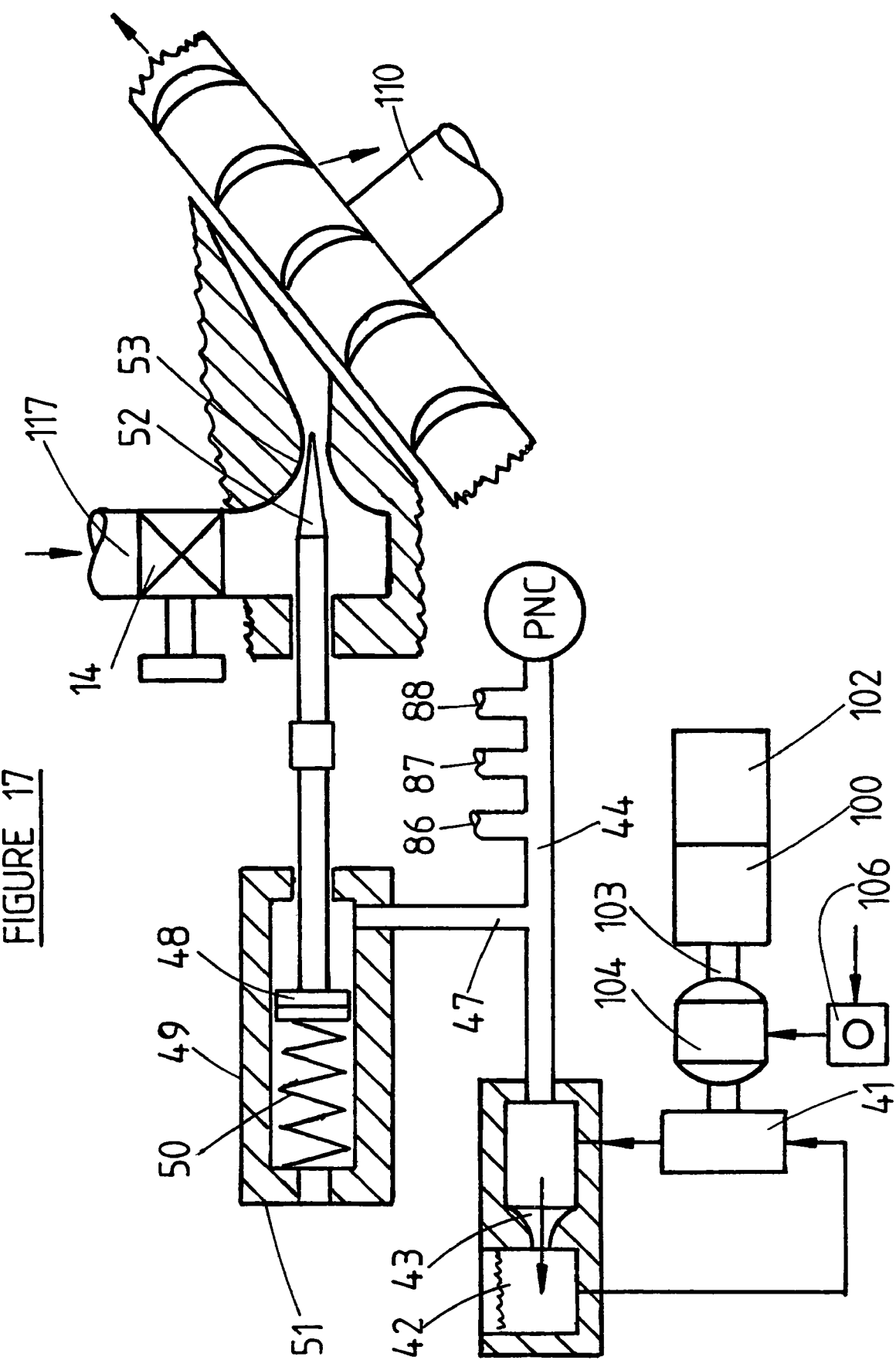

Apparatus for adjusting the throat area of the turbine inlet nozzle, in proportion to the RPM of the air compression unit crankshaft, is shown schematically in FIG. 17, suitable for use with the FIG. 14 form of coke burning engine. This preferred variation of turbine inlet nozzle throat area with air compressor crankshaft RPM is shown graphically on FIG. 33.

Figure 18:
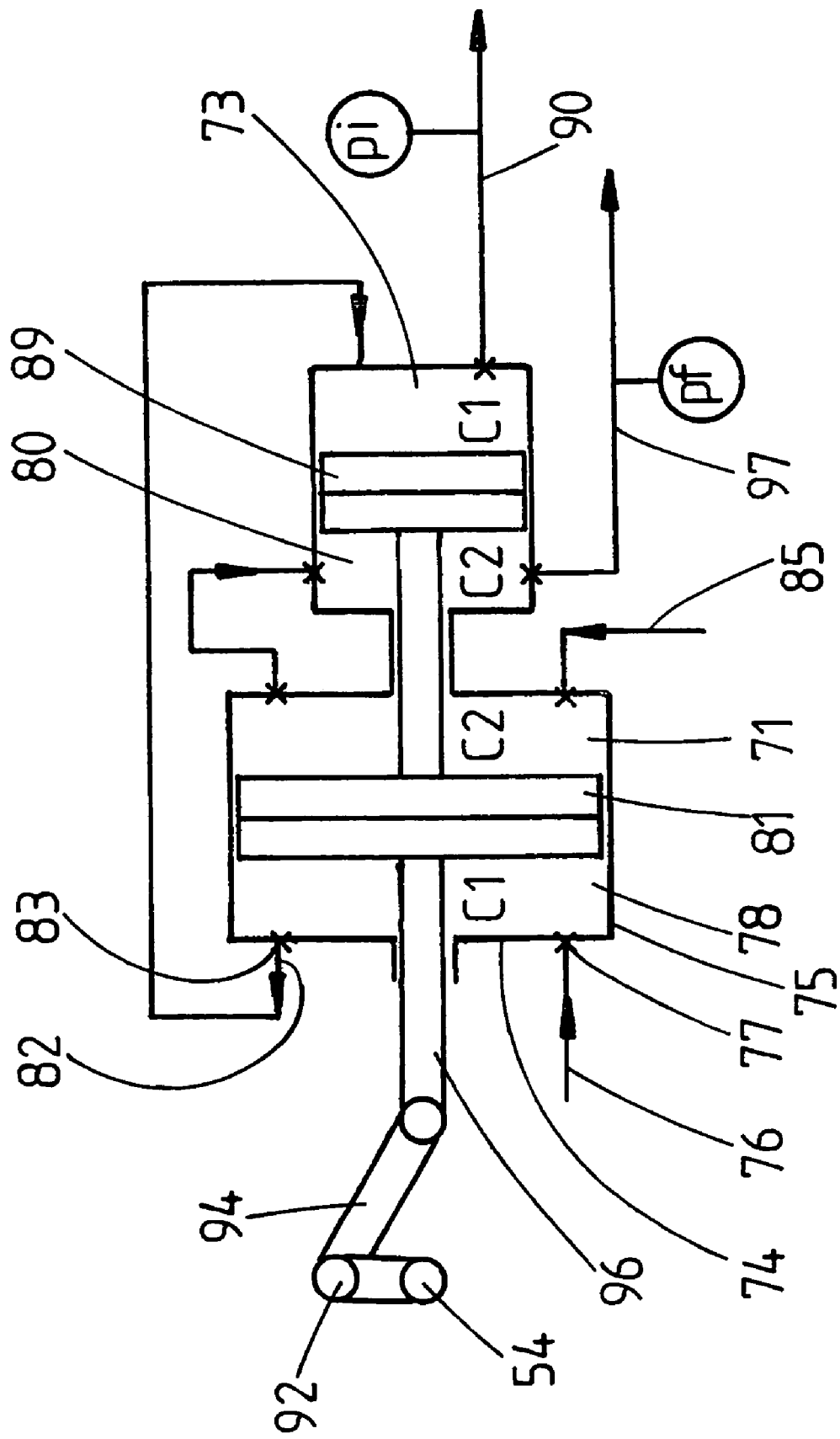

Details of a double acting, two stage air compression unit are shown on FIG. 18.

Figure 19:
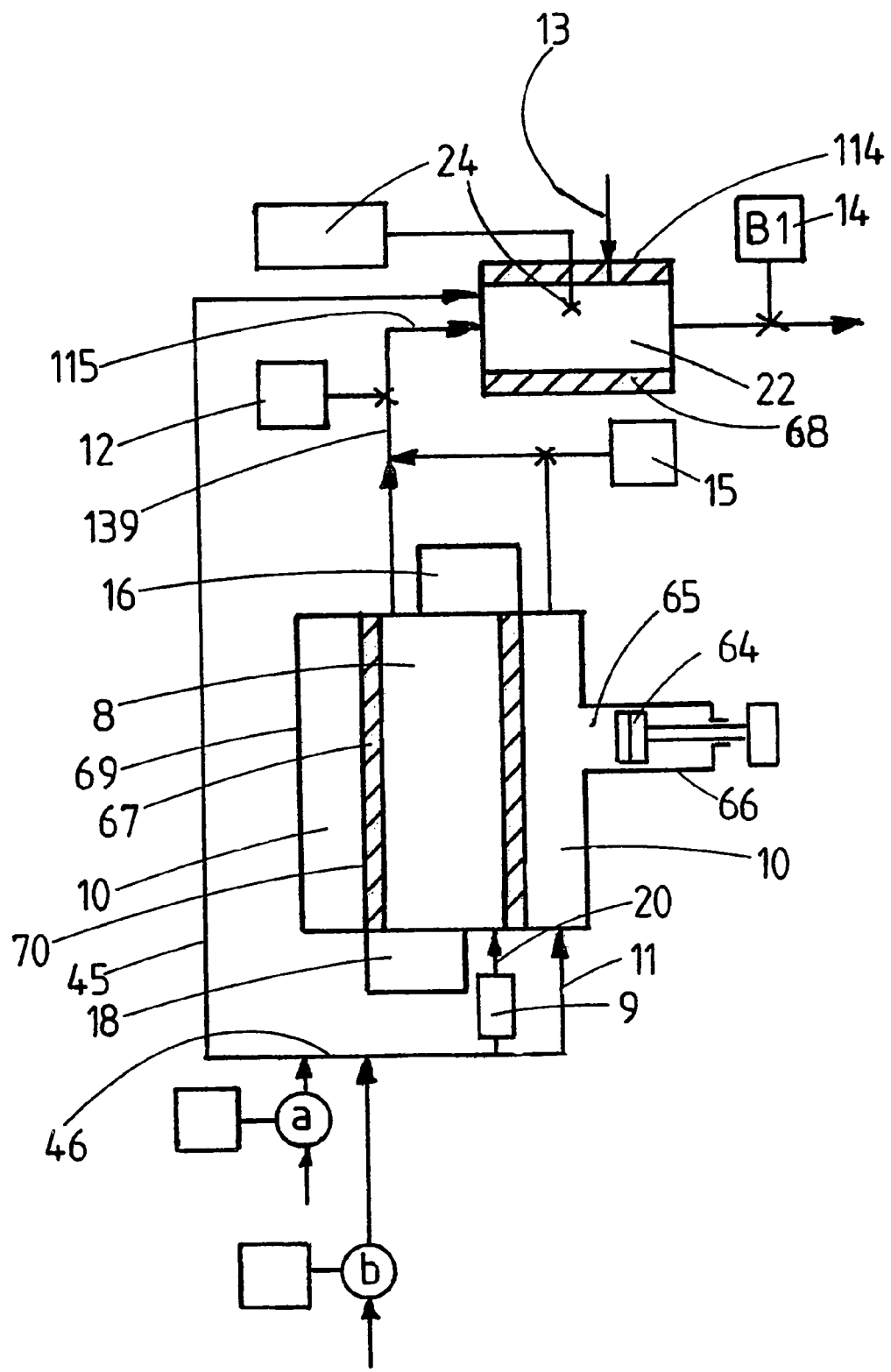

Details of single two step coke burning unit comprising a coke reactor, 8, a secondary air chamber, 10, a final reactor chamber, 22, are shown schematically in FIG. 19, and include the compression cycle valves, a, b, as well as the blowdown cycle valves, 12, 14, 15, connecting the two step coke burning unit to the air compressor and the expander engine, and interconnecting the several elements of the coke burning unit.

Figure 20:
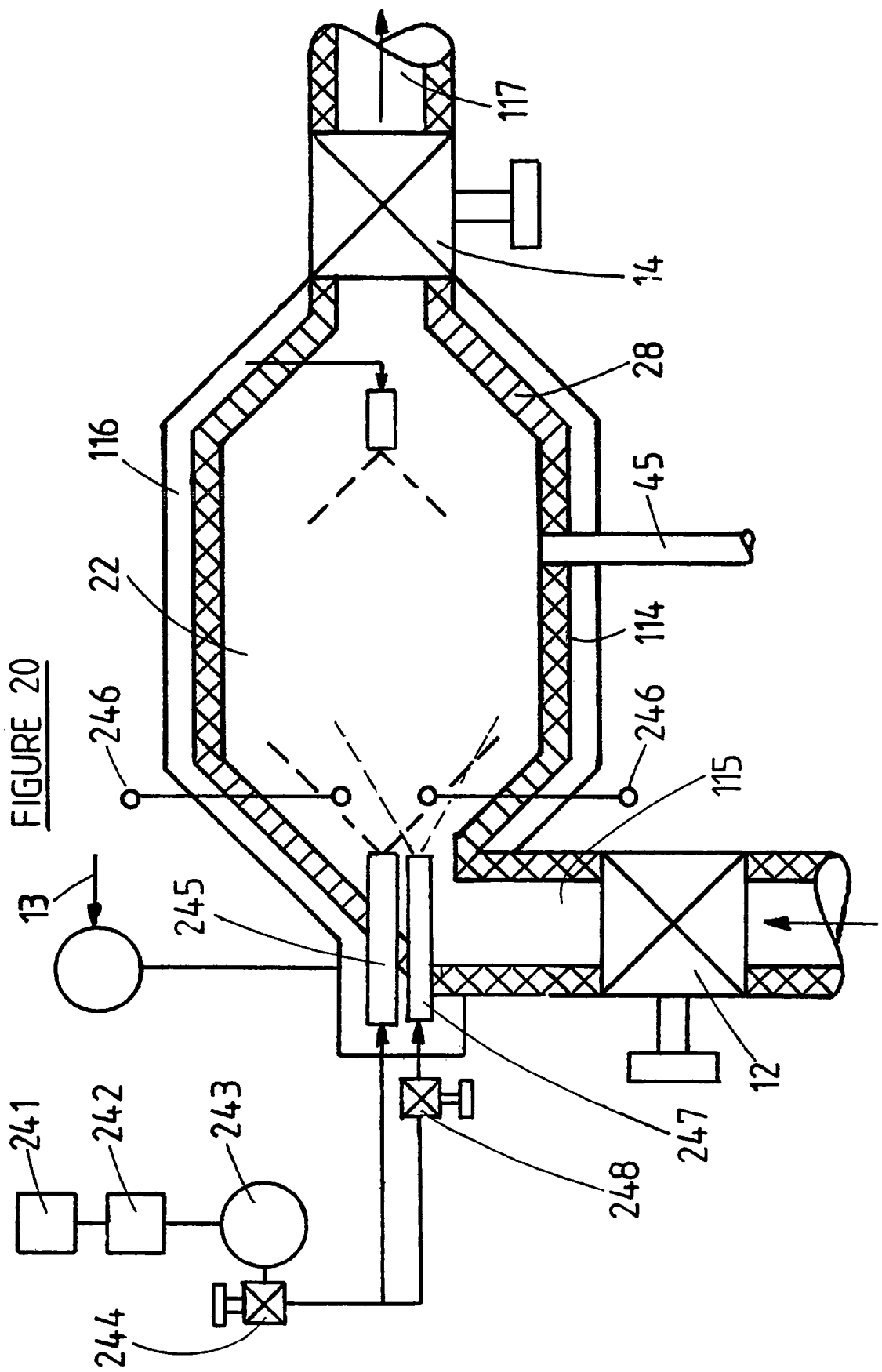

An example final reactor chamber of a two step coke burning unit is shown schematically in FIG. 20, wherein primary reacted gas from the coke reactor, is mixed with secondary air from the secondary air chamber, and this mixture ignited and burned to fully reacted gases, as it flows into the expander engine inlet, during each blowdown cycle. This mixing and secondary reaction process is illustrated graphically in FIG. 23. The use of compressed air as a cooling fluid, to be introduced into the final reactor to reduce the gas temperature, is illustrated graphically in FIG. 24.

Figure 21:
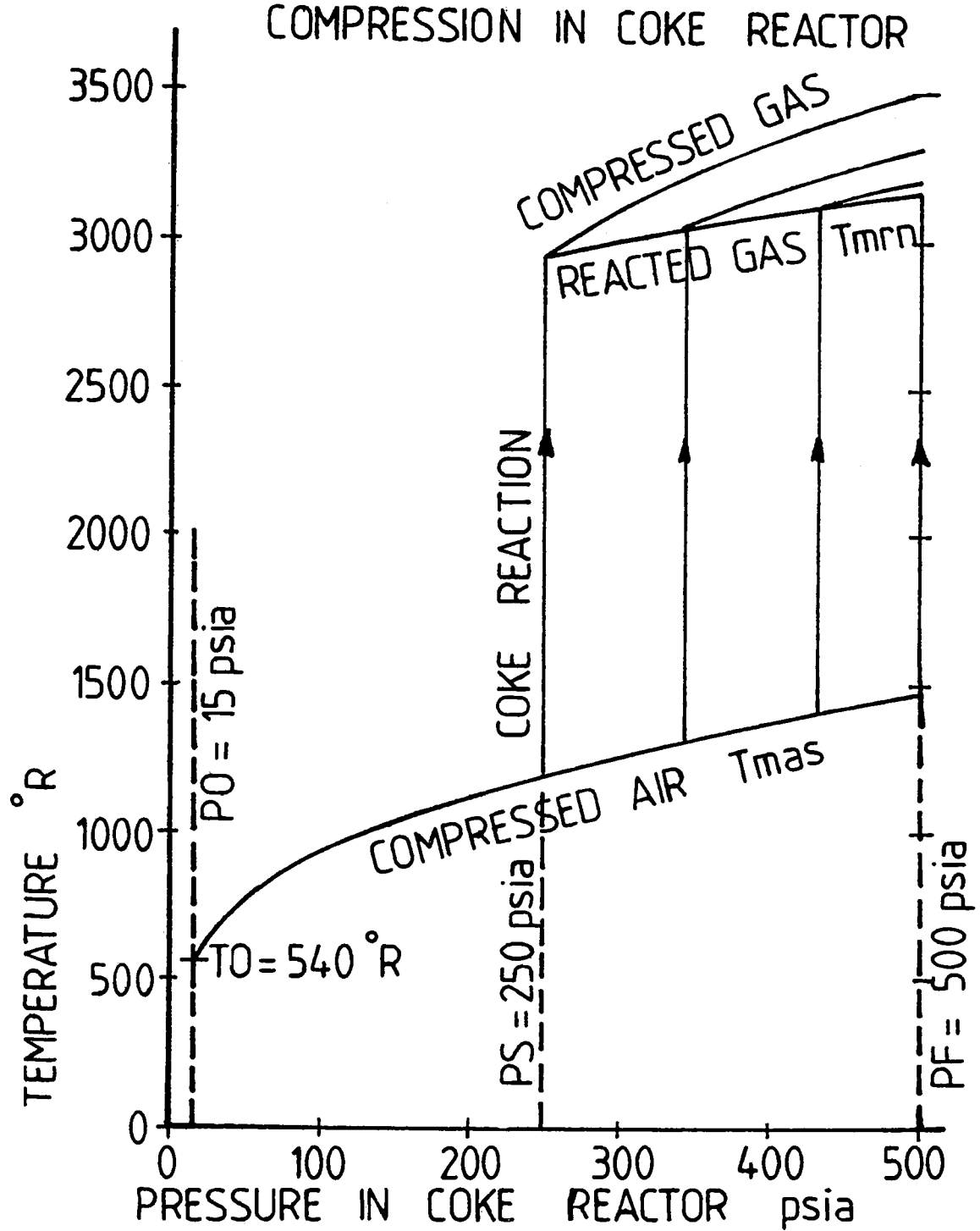
Figure 22:
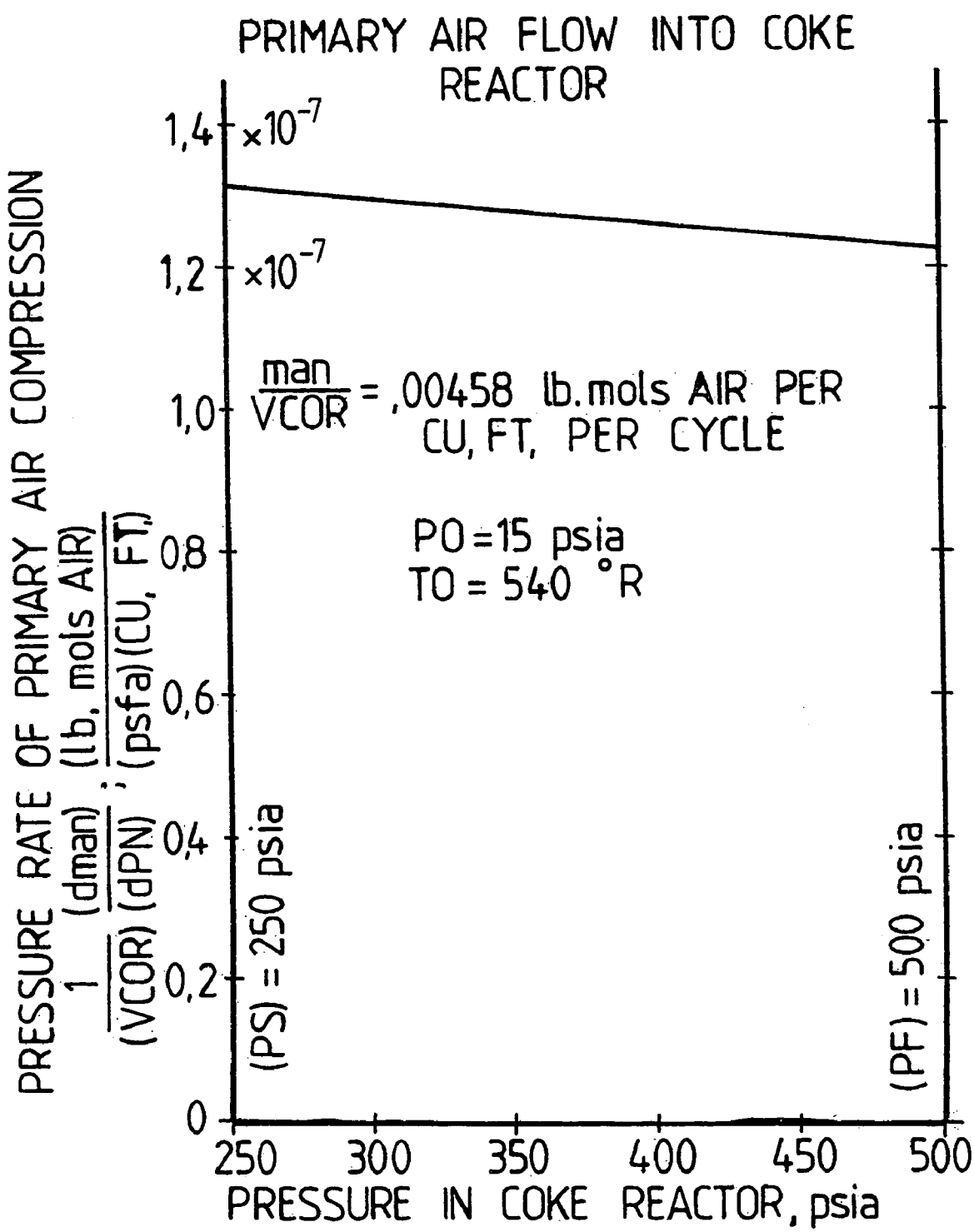

The process of compressing air into a coke reactor of a two step coke burning unit, and the primary reaction of this air with coke fuel chunks therein, is illustrated graphically in FIG. 21 and FIG. 22. The primary air quantity can be estimated by graphical integration of the air compression rate in FIG. 22.

Figure 25:
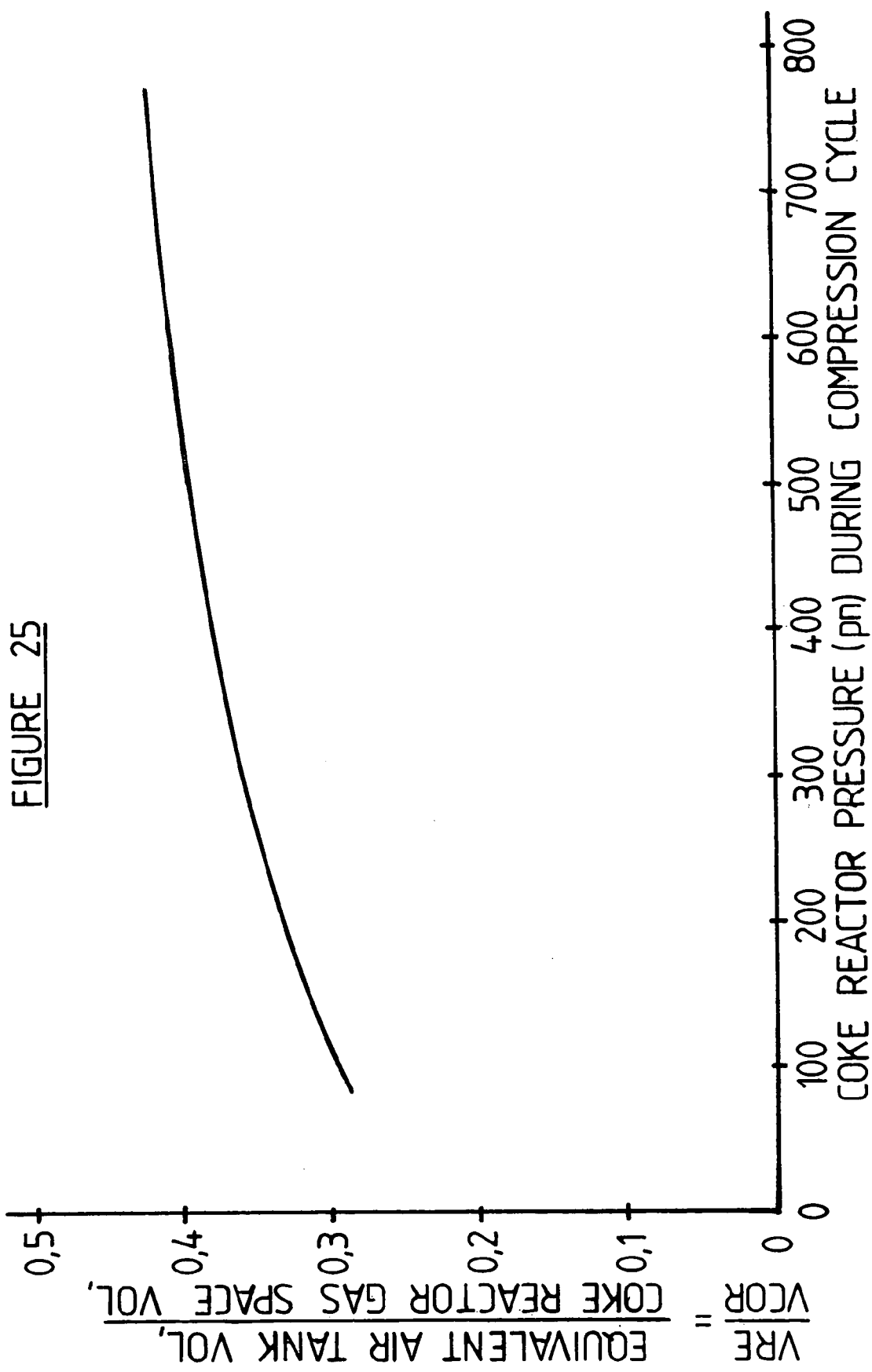

The air tank volume equivalent to the coke reactor gas space volume is illustrated on FIG. 25.

Figure 26:
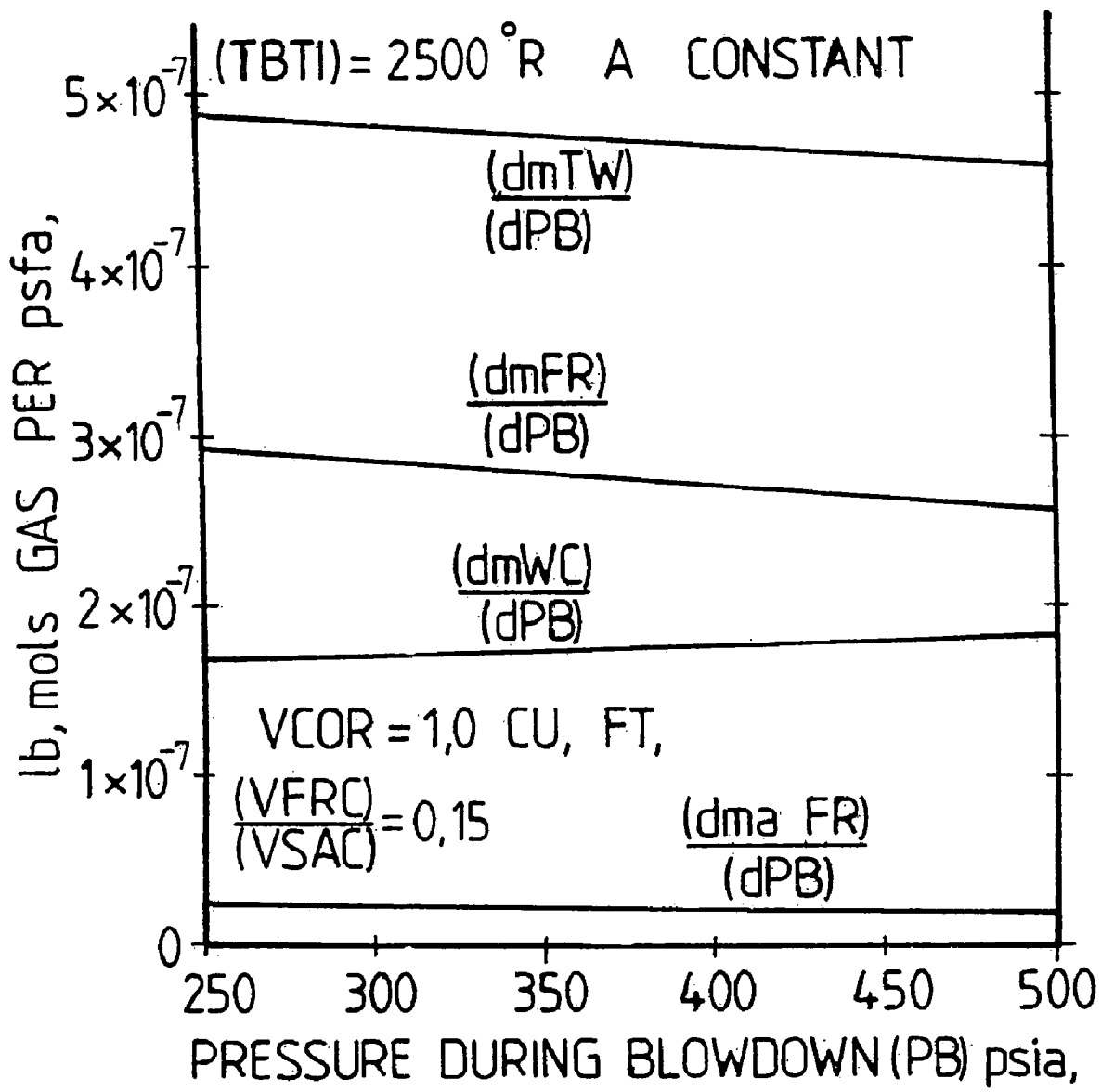

The use of liquid water as cooling fluid in place of compressed air is illustrated graphically on FIG. 26. The profile of a cam for driving a positive displacement cooling water pump is shown on FIG. 27 and FIG. 28.

Figure 29:
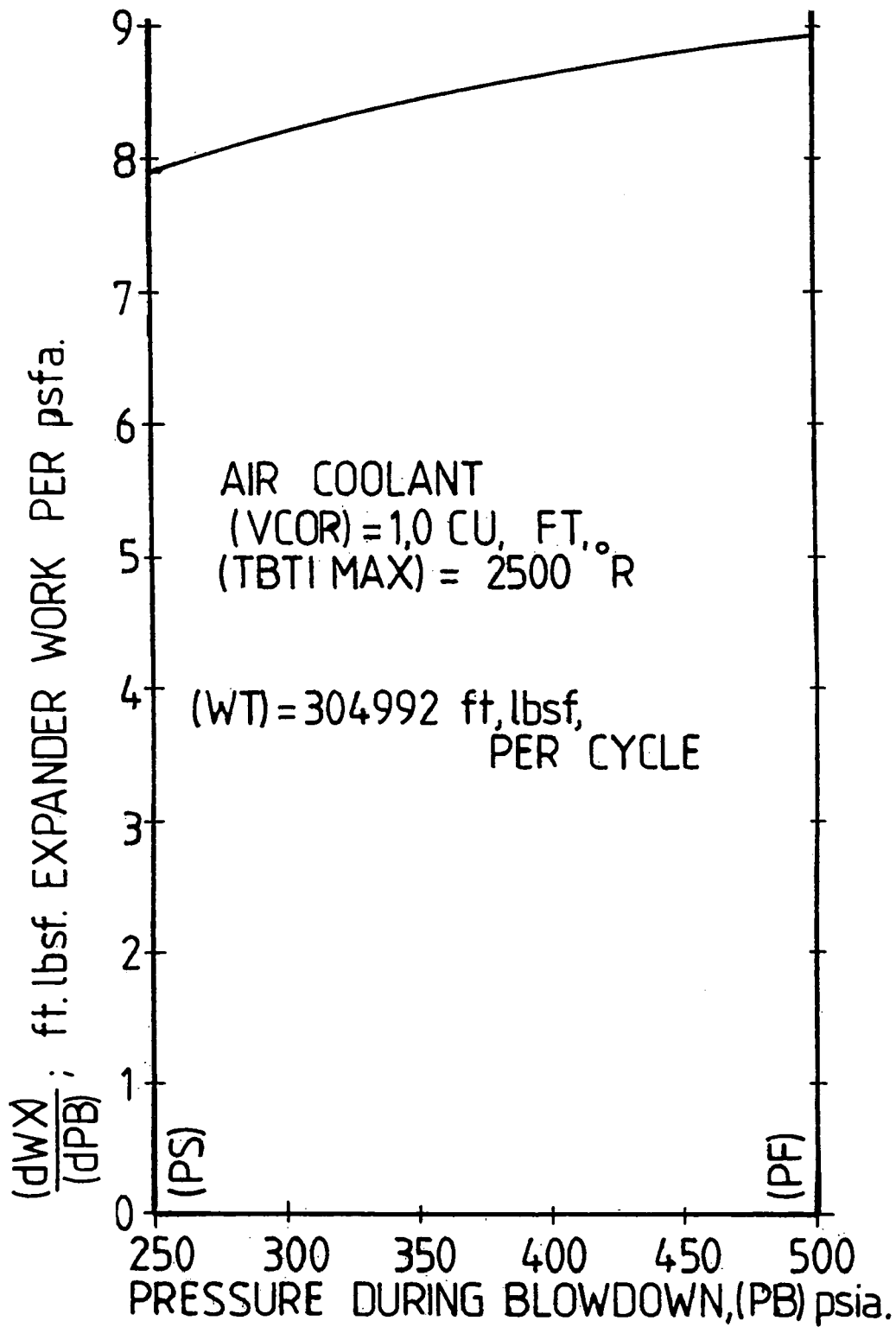

The expander engine work output per blowdown cycle is illustrated on FIG. 29, for the case where compressed air is used as cooling fluid. The corresponding air compressor work input per compression cycle is illustrated on FIG. 30.

Figure 1:
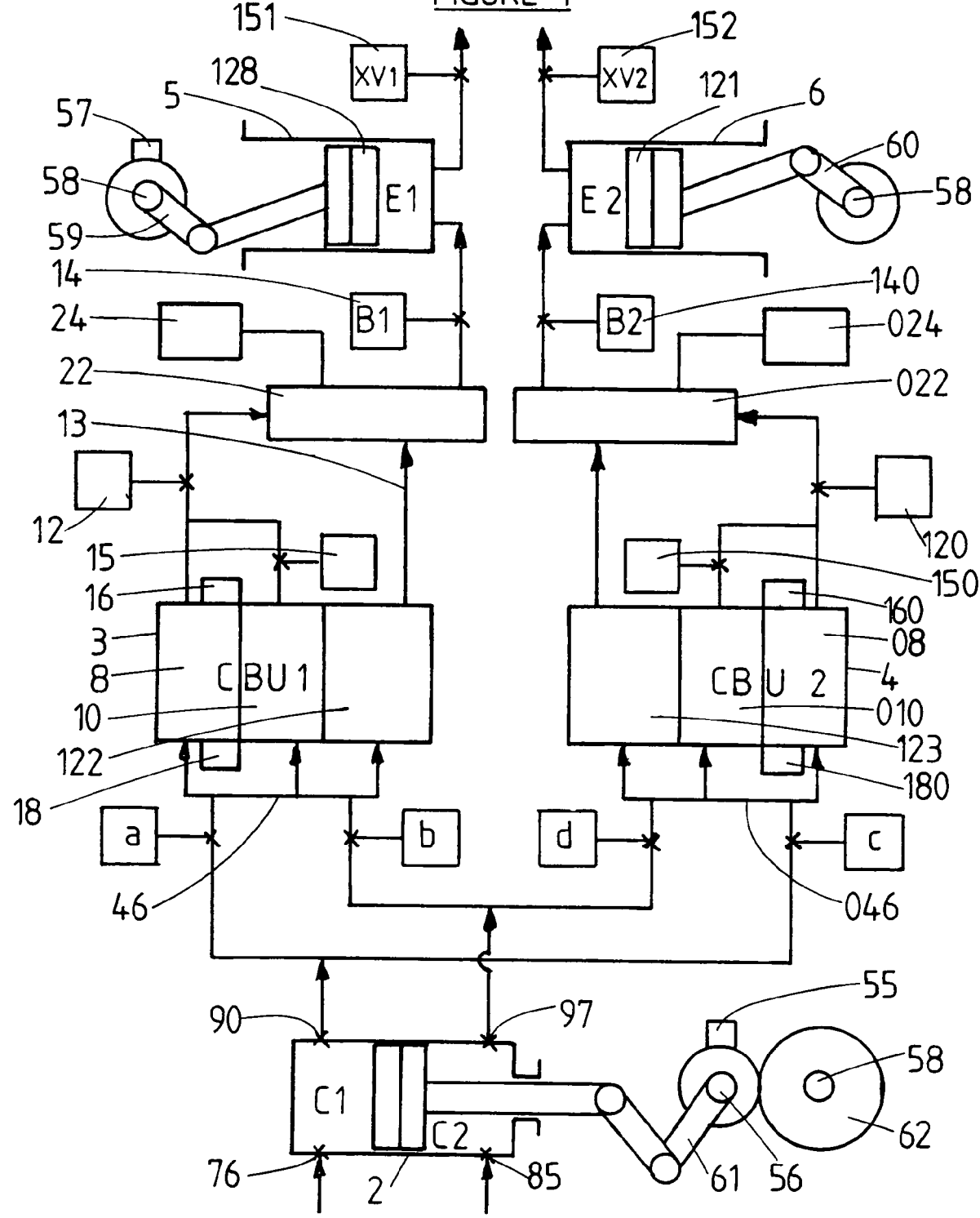
Figure 31:
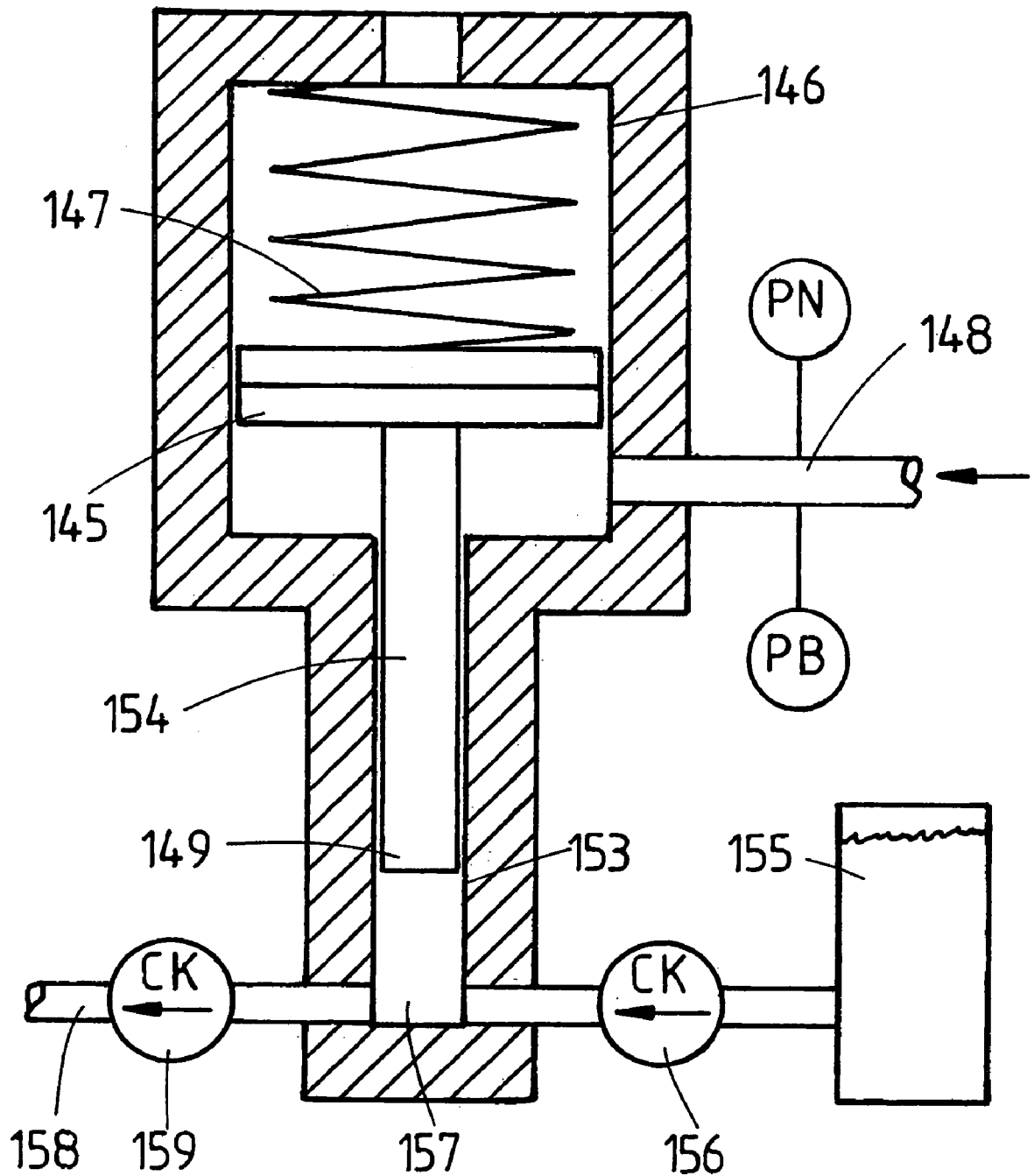

Another water coolant delivery pump, pneumatically driven is shown on FIG. 31, suitable for use with the FIG. 1 form of coke burning engine.

The net power output and thermal efficiency, of the FIG. 14 form of coke burning engine, as a function of air compressor crankshaft RPM is shown on FIG. 32. The required variation of the turbine nozzle throat area with air compression crankshaft RPM is illustrated on FIG. 33.

For a piston expander engine the work lost due to incomplete expansion of the fully reacted and cooled gases is shown on FIG. 34. A pressure-volume diagram for the piston expander engine is illustrated on FIG. 35.

Apparatus for controlling peak compression cycle pressure by controlling turbine expander engine inlet nozzle throat area is shown schematically on FIG. 36.

None of the apparatus drawings are to scale.

Coke Burning Engine

Description of the Preferred Embodiments

The apparatus of this coke burning engine comprises an air compression unit, one or more two step coke burning units, and one or more expander engines. Several compression cycle valves, and blowdown cycle valves, are used for opening and closing gas flow connections between these units. A cycle timer and control opens and closes these cycle valves, so that air from the air compression unit is compressed into each two step coke burning unit, during a compression cycle time period, to react with coke fuel, and fully reacted gases are blown down out of each two step coke burning unit, and into the expander engine during a following blowdown cycle time period. For each two step coke burning unit, a compression cycle time period is followed by a blowdown cycle time period, which is followed in turn by the next compression cycle time period.

A. The FIG. 1 Example Form of the Invention

The example form of the invention shown schematically in FIG. 1 comprises the following basic elements:
(1) A single stage, double acting air compression unit, 2, comprising two separate piston and cylinder air compressors, C1 and C2.
(2) Two separate two step coke burning units, 3, CBU1; and 4, CBU2.
(3) Two separate piston expander engines, 5, E1; and 6, E2, for producing a power output and driving the air compression unit, 2.
(4) Two compression cycle valves, a, and b, connect between the air compression units, C1, C2, and the two step coke burning unit, CBU1, when open during compression cycles on CBU1.
(5) Two compression cycle valves, c, and d, connect between the air compression units, C1, C2, and the two step coke burning unit, CBU2, when open during compression cycles on CBU2.
(6) Two blowdown cycle valves, 12, 15, connect between elements of the two step coke burning unit, CBU1, and a third blowdown cycle valve, 14(B1), connects between the two step coke burning unit, CBU1, and the piston expander engine, E1, when open during blowdown cycles of CBU1.
(7) Similarly two blowdown cycle valves, 120, 150, connect between elements of the two step coke burning unit, CBU2, and a third blowdown cycle valve, 140 (B2), connects between the two step coke burning unit, CBU2, and the piston expander engine, E2, when open during blowdown cycles of CBU2.
(8) Piston engine exhaust valve, XVI, is open during much of the exhaust stroke of the piston, 128, of piston expander engine, E1.
(9) Piston engine exhaust valve, XV2, is open during much of the exhaust stroke of the piston, 121, of piston expander engine, E2.
(10) These several valves are closed when not open.
(11) Piston and cylinder air compressor C1 comprises a suction check valve, 76, open during this suction stroke of compressor C1, and a delivery check valve, 90, open during the compression stroke of compressor C1.
(12) Similarly, piston and cylinder air compressor C2 comprises a suction check valve, 85, open during the suction stroke of compressor C2, and a delivery check valve, 97, open during the compression stroke of compressor C2.
(13) Two step coke burning unit, CBU1, comprises a coke reactor chamber, 8, a secondary air chamber, 10, a cooling air chamber, 122, a final reactor chamber, 22, and an igniter unit, 24. A common compressed air inlet manifold, 46, distributes air into all four separate chambers, 8, 10, 122, 22; during each compression cycle on CBU1. The coke reactor chamber, 8, is fitted with a refuel mechanism, 16, to periodically deliver coke fuel into the reactor, and keep the reactor essentially filled with coke fuel chunks, and an ash removal mechanism, 18, to periodically remove ashes from the coke reactor.
(14) Two step coke burning unit, CBU2, comprises a coke reactor chamber, 08, a secondary air chamber, 010, a cooling air chamber, 123, a final reactor chamber, 022, and an igniter unit, 024. A common compressed air inlet manifold, 046, distributes air into all four separate chambers, 08, 010, 123, 022, during each compression cycle on CBU2. The coke reactor chamber, 08, of coke burning unit, CBU2, is also fitted with a refuel mechanism, 160, and an ash removal mechanism, 180.

(15) The compression cycle timer, 55, driven by the crankshaft, 56, of the air compression unit, 2, times the opening and closing of the compression cycle valves, a, b, c, d, as shown on FIGS. 2 and 3, and described hereinbelow.

(16) The blowdown cycle timer, 57, on the common power output crankshaft, 58, of the two piston expander engines, E1 and E2, times the opening and closing of the expander inlet blowdown cycle valves, 12, 14, 15, 120, 140, 150, as well as the piston expander engine exhaust valves, XVI, XV2.

(17) The crankshaft, 56, of the air compression unit, 2, is driven by gears, 62, from the common power output crankshaft, 58, of the piston expander engines, E1 and E2, at twice the RPM of the engine crankshaft, 58.

(18) The crank, 59, of piston expander engine, E1, is 180 degrees apart from the crank, 60, of piston expander engine, E2, on their common power output crankshaft, 58.

(19) The angular relation of the air compressor crank, 61, to the crank, 59, of piston expander engine, E1, is set so that air compressor, C1, piston is at bottom dead center, whenever the piston of engine, E1, is at top dead center, TDC, and at bottom dead center.

(20) When the coke burning engine is to be started, the coke fuel chunks inside the coke reactor are preheated to their rapid reaction temperature. Various types of coke chunk preheaters are described hereinbelow.

The operation of this example FIG. 1 form of the invention can be described as follows:

(a) At the start of each compression cycle time interval of, for example, two step coke burning unit, CBU1, compression cycle valve, a, is open, and compression cycle valve, b, is closed during the first half of the compression cycle time interval while piston and cylinder air compressor, C1, is carrying out a compression stroke of the piston to compress air into the coke reactor chamber, 8, the secondary air chamber, 10, the cooling air chamber, 122, and the final reactor chamber, 22. All blowdown cycle valves, 12, 15, 14(B1), are closed during each compression cycle time interval. During the second half of the compression cycle time interval compression cycle valve, a, is closed, compression cycle valve, b, is opened, while piston and cylinder air compressor, C2, is carrying out a compression stroke of the piston to compress additional air into the coke reactor chamber, 8, the secondary air chamber, 10, the cooling air chamber, 122, and the final reactor, 22. Maximum compression cycle pressure (pf), is reached in the coke reactor chamber, 8, the secondary air chamber, 10, the cooling air chamber, 122, and the final reactor, 22, at the end of the compression cycle time interval.

(b) The oxygen portion of the air, thusly compressed deeply into the pore spaces of the coke chunks, reacts rapidly with the large area of coke thusly reached inside the coke reactor, to form primary reacted gas, rich in carbon monoxide, and at a high temperature.

(c) At the end of each compression cycle time interval of two step coke burning unit, CBU1, compression cycle valves a and b are closed, and the blowdown cycle valves, 12, 15, 14(B1) are opened during the blowdown cycle, which follows after each compression cycle. The piston of expander engine, E1, is commencing an expansion stroke, with exhaust valve (XVI) closed. Primary reacted gas flows out of the coke reactor chamber, 8, and mixes with secondary air flowing out of the secondary air chamber, via blowdown cycle valve, 15, to form an ignitable fuel air mixture. This fuel air mixture flows into the final reaction chamber, 22, via blowdown cycle valve, 12, where it is ignited by the igniter, 24, and this secondary reaction burns the carbon monoxide fully to carbon dioxide in the fully reacted gases, which are at a very high temperature from the heat of reaction of both the primary reaction and the secondary reaction. Cooling air flows out of the cooling air chamber, 122, and is mixed into the high temperature fully reacted gases, as they leave the final reactor, 22, to form fully reacted and cooled gases. These fully reacted and cooled gases flow into the piston expander engine, 5(E1), via blowdown cycle valve, 14(B1), while the engine piston is moving from top dead center to bottom dead center, on an expansion stroke. The pressure of the fully reacted and cooled gases acts upon the moving piston, 128, of the piston expander engine, E1, and the work thusly generated is transmitted from the piston, 128, to the engine crankshaft, 58, via the crank, 59, and connecting rod, 118. The work thusly done on the expander engine piston exceeds the work done by the air compressor, since the temperature, and hence the volume, of the fully reacted and cooled gases exceeds that of the air previously compressed. In this way the coke burning engine of FIG. 1 produces a work output on the piston expander engine crankshaft, 58, a portion of which drives the air compression unit, 2, via gears, 62, and the remaining net power output can drive a pump, or electric generator, or vehicle, via the common engine power output crankshaft, 58.

(d) At the end of the piston expansion stroke the expander engine piston is at bottom dead center, to start an exhaust stroke. All blowdown cycle valves, 12, 15, 14(B1), are closed, and piston expander engine exhaust valve, (XVI) is opened. The now fully expanded, cooled, fully reacted, gases are exhausted into the atmosphere via exhaust valve, XVI, during the exhaust stroke. The piston expander engine exhaust valve, XVI, is closed sufficiently prior to the end of the piston exhaust stroke, that the gases, thus remaining inside the engine cylinder, will be recompressed back up to essentially the maximum compression cycle pressure, (pf), reached at the end of each compression cycle, in order to avoid throttling losses at the start of blowdown. While this exhaust stroke of the piston expander engine, E1, is taking place, the next following compression cycle is underway on the connected two step coke burning unit, CBU1.

(e) At or before the end of the blowdown time interval, the minimum cycle pressure, (ps), is reached in the coke reactor chamber, 8, the secondary air chamber, 10, the cooling air chamber, 122, and the final reactor, 22. This minimum cycle pressure (ps), can be increased by an earlier closing the engine intake blowdown cycle valve, 14(B1), before the engine piston reaches bottom dead center on the expansion stroke. Theoretically the minimum cycle pressure, )ps), could be expanded to as low as atmospheric pressure during blowdown. However such low values of minimum cycle pressure reduce the fuel efficiency of the engine. Improved engine fuel efficiency can be obtained by using earlier closing of the blowdown cycle valve, 14(B1), relative to the piston motion of the piston expander engine, 5(E1), in order to achieve higher values of the minimum cycle pressure (ps).

(f) While two step coke burning unit, CBU1, is undergoing a compression cycle, two step coke burning unit, CBU2, is undergoing a blowdown cycle. This relative timing of compression cycles, blowdown cycles, compressor piston motion, and expander engine piston motion, is illustrated in the timing diagram of FIG. 2, for the FIG. 1 example form of the invention. As illustrated in FIG. 2, blowdown is carried out during the expansion stroke of the piston expander engines, with the engine inlet blowdown cycle valves open throughout expansion. This results in a low engine fuel efficiency. Apparatus for earlier and adjustable timing of the engine inlet blowdown cycle valves, 14(B1), and 140(B2), in order to improve fuel efficiency is described hereinbelow, together with apparatus for adjusting the air quantity delivered into each two step coke burning unit, during each compression cycle, in order to adjust net engine torque.

(g) Each piston and cylinder air compressor is connected to but one two step coke burning unit at a time, via its delivery check valve, and only during a compression stroke of the piston of the last stage of the piston and cylinder air compressor. Also each piston and cylinder air compressor is always thusly connected during each compression stroke of the last stage of the compressor.

Figure 2:
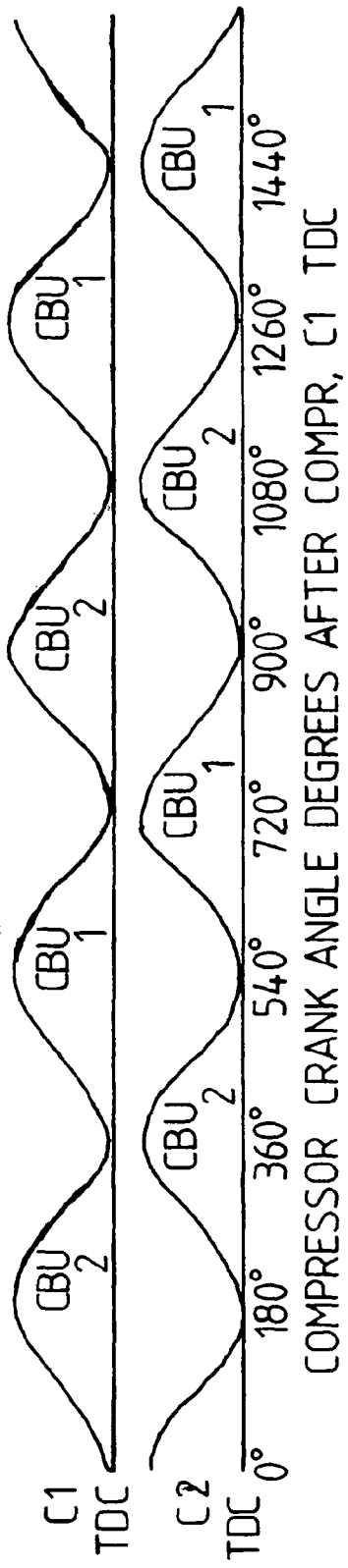
Figure 3:
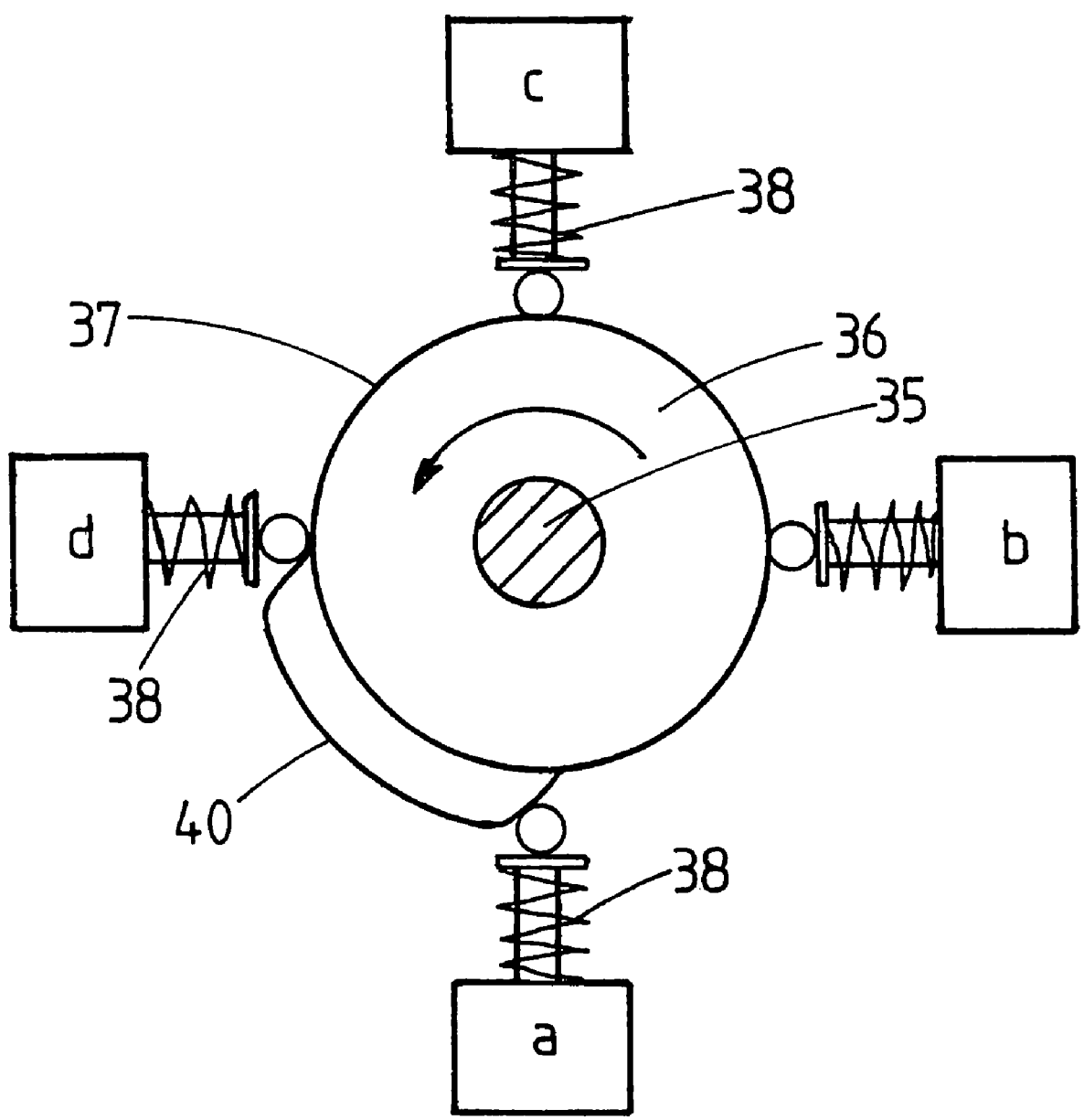

(h) One example form of compression cycle timer, 55, suitable for use on the FIG. 1 form of the coke burning engine, is shown schematically in FIG. 3, and comprises the following elements:

- A compression cycle timer cam, 36, is rotated by the camshaft, 35, at one half the RPM of the air compressor crankshaft, 56, in the direction shown, and has a 90 degree cam lifter section, 40, beyond the cam base circle, 37.
- The compression cycle valves, a, b, c, d, are opened by the cam lifter section, 40, and closed by the springs, 38, when the cam follower reaches the cam base circle, 37.
- The compression cycle timer cam, 36, is shown in FIG. 3 at the time when the air compressor crankshaft, 56, is at 540 degrees of rotation, as shown on FIG. 2, with compression cycle valve, a, starting to open to start a compression-cycle time interval on two step coke burning unit, CBU1, and with compression cycle valve, d, starting to close at the end of a compression cycle time interval on two step coke burning unit, CBU2.
- The compression cycle valves, a, b, c, d, are shown in FIG. 3, as directly opened and closed by the compression cycle timer cam, 36. But pilot valves could be opened and closed by the cam, 36, and hydraulic or pneumatic pressure act to open and close the cycle valves, a, b, c, d, located more directly on the two step coke burning units.

Figure 4:
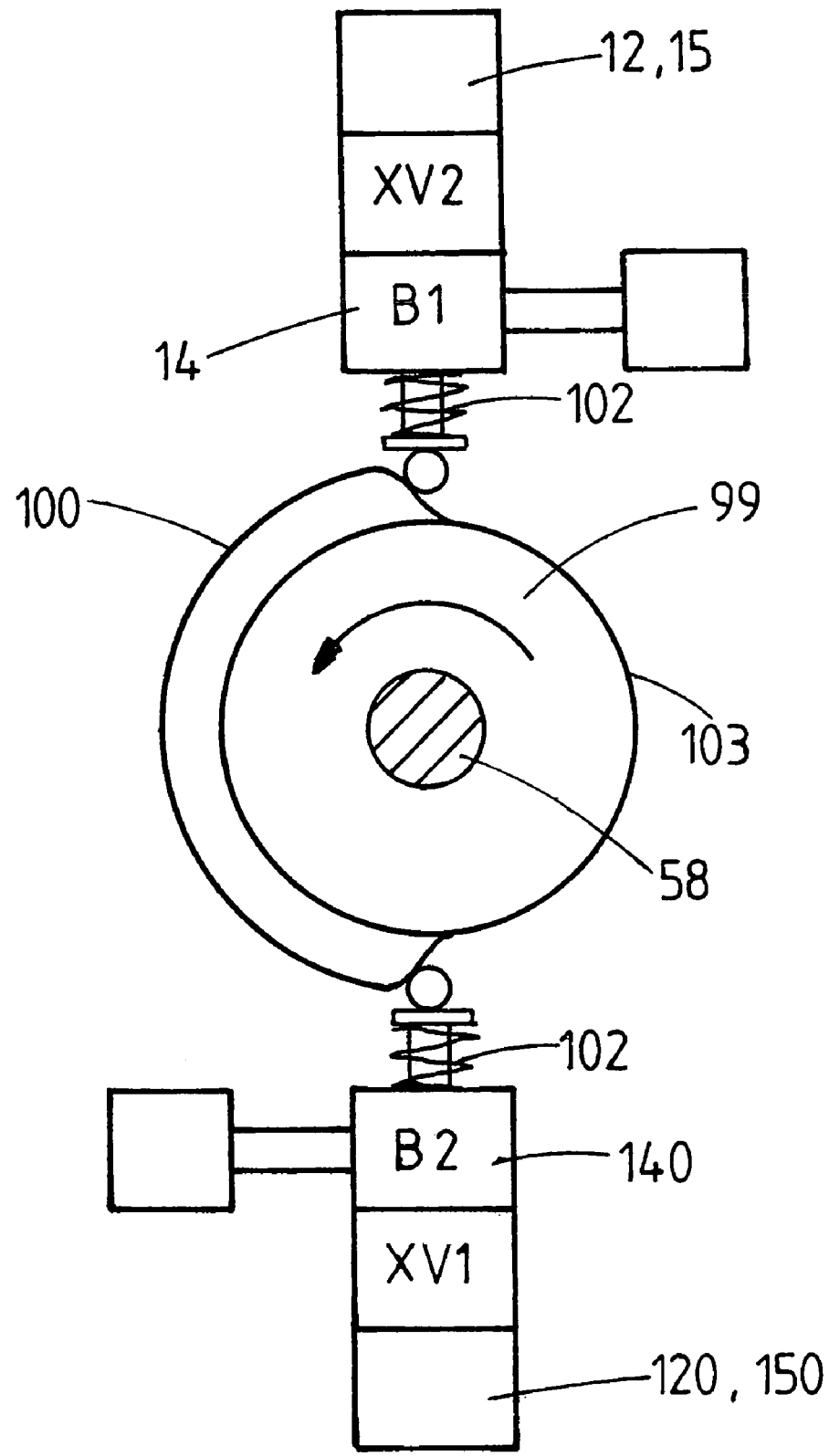

(i) An example form of blowdown cycle timer, 57, suitable for use on the FIG. 1 form of coke burning engine is shown schematically in FIG. 4, and comprises the following elements:

- A blowdown cycle timer cam, 99, is rotated by the common engine power output crankshaft, 58, in the direction shown, and has a 180 degree cam lifter section, 100, beyond the cam base circle, 103.
- The blowdown cycle valves, 14(B1), 140(B2) are opened by the cam lifter section, 100, and closed by the springs, 102, when the cam follower reaches the cam base circle.
- The expander engine exhaust valves, (XVI), and (XV2), are opened by the cam lifter section, 100, and closed by the springs, 102, when the cam follower reaches the cam base circle.
- The blowdown cycle valves, 12, 15, internal to two step coke burning unit, CBU1, are also opened and closed at the same time as blowdown cycle valve, 14(B1).
- The blowdown cycle valves, 120, 150, internal to two step coke burning unit, CBU2, are also opened and closed at the same time as blowdown cycle valve, 140(B2).
- The blowdown cycle timer cam, 99, is shown on FIG. 4 at the time when the piston expander engine power output crankshaft, 58, is at 180 degrees of rotation, as shown on FIG. 2, with piston expander engine, 5(E1), ending an expansion stroke due to closure of blowdown cycle valve, 14(B1), and commencing an exhaust stroke with engine exhaust valve (XVI) opening. Concurrently piston expander engine, 6(E2), is commencing an expansion stroke with blowdown cycle valve, 140(B2), opening, and ending an exhaust stroke, due to closure of engine exhaust valve (XV2). Concurrently two step coke burning unit, CBU1, is ending a blowdown cycle time interval with closure of internal blowdown cycle valves, 12, 15, and is starting the next compression cycle time interval. Concurrently, two step coke burning unit, CBU2, is starting a blowdown cycle time interval with opening of internal blowdown cycle valves, 120, 150, and is ending the previous compression cycle time interval.
- The several blowdown cycle valves, 12, 14, 15, 120, 140, 150, 14(B1), 140(B2), (XVI), (XV2), are shown in FIG. 4, as directly opened and closed by the blowdown cycle timer cam, 99. But electric or electronic sensors of piston engine crank angle could be used to initiate solenoid or piezoelectric valve actuators to open and close the several blowdown cycle valves located more directly on the two step coke burning units and the piston expander engines.

Liquid water coolant can be substituted for compressed air coolant with a consequent appreciable reduction in the size and cost of the air compression unit. The ideal engine efficiency is reduced since the latent heat of water coolant evaporation is lost to final exhaust. However, this loss is appreciably offset by the reduced air compressor losses.

An example water coolant pump, suitable for use on coke burning engines of this invention, such as the FIG. 1 example engine, is illustrated schematically in FIG. 31, and comprises the following elements:

(a) The larger driver piston, 145, operates sealably within the cylinder, 146, against the spring, 147. The spring side of the piston, 145, is vented to atmosphere.

(b) Compressed air acts on the side of the driver piston, 145, opposite the spring side, via the connection, 148, to the secondary air chamber of one coke burning unit.

(c) The smaller water pump piston, 149, operates sealably within the water pump cylinder, 153, and is connected to the driver piston, 145, via the piston rod, 154.

(d) During each compression cycle time interval, the increasing air pressure drives the driver piston, 145, against the spring, 147, and the water piston, 149, draws water coolant, from a water source, 155, via the water pump suction check valve, 156, into the pump chamber, 157.

(e) During each blowdown cycle time interval, the decreasing air pressure in the secondary air chamber allows the spring, 147, to drive the water piston, 149, to pump coolant water, from the pump chamber, 157, into the coolant fluid connection, 158, and into the exit of the final reactor of the one connected coke burning unit, via the water pump delivery check valve, 159. In this way the fully reacted gases will be mixed with and cooled, by this coolant water before passing into the expander engine.

(f) Each coke burning unit is fitted with a separate water coolant pump.

Liquid water can be used as a coolant alone or in combination with air coolant.

B. Control of Net Engine Torque of the FIG. 1 Form of Coke Burning Engine

Net engine torque varies essentially directly with the air quantity (man), compressed into each coke reactor, 8, during each compression cycle, and hence directly with the quantity of coke fuel reacted during each compression cycle. For constant maximum compression cycle pressure (pf), air quantity per compression cycle, and hence net torque, can be decreased by operating the blowdown to a higher minimum compression cycle pressure (ps), and thus over a narrower range of blowdown cycle pressure (pf-ps). Correspondingly the air quantity delivered by the air compression unit, per compression cycle, is to be reduced, when net engine torque is to be reduced, as, for example, by reducing the volumetric efficiency (Vol EFF), of the piston and cylinder air compressors. Also correspondingly the quantity of fully reacted and cooled gas, admitted into the piston expander engine, is to be reduced, as, for example, by closing the piston expander inlet blowdown cycle valve, 14(B1), earlier, and hence at a higher final blowdown pressure, during each expander stroke of the piston expander engine, 5(E1). These two controls, reducing air quantity, man, delivered per cycle by the air compression unit, and increasing minimum blowdown cycle pressure (ps), to correspondingly reduce the quantity of fully reacted and cooled gas expanded by the piston expander engine per cycle, are to be carried out simultaneously. Example apparatus for carrying out these two control functions can be described as follows:

1. An example apparatus for adjusting the volumetric efficiency of the piston and cylinder air compressors, C1, C2, in order to adjust the air quantity (man), per compression cycle, is shown schematically in FIG. 5, and comprises the following elements:

Piston and cylinder air compressor, C1, is fitted with a clearance volume adjustment piston, 25, moveable by a threaded piston rod, 26, which can be rotated, via a control rod, 27, and gears, 29, in the threaded nut, 30, to move the piston, 25, in the cylinder, 31, to adjust the clearance volume (VCL) of the air compressor. As the ratio of air compressor clearance volume (VCL) to air compressor piston displacement (VD) is increased, the volumetric efficiency (Vol.Eff.) and hence the air quantity delivered into the coke reactor per compression cycle (man), is reduced, as shown graphically on FIG. 6.

Piston and cylinder air compressor, C2, is similarly fitted with apparatus for adjusting the clearance volume, and hence the volumetric efficiency, and thus the air quantity delivered into the coke reactor per compression cycle.

Single stage air compressors, C1 and C2, are shown on FIG. 1, wherein the first suction stage and the last delivery stage are combined. For higher coke burning engine cycle pressures (pf) and (ps), and consequently higher engine fuel efficiency, two and three stage piston and cylinder air compressors will be preferred. Clearance volume adjustors can be used on all stages of multistage piston and cylinder air compressors, with clearance volume adjusted proportionally to stage piston displacement, via a common control rod, 27.

2. An example apparatus for adjusting the closing time of the piston expander engine, 5(E1), inlet blowdown cycle valve, 14(B1), in order to control the quantity of fully reacted and cooled gas admitted into the piston expander engine, during each blowdown cycle time interval, is shown schematically in FIG. 7 and FIG. 8, and comprises the following elements:

The piston and cylinder engine inlet blowdown cycle valve, 14(B1), and exhaust valve (XVI), are shown on the cross section view of the piston and cylinder engine, 5(E1), on FIG. 7. The inlet blowdown cycle valve, 14(B1) is shown as an outward opening valve, in order to minimize engine clearance volume. The exhaust valve (XVI), is shown as a conventional inward opening valve, as its open time does not interfere with engine clearance volume. Both valves are spring closed. The valve stem, 124, of the engine inlet blowdown cycle valve, 14(B1), connects to the cam actuated, hydraulic engine inlet valve, fixed opening and adjustable closing, timer apparatus, 57, shown schematically in FIG. 8.

The raised section, 125, of the piston expander engine inlet blowdown cycle valve opener cam, 134, acts, via the hydraulic pump, 126, and the inlet valve actuator, 127, to open the engine inlet blowdown cycle valve, 14(B1), via its stem, 124. The opener cam, 134, is driven by the engine power output crankshaft, 58, and timed to open the engine inlet blowdown cycle valve whenever the engine piston, 128, reaches top dead center, TDC, at the end of an exhaust stroke, and start of an expansion stroke. When open, the engine inlet blowdown cycle valve, 14(B1), seals against the reverse valve seat, 129, and is cooled thereby. The valve stem, 124, is fitted with a stem seal, 131. The spring loaded hydraulic accumulator, 132, holds the valve firmly against the seat, 129.

The raised section, 133, of the piston expander engine inlet blowdown cycle valve closer cam, 135, acts to open the release valve, 136, which, when thusly open, releases hydraulic fluid back to the hydraulic fluid reservoir, 137, and the closer spring, 138, closes the piston expander inlet blowdown cycle valve, 14(B1). The release valve, 136, is closed by the spring, 141, when the cam follower of the release valve, 136, returns to the closer cam base circle, 142. The piston expander engine inlet blowdown cycle valve closer cam, 135, is also driven by the engine crankshaft, 58, via the helical spline sleeve, 143, keyed to the engine power output crankshaft, 58, and whose helical splines engage helical grooves on the closer cam, 135. The helical spline sleeve, 143, can be moved axially relative to both the engine power output crankshaft, 58, and the closer cam, 135, to change the angular relation between them, and thus to change the time of closing of the piston expander engine inlet blowdown cycle valve, 14(B1), relative to the fixed time of opening of this valve when the engine piston, 128, is at top dead center.

The piston expander engine exhaust valve (XVI), can be opened and closed by a single exhaust valve cam, driven by the engine power output crankshaft, 58, with fixed timing, to open the exhaust valve (XVI) at or somewhat before, the time when the engine piston, 128, reaches bottom dead center, BDC, at the end of each expansion stroke. The exhaust valve cam is also timed to close the exhaust valve (XVI) sufficiently prior to the time when the engine piston, 128, reaches top dead center, TDC, at the end of each exhaust stroke, that the residual gases thus trapped in the engine cylinder will be recompressed back to essentially maximum compression cycle pressure (pf), when the engine piston next reaches top dead center. By thusly recompressing the residual gases in the engine cylinder, throttling losses can be avoided when the piston expander engine inlet blowdown cycle valve, 14(B1), is next opened to commence the next blowdown cycle and engine expansion stroke.

The above described apparatus for adjusting the closing time of the piston expander engine inlet blowdown cycle valve is only one illustrative example, and other types of adjustable valve timing apparatus can also be used as are widely used in the art of variable valve timing for piston engines.

In many coke burning engine applications the piston expander engine will be fitted with a cylinder cooling jacket, 144, as illustrated on FIG. 7.

The net torque output of a FIG. 1 type of coke burning engine of this invention can be controlled by adjusting the duration of the blowdown cycle time interval, using the above described apparatus for adjusting the closing time of the piston expander engine inlet blowdown cycle valves, 14(B1) and 140(B2). This adjustment can be done by hand, or automatically in response to, for example, a sensor of engine power output crankshaft, 58, RPM. Peak cycle pressure (pf) can then be controlled by adjusting the air compressor clearance volume, using a peak cycle pressure (pf) sensor, and the above described apparatus for adjusting air compressor clearance volume. Air compressor clearance volume can be increased when peak cycle pressure exceeds a set value and decreased when peak cycle pressure drops below the set value. This adjustment of air compressor clearance volume can be done by hand or automatically.

C. The FIG. 9 Example Form of the Invention

The FIG. 9 example form of the invention differs from the FIG. 1 example form of the invention in several ways, such as the following:

(1) A single turbine expander engine, 161, is used in the FIG. 9 form of coke burning engine in place of the two piston expander engines, E1 and E2, used in the FIG. 1 form of coke burning engine. The turbine expander engine has one turbine inlet nozzle for each two step coke burning unit, and each nozzle is connected to but one two step coke burning unit (CBU), via a turbine expander inlet blowdown cycle valve (B), similarly to the case of FIG. 1, where each piston expander engine connects only to one two step coke burning unit, via a blowdown cycle valve. Thus two step coke burning unit (CBU3) connects only to expander turbine inlet nozzle (N3) via blowdown cycle valve (B3), and similarly for the other two step coke burning units.

In a piston expander engine, the expanding gas performs mechanical work on the moving engine piston, via the gas pressure acting thereon. In an impulse turbine expander engine, the expanding gas performs mechanical work, first by accelerating itself to a high velocity via the pressure gradient acting on the gas through the nozzle, subsequently on the moving turbine blades by decelerating the high velocity gas, as it flows over the moving blade surfaces. In both expander engine types, the expanding gas creates a mechanical work output by applying a force to a moving portion of the engine.

The turbine power output drives the crankshaft, 56, of the air compression unit, 162, via gears, 165, and the remaining net useful power output can drive an electric generator, 163, or a pump or other application, via a reduction gear box, 164. The fully expanded gas leaves the turbine, 161, via the turbine exhaust pipe, 167.

(2) A two stage, double acting air compression unit, 162, is used in the FIG. 9 form of the invention in place of the single stage, double acting air compression unit, C1 and C2, used in the FIG. 1 form of the invention. Higher cycle pressures (pf) and (ps) can be used with two stage compressors than with single stage compressors, and higher engine fuel efficiencies can be obtained.

(3) Three two step coke burning units, CBU3, CBU4, CBU5, are used in the FIG. 9 coke burning engine, in combination with two separate piston and cylinder air compressors, C3, C4, in the air compression unit, 166. These three coke burning units, CBU3, CBU4, CBU5, are similar to those used on the FIG. 1 coke burning engine and use a cooling air chamber.

(4) For this combination of three coke burning units, with two separate piston and cylinder air compressors, the cycle timer camshaft, 168, is driven at one third of air compressor crankshaft, 56, RPM, via the gears, 169. The compression cycle cam, 170, with a sixty degree raised valve opening section, 171, is driven by the camshaft, 168, to open and close the compression cycle valves, e, f, g, h, i, j, as shown on FIG. 11. The blowdown cycle cam, 172, with a one hundred and twenty degree raised valve opening section, 173, is also driven by the camshaft, 168, to open and close the blowdown cycle valves, B3, B4, B5, as shown on FIG. 12. Thusly timed, the FIG. 9 coke burning engine operation is illustrated on the timing diagram of FIG. 10. Each compression cycle time interval is followed, first by a reaction time interval, and then by a blowdown cycle time interval. This reaction time interval provides additional time for completion of the reaction of compressed air with coke fuel, to form carbon monoxide rich primary reacted gas, in addition to the time provided by the compression time interval and the blowdown time interval. This extra time for coke reaction may be needed when high values of air compressor crankshaft RPM are to be used.

(5) For all forms of coke burning engines of this invention, the number of two step coke burning units is to equal or exceed the number of separate piston and cylinder air compressors in the air compression unit, so that each separate piston and cylinder air compressor can always be connected to one two step coke burning unit, during each delivery stroke of the piston of the last high pressure stage.

(6) The same torque control system as used on the FIG. 1 form of coke burning engine can also be used on the FIG. 9 form of coke burning engine, with adjustable duration of blowdown in combination with adjustable air compressor volumetric efficiency, as described hereinabove. Alternatively, adjustable turbine inlet nozzle throat area, AN, can be substituted for adjustable duration of blowdown as a method for maintaining an essentially constant maximum compression cycle pressure (pf) over the full range of primary air flow per cycle, man, as adjusted by the air compressor volumetric efficiency adjustor.
(7) An example turbine inlet nozzle throat area controller is shown schematically in FIG. 36 for the turbine expander engine, 161, turbine inlet nozzle, N3, and comprises the following elements:
  (a) Turbine inlet nozzle gas flow area, AN, of nozzle, N3, can be adjusted by adjusting the position of the tapered nozzle throat area needle, 182, in the turbine inlet nozzle throat, 183.
  (b) The position of the tapered nozzle throat area needle, 182, is adjusted by the piston and cylinder pressure comparator, 184, whose piston, 185, is connected to the tapered nozzle throat area needle, 182, by the piston rod, 188.
  (c) Maximum compression cycle pressure (pf) acts on the needle side, 189, of the comparator piston, 185, via the connection, 190, to the secondary air chamber, 191, of the two step coke burning unit, CBU3. The check valve, 192, and slow gas bleed, 193, assure that the pressure acting on the needle side of the comparator piston is approximately equal to the peak pressure, pf, reached in the secondary air chamber, 191, at the end of each compression cycle.
  (d) Reference pressure (pref) acts on the reference side, 194, of the comparator piston, 185, via the connection, 195, to a high pressure source, 196, of gas, such as compressed air or compressed nitrogen, at a pressure appreciably greater than maximum compression cycle pressure, (pf). The pressure regulator, 197, sets reference pressure (pref) at essentially maximum compression cycle pressure (pf) and this pressure can be stabilized by use of a slow reference pressure bleed, 198.
  (e) When maximum compression cycle pressure (pf) drops below reference pressure (pref), the comparator piston, 185, is moved by this pressure difference, and moves the tapered needle, 182, to decease turbine inlet nozzle throat area, AN, and thus reduce the flow rate of fully reacted and cooled gases during blowdown. As a result the minimum cycle pressure (ps), reached at the end of blowdown is increased, and the maximum cycle pressure (pf), reached at the end of the next compression cycle is also increased. These nozzle throat area changes, and consequent cycle pressure changes, are reversed whenever maximum compression cycle pressure exceeds reference pressure. In this way maximum compression cycle pressure (pf) is controlled to remain at, or close to, reference pressure (pref) over the full range of variation of primary air flow per cycle (man).
  (f) All of the turbine inlet nozzles are similarly equipped with turbine inlet nozzle throat area controllers.

D. The FIG. 14 Example Form of the Invention

This FIG. 14 coke burning engine has some similarities to the FIG. 9 coke burning engine and comprises the following elements:
(1) A first pair of two step coke burning units, CBU6 and CBU7, are compressed only by the two piston and cylinder air compressors, C5 and C6, of air compression unit, 100, via compression cycle valves, k, l, and m, n.
(2) This first pair of two step coke burning units, CBU6 and CBU7, deliver fully reacted and cooled gas separately into the two turbine inlet nozzles, N6 and N7, of the turbine expander engine, 101, via turbine inlet blowdown cycle valves, B6 and B7.
(3) Similarly a second pair of two step coke burning units, CBU8 and CBU9, receive compressed air only from the two piston and cylinder air compressors, C7 and C8, of air compression unit, 102, via compression cycle valves, o, p, and q, r.
(4) The second pair of two step coke burning units, CBU8 and CBU9, deliver fully reacted and cooled gas separately into the two turbine inlet nozzles, N8 and N9, of the turbine expander engine, 101, via turbine inlet blowdown cycle valves, B8 and B9.
(5) Air compression unit, 100, compresses air only into the two step coke burning units, CBU6 and CBU7. Air compression unit, 102, compresses air only into two step coke burning units, CBU8 and CBU9.
(6) Both air compression units, 100 and 102, are two stage, double acting air compressors, and are reciprocated by a common air compressor crankshaft, 103, driven by an adjustable speed electric motor, 104, receiving electric power from the turbine expander engine, 101, driven electric generator, 105, via the electric motor speed controller, 106, as shown on FIG. 16. The crank, 107, of air compression unit, 102, is displaced 180 degrees from the crank, 108, of air compression unit, 100.
(7) The turbine expander engine, 101, drives an electric power generator, 105, via reduction gears, 109, a portion of the electric power generated being used to drive both air compression units, 100 and 102, the remainder being the useful power output of this coke burning engine.
(8) The torque generated by gas flow over the turbine blades can be increased by increasing the rate of flow of compressed air into the coke burning units, via increasing the RPM of the air compressor crankshaft, 103, and thus shortening the duration of each compression time interval. To accommodate the consequently increased flow rate of fully reacted and cooled gases during blowdown, the throat area of each turbine inlet nozzle must be increased in proportion to air compressor crankshaft RPM, in order to decrease the blowdown time interval. In this way turbine power output shaft torque can be controlled by controlling air compressor crankshaft RPM, via the electric motor speed controller, 106. In many coke burning engine applications, such as electric power generation, this torque control can be utilized to maintain an essentially constant turbine power output shaft RPM at best efficiency ratio of turbine blade speed to speed of gas flow at turbine nozzle exit. This control can be done by hand or automatically.
(9) Turbine nozzle throat gas flow area (AN) is to increase linearly with air compressor crankshaft RPM, so that the increased flow rate per unit of time, of fully reacted and cooled gas, can occur through the turbine nozzles. One example apparatus for thusly adjusting turbine inlet nozzle throat area, AN, of nozzle N6, linearly with air compressor crankshaft RPM, is illustrated schematically in FIG. 17, and comprises the following elements:
  A fixed displacement per revolution hydraulic pump, 41, is driven at a fixed multiple of air compressor crankshaft, 103, RPM, by the air compressor drive motor, 104, as a sensor of air compressor crankshaft RPM. Hydraulic fluid is pumped from the tank, 42, through the fixed area orifice, 43, into the tank, 42. The pressure, PNC, thus generated in the hydraulic manifold, 44, acts via connection, 47, on the piston, 48, of the cylinder, 49, and spring, 50, actuator, 51, to adjust the tapered nozzle throat area control needle, 52, position in the turbine inlet nozzle throat, 53, and thus to adjust the turbine inlet nozzle throat area, AN, in proportion to air compressor crankshaft, 103, RPM.

So that nozzle area, AN, will increase linearly with air compressor crankshaft RPM, the cross section area of the tapered nozzle throat area control needle, 52, is to decrease with the square of the distance from the large end of the taper over the length of the needle motion caused by the full range of change of air compressor crankshaft RPM.

The other connections, 86, 87, 88, from the hydraulic manifold, 44, connect similarly to the other turbine inlet nozzles, N7, N8, N9.

Where a rectangular area is used on the turbine inlet nozzles, throat area can alternatively be adjusted by use of rotatable nozzle side walls.

This compressor crankshaft RPM compensator of turbine inlet nozzle throat area can be added on, in series, to a turbine nozzle inlet throat area controller of peak compression cycle pressure, as shown on FIG. 36 and described hereinabove.

(10) The cycle timer, 84, can time the opening and closing of the compression cycle valves, k, l, m, n, o, p, q, r, and the blowdown cycle valves, B6, B7, B8, B9, so that the blowdown cycles of the second pair of two step coke burning units, CBU8 and CBU9, are offset 180 air compressor crank degrees from the blowdown cycles of the first pair of two step coke burning units, CBU6 and CBU7, as illustrated on the cycle timing diagram of FIG. 15. With this timing of compression cycles and blowdown cycles, two turbine nozzles are delivering fully reacted and cooled gas, at all times, to the turbine blades, and turbine shaft torque variations are small. Thus a smaller turbine shaft flywheel, 91, will be adequate to keep turbine output shaft, 110, speed variations within usable limits.

(11) For the FIG. 14 example form of coke burning engine, liquid water is mixed into the fully reacted gases leaving the final reactors, 22, in order to reduce the gas temperature to values acceptable for available turbine nozzle and blade materials. A cooling water pump, 174, reciprocated by the water pump cam, 175, driven by the camshaft, 168, pumps water from a water supply source, 176, into the exit end of the final reactor, 22, as shown on FIG. 14, and in more detail on FIG. 13. Four separate cooling water pumps and cams are used, one for each two step coke burning unit, the four separate water pump cams being timed to deliver the liquid water into each final reactor during and throughout each blowdown cycle time interval.

(12) The theoretical cycle efficiency of a coke burning engine of this invention is reduced when liquid water is thusly used as a coolant fluid due to the increase of exhaust loss to the latent heat of evaporation of the liquid water. In effect the water carries out a steam engine cycle, using a direct contact steam boiler, and the work of this steam cycle is somewhat less than the work of a corresponding coolant air cycle, as used on the FIG. 1 form of coke burning engine. This theoretical loss of cycle efficiency can be largely offset by using a water pump cam profile, 177, which proportions the coolant water flow rate, to the fully reacted gas flow rate, so as to maintain an essentially constant temperature of the fully reacted and cooled gas at turbine inlet, throughout the blowdown cycle. Sizing the water coolant pump cams, for this constant turbine inlet temperature case, is described hereinbelow in the sizing section and the resulting water pump cam profile illustrated in FIG. 27 and FIG. 28.

Use of liquid water as coolant substantially reduces the size and cost of the air compression unit and correspondingly reduces losses due to compressor efficiency. Liquid water coolant can be used in all forms of this invention as can air coolant.

E. The Air Compressor

Positive displacement air compressors are used with coke burning engines of this invention, such as conventional piston and cylinder compressors, and sliding vane rotary compressors. Conventional piston and cylinder air compressors may be preferred, when high compression cycle pressures are used, in order to achieve high fuel efficiency of the coke burning engine.

The terminology used herein, and in the claims, to describe air compression units and their connections to coke burning units, which comprise one or more piston and cylinder air compressors, can be described by reference to the example air compression unit shown in FIG. 18. This FIG. 18 example air compression unit is a two stage, double acting air compressor, comprising two piston and cylinder air compressors, C1 and C2. Each piston and cylinder air compressor comprises two stages, a first low pressure air inlet stage, 78, 71, and a last high pressure air discharge stage, 80, 73. The low pressure piston, 81, and the high pressure piston, 89, are driven together via the common piston rod, 96, connected via the connecting rod, 94, to the crank, 92, driven in turn from the compressor crankshaft, 54.

Each stage of a piston and cylinder air compressor comprises a piston, 81, reciprocating sealably within the closed end, 74, of a cylinder, 75. The closed end, 74, comprises an air inlet pipe, 76, with suction check valve, 77, open only during each suction stroke of the piston, 81, and an air delivery pipe, 82, with delivery check valve, 83, open only during each compression stroke of the piston, 81. For double acting pistons, as shown in FIG. 18, both cylinder ends are closed and each piston serves two separate compressors.

Air from the atmosphere enters each separate piston and cylinder air compressor only via the air inlet pipe of the first low pressure stage, during each suction stroke of the first low pressure stage piston.

Compressed air is discharged from each separate piston and cylinder air compressor only via the air delivery pipe of the last high pressure stage, during each compression stroke of the last high pressure stage piston.

An intermediate pressure stage, of a multistage piston and cylinder air compressor, if used, receives air from the preceding next lower pressure stage, during each suction stroke of the piston, and delivers air into the following next higher pressure stage, during each compression stroke of the piston. Since the displacement volume of each following stage, of a multistage air compressor, is smaller than that of the preceding stage, the air pressure is increased at each interstage transfer.

In this way, use of multistage, piston and cylinder air compressors, with coke burning engines of this invention, permits operation at higher pressures with higher-fuel efficiency.

The rotating air compressor crankshaft, 54, and crank, 92, reciprocate the pistons, 81, 89, within their cylinders via the connecting rod, 94, and piston rods, 96.

Many different types of air compressors can be used, and in different combinations, with coke burning engines of this invention, and the FIG. 18 type of air compression unit is only one illustrated example.

Each delivery pipe, of the last high pressure stage, of each piston and cylinder air compressor, is connected to each two step coke burning unit, one at a time, via compression cycle valves, and only during the compression stroke of the piston of the last high pressure stage, as described hereinbelow.

For coke burning engines of this invention, intercoolers between air compressor stages, are not needed on multistage air compressors, since the compressed air is utilized immediately for reaction, rather than being stored in a compressed air tank.

F. The Two Step Coke Burning Unit

As defined herein and in the claims, each separate two step coke burning unit comprises, a coke reactor chamber, a secondary air chamber, a final reactor chamber with igniter, a refuel mechanism and an ash removal mechanism on the coke reactor, one or more compression cycle valves connecting to one or more piston and cylinder air compressors, two blowdown cycle valves interconnecting the chambers, an inlet blowdown cycle valve connecting the final reactor chamber to but a single expander engine inlet. Preferably each separate two step coke burning unit additionally comprises a cooling fluid supply and cooling fluid blowdown cycle valve, for admitting cooling fluid into the final reactor chamber. These features of each two step coke burning unit are illustrated in the schematic diagram of FIG. 19 as follows:

(k) The coke reactor chamber, 8, is kept filled with chunks of coke fuel by the refuel mechanism, 16, at the top of the coke reactor, and ashes are removed from the bottom of the coke reactor chamber by the ash removal mechanism, 18. The inner surface of the pressure vessel container, 70, of the coke reactor chamber, 8, is lined with a high temperature ceramic insulating layer, 67, to protect the pressure vessel container, 70, from the hot reacting coke chunks, and to maintain a high temperature of the reacting coke chunks.

(l) The secondary air chamber, 10, is preferably arranged, as shown in FIG. 19, to enclose the coke reactor chamber, 8. In this way the pressure stresses are largely carried by the colder secondary air chamber pressure vessel enclosure, 69, rather than by the hotter coke reactor pressure vessel container, 70.

(m) The final reactor chamber, 22, may also comprise a high temperature ceramic liner, 68, on the inner surface of the pressure vessel container, 114, to protect this container from the very high temperature fully reacted gases formed in the final reactor chamber. The igniter, 24, is used to ignite fuel air mixtures, entering the final reactor chamber via the fuel air mixture blowdown cycle valve, 12, and fuel air mixture inlet, 115, during each blowdown cycle time period. Details of the final reactor are described hereinbelow.

(n) Air is compressed into the coke reactor chamber, 8, the secondary air chamber, 10, and the final reactor, 22, during each compression cycle time period, via the common air intake manifold, 46, and separate air intake pipes, 20, 11, and 45, respectively, and the compression cycle valves, a, b, only one valve at a time. The blowdown cycle valves, 12, 14, 15, are closed during each compression cycle time period, so that pressure rise in the coke reactor chamber will force air deeply into the coke pore spaces. Preferably the air enters the bottom of the coke reactor chamber, where consequent ash cooling can minimize klinker formation.

(o) The two step coke burning unit of FIG. 19 can be operated with the air compression unit of FIG. 18, by connecting the compression cycle valve (a) to the air delivery pipe, 90, of piston and cylinder air compressor, C1, connecting compression cycle valve (b) to the air delivery pipe, 97, of piston and cylinder air compressor, C2. During each compression cycle time period these compression cycle valves are opened, one at a time, in the sequence, a, b, so that the two step coke burning unit of FIG. 19 is connected in sequence to each piston and cylinder air compressor delivery pipe in the sequence of increasing air delivery pressure, C1, C2. Each piston and cylinder air compressor is thusly connected to a two step coke burning unit only during a compression stroke of the piston of the connected compressor.

(p) During engine startup those primary air portions, being compressed into the coke reactor, can be preheated by the startup air heater, 9. Thusly heated air rapidly heats the coke chunks in the coke reactor, since the large internal pore surfaces of the coke are reached by the compression of the hot air thereinto. As coke chunk temperatures reach and exceed a temperature of about 2000° R, the oxygen in the air commences reacting with the coke. The reaction heat of this coke and oxygen reaction soon brings the coke up to rapid reaction temperatures of about 2500° R. Thereafter the coke and oxygen reaction is self sustaining, and the startup heater, 9, can be turned off. Electric heaters can be used as startup air heaters. A starting fuel can be mixed with a portion of the primary compressed air entering the coke reactor, and the resulting fuel air mixture ignited, to create a high temperature gas, containing some oxygen as the coke preheating gas at startup.

(q) After startup, the oxygen in the primary air being compressed into the coke reactor, reacts rapidly with the coke chunk outer surface area, and particularly with the much larger coke chunk inner pore surface area, to form both carbon monoxide and carbon dioxide, during each compression cycle time period. Some of this carbon dioxide reacts further, with the adjacent carbon in the coke pore spaces, to form additional carbon monoxide. In this way almost all of the oxygen, in the air compressed into the coke reactor, is fully reacted with carbon, and carbon monoxide is the principal reaction product in the primary reacted gas, thus formed in the coke reactor during each compression cycle time period.

(r) The cooling fluid connection, 13, connects the final reaction chamber, 22, to a source of cooling fluid, such as water or compressed air, at pressure at least equal to the pressure in the final reactor.

(s) The expander inlet blowdown cycle valve, 14, when open, connects the final reaction chamber, 22, to a single separate expander engine inlet.

(t) At the end of each compression cycle time period, all compression cycle valves, a, b, are closed, and all blowdown cycle valves, 12, 14, 15, are opened to commence a blowdown cycle time period.

Primary reacted gas now flows out of the top of the coke reactor, 8, and is mixed with secondary air flowing out of the secondary air chamber, 10, via the secondary air blowdown cycle valve, 15, to form a fuel air mixture in the fuel air mixture delivery pipe, 139. This fuel air mixture flows via the now open fuel air mixture blowdown cycle valve, 12, into the final reactor chamber, 22, and is therein ignited by the igniter, 24. The carbon monoxide in the primary reacted gas leaving the coke reactor, 8, burns with secondary air to carbon dioxide in the final reactor, 22, to form fully reacted gases.

The igniter, 24, can be an electric spark igniter or other igniter as described hereinbelow. The fuel air mixture flowing through the fuel air mixture blowdown cycle valve, 12, is appreciably colder than the hot primary reacted gases formed in the coke reactor, due to premixing with the much lower temperature secondary air, and thus unusual valve materials are not required for the fuel air mixture blowdown cycle valve, 12.

(u) The fully reacted gases flow out of the final reactor, 22, and into a single separate expander inlet of the expander engine, via the now open expander inlet blowdown cycle valve, 14, The flow of these fully reacted gases through the expander engine produces a power output, a portion of which can be used to drive the air compressor of FIG. 18.

(v) The temperature of the fully reacted gas formed in the final reactor, 22, is preferably reduced well below the very high temperatures reached during the final reaction of carbon monoxide with secondary air to form carbon dioxide, before these gases pass through the expander inlet blowdown cycle valve, 14. Cooling fluid, from a source of cooling fluid, can be mixed with the fully reacted gases in the final reactor via the cooling fluid connection, 13, during each blowdown cycle time period. By passing the entering cooling fluid, first through a jacket surrounding the final reactor, and then into the final reacted gases inside the final reactor, the temperature of the pressure vessel shell of the final reactor can be kept adequately low. In some applications of coke burning engines, the fully reacted gas, formed in the final reactor, can be cooled by passing this fully reacted gas through the gas side of a steam boiler, before passing the thusly cooled gas to the expander inlet. Steam, thus generated at high pressure, can flow through the expander engine to augment the power generated by the fully reacted gas flow therethrough.

(w) To assure essentially complete reaction of the carbon monoxide, formed in the coke reactor, 8, into carbon dioxide in the final reactor, 22, an adequate supply of secondary air from the secondary air chamber, 10, is required during blowdown and final reaction. This requires a proper ratio of the secondary air chamber volume, to the coke reactor gas space volume portion of the total coke reactor chamber volume. Since coke fuels vary in porosity, the coke reactor gas space volume will also vary between coke fuels. Hence a secondary air chamber volume adjustor, 66, may be preferred, where a wide variety of coke fuels are to be used. The volume of the secondary air chamber can be adjusted by moving the piston, 64, in the cylinder, 65.

G. Final Reactor and Igniter

One example final reactor, 22, is shown schematically in FIG. 20, to illustrate several features as follows:

(1) The pressure vessel shell, 114, enclosing the final reactor chamber, 22, is preferably fitted with a high temperature ceramic liner, 28. The pressure vessel shell, 114, can be additionally protected by passing the needed cooling fluid through a pressure vessel jacket, 116, surrounding the shell, 114.

(2) At the start of each blowdown cycle time period the fuel air mixture blowdown cycle valve, 12, and the expander inlet blowdown cycle valve, 14, are opened and the fuel air mixture of primary reacted gas and secondary air, flows into the final reactor chamber, 22, to be ignited and burned to fully reacted gas, which flows via pipe, 117, into one expander engine inlet.

(3) Two types of igniter, 24, are shown in FIG. 20, a high voltage spark igniter with spark electrodes, 246, and an alternative liquid fuel compression ignition igniter, 241, 242, 243, 244, 245.

(4) When only coke fuel is placed into the coke reactor, the resulting fuel air mixture, entering the final reactor, has carbon monoxide as the principal fuel. These carbon monoxide fuel air mixtures have rather slow burning velocities, and a large final reactor volume is needed to assure complete fuel burnup to carbon dioxide, if only a single spark igniter, 246, is used.

(5) The alternative liquid fuel compression ignition igniter utilizes a high cetane number liquid hydrocarbon fuel, delivered at high pressure from the igniter fuel tank, 241, into the igniter fuel common rail, 243, by the igniter fuel pump, 242. During each blowdown cycle time period, the igniter fuel blowdown cycle valve, 244, is also open, and igniter fuel is sprayed by the igniter fuel nozzle, 245, into a large number of small separate liquid droplets, suspended in the fuel air mixture, as it enters the final reactor.

(6) Within the high temperature and high pressure of the fuel air mixture, each of these high cetane number fuel droplets will compression ignite, after a delay time interval. In this way, a large number of separate ignition regions are created, distributed throughout the fuel air mixture, and each resulting separate flame front within the fuel air mixture has only a short path length to complete the burnup of fuel air mixture in its vicinity. Rapid and complete burnup of the carbon monoxide to carbon dioxide can thus be achieved within a moderate volume of final reactor, by such use of this liquid fuel compression ignition igniter.

(7) A short delay time interval, preceding compression ignition, is preferred, in order to further reduce required final reactor volume. A reasonably high cetane number igniter fuel can be used, such as number two diesel fuel, or preferably number two diesel fuel with cetane improver additives, such as amyl nitrate or hydrocarbon peroxides.

(8) The ratio of igniter fuel energy release to secondary reaction energy release, from the fuel air mixture, can be very low, of the order of a few percent, since the igniter fuel is only needed to create many small widely dispersed ignition regions. An equivalent extra excess secondary air quantity can be added to provide the air for the igniter fuel burnup.

(9) The igniter fuel system can also be used as an energy source during cold starting of a coke burning engine, when the coke fuel is cold and non reacting. A separate igniter fuel starter spray nozzle, 247, of higher igniter fuel flow rate, is added and connected via the igniter fuel starter valve, 248, to the igniter fuel blowdown cycle valve, 244, so that during engine starting, the igniter fuel starter valve, 248, is opened and additional igniter fuel is sprayed into, and ignited within, the final reactor chamber, 22, as illustrated on FIG. 20. The spark igniter, 246, is used during engine starting to ignite the resulting sprays of igniter fuel from both the igniter fuel spray nozzle, 245, and the igniter fuel starter spray nozzle, 247. The igniter fuel starter valve, 248, is opened only during engine starting.

(10) During engine cold starting, the hot burned gases, formed by igniter fuel burnup, can drive the expander engine to supply power to drive the air compressor. A portion, 249, of the expander engine, 101, hot exhaust gas, 250, as shown on FIG. 14, can be used to preheat the intake air entering the first low pressure stage of each piston and cylinder air compressor. As shown on FIG. 16, one starting heat exchanger, 251, 252, 253, 254, is added to each intake pipe of each first low pressure stage of each piston and cylinder air compressor, C5, C6, C7, C8. The atmospheric air entering the compressor, 255, 256, 257, 258, is passed through the cold side of these heat exchangers, and the expander engine exhaust gas portion, 249, is passed through the hot side, during the engine starting. The flow of hot expander engine exhaust gas through the starting heat exchangers, as well as the flow of igniter fuel into the igniter fuel starter spray nozzle, 247, is stopped after the coke fuel in the coke reactor reaches the rapid reaction temperature and the engine is started.

(11) The cooling fluid connection, 13, admits cooling fluid into the final reactor, 22, in order to reduce the temperature of the fully reacted gases to a valve usable with the expander materials. Compressed air or liquid water are examples of suitable cooling fluids and apparatus for their use is described hereinbelow.

(12) High pressure steam, from an external source, can be used as a coolant fluid to reduce the temperature of the fully reacted gases formed in the secondary reaction. The expander exhaust gas temperature will usually be inadequate to generate the amount of high pressure steam needed for this purpose. On the other hand, the expander exhaust gas can be used to generate sufficient steam, at high pressure, for use as a reactant in the coke reactor. High pressure steam reactant could generate hydrogen fuel, when admitted into the primary reactor during each compression cycle, and this would increase the burning velocity of the primary reacted gas in the secondary reaction in the final reactor during each blowdown cycle.

H. Refuel and Ash Removal Mechanisms

The refuel mechanism, 16, functions to keep the coke reactor chamber, 8, filled with chunks of coke fuel by periodically transferring coke chunks, from a source into the top of the coke reactor chamber. Preferably the coke reactor chamber is kept essentially completely filled with coke chunks, in order to minimize void spaces, and thus maximize coke surface area available for reaction with compressed air. Various types of refuel mechanism can be used, such as are described in U.S. Pat. No. 5,485,812, Firey, 23 Jan. 1996, and U.S. Pat. No. 4,653,436, Firey, 31 Mar. 1987. These mechanisms are well suited for use with coke burning engines of this invention, since they maintain a steady mechanical force on the coke chunks, to prevent bouncing, and add fuel when the coke chunk level drops a small amount, thus keeping the coke reactor essentially filled.

Lock hopper valves can alternatively be used as refuel mechanisms for coke burning engines of this invention, but do not maintain a steady force on the coke chunks. Examples of lock hopper valves are shown in the following references:
"Fuel Gasification," American Chemical Soc., 1967, FIG. 1, page 33;
"Gas Engines and Producers," L. Marks and H. McDewell, American Technical Soc., 1919, FIG. 8, page 18 of Section 2.

The ash removal mechanism, 18, functions to remove ashes from the coke reactor chamber, 8, by periodically transferring ashes, from the bottom of the coke reactor chamber, into an external receiver of ashes. Various types of ash removal mechanisms, can be used such as are described in U.S. Pat. No. 5,613,626, Firey, 25 Mar. 1997. These are well suited for use with coke burning engines of this invention. This type of solids transfer mechanism can also be used as a refuel mechanism. Where several separate coke burning units are used, as in the FIG. 14 form of coke burning engine, the two step solids transfer process, used in U.S. Pat. No. 5,613,626, can comprise, a first pressurized transfer mechanism for each coke reactor chamber, which transfers ashes into a second transfer mechanism serving all of the coke reactor chambers.

I. Fuels for Engines of This Invention

Highly porous solid fuel chunks are preferred, for use in engines of this invention, since the large surface area inside the pores is needed to achieve adequate reaction rates, instead of resorting to coal pulverization to achieve this needed reaction surface area. Coke fuels made from coal, or residual petroleum fuels, or wood, or biomass materials, are suitable for use in coke burning engines of this invention.

Coal has been transformed into coke, since the early Iron Age, using various devolatilization processes. Tar fuels are also created by these processes, and can be used in slurry form as diesel engine fuel, as described, for example, in my following U.S. Patents and patent applications:
(1) U.S. Pat. No. 7,281,500, entitled, Supplementary Slurry Fuel Atomizer and Supply System, issued 16 Oct. 2007.
(2) U.S. Pat. No. 7,418,927, entitled, Common Rail Supplementary Atomizer for Piston Engines, issued 2 Sep. 2008.
(3) U.S. patent application Ser. No. 12/799,209, entitled, Common Rail Slurry Fuel Injection System.

A modified process for creating coke fuels from coal or biomass material is described in my U.S. patent application Ser. No. 12/590,333, entitled Cyclic Batch Coal Devolatilization Apparatus.

In these ways, coal and biomass can be efficiently used to fuel internal combustion engines, with devolatilized tars and tar liquids being used in modified diesel engines, and the coke being used in engines of this invention.

The primary reacted gas, formed in the coke reactor chamber, is rich in carbon monoxide as the fuel gas. Carbon monoxide in air fuel air mixtures, such as are supplied into the final reaction chamber, are known to be somewhat difficult to ignite. The ignition of the fuel air mixture, entering the final reactor, can be assisted by adding a small portion of high volatile matter bituminous coal chunks into the coke fuel being refueled into the coke reactor chamber. The hot primary reacted gases, passing over these bituminous coal portions during blowdown, will devolatilize the coal, and these volatile matter gases, thusly added into the primary reacted gases, will improve the ignitability of the fuel air mixture supplied to the final reactor. The remaining devolatilized coal is then a coke chunk, which is further reacted to carbon monoxide in the coke reactor chamber. Other igniter fuels can alternatively be used.

Other carbonaceous fuels can also be used in engines of this invention, such as charcoal or a blend of charcoal and coke. Herein and in the claims the various fuels usable in a coke burning engine of the invention are labeled as carbonaceous fuel chunks, a portion of which are porous. Corrosive wear of piston engine cylinder liners and piston rings, due to fuel sulfur, requires a fuel containing some hydrogen, to form the water needed to collect the sulfur oxides into the lubricating oil on the cylinder wall. The carbon monoxide fuel supplied to piston engines of this invention, being free of hydrogen, will thus cause little or no wear, even when using coke fuels of high sulfur content, at low engine jacket temperature, as described in the following reference: *Studies of the Effects of Water on Gasoline Engine Wear at Low Temperature*, Firey, Newcomb, Nieman and Sugges, Wear, Volume. 10, 1967, p 33-48

J. Industrial Uses of the Invention

Coke burning engines of this invention can be used advantageously in those segments of the transportation industry, such as railroad locomotives, and medium marine engines, where the complexity and cost of the engine, and fuel handling facilities, can be fully offset by the large fuel cost advantage over current diesel fuel usage. Fuel costs vary, but coal and coke fuel will usually enjoy a roughly 10 to 1 price advantage, per unit of energy, over diesel fuel. This price advantage is supplemented by the greater reliability of a domestic supply source, and the very large domestic reserves of coal, from which coke can be made.

In Coke burning engines of this invention the ashes are removed from the coke reactor chamber, and thus do not enter the engine components of the air compressor, and the turbine engine. Thus the ash and other wear problems of the pulverized coal in water slurry engines are avoided.

A high cycle pressure, and consequent high cycle efficiency, can be obtained while using coke reactor chambers of the large volume needed for adequate coke surface area of reaction, since several separate steps of compression can be used during each compression cycle time period. The cycle efficiency limitations of the Char and Oil Burning Engines of U.S. Pat. No. 4,412,511, are thus avoided. The high fuel efficiency obtained by use of high cycle pressures is particularly assisted by the complete expansion to atmospheric exhaust pressure available with turbine engine expanders.

Coke Burning Engine Sizing

The number of two step coke burning units (ncbu) and the number of separate piston and cylinder air compressors (nac) in the air compression unit, can be arbitrarily selected. A larger number of two step coke burning units increases engine cost and complexity, but reduces expander power output shaft torque variations. A larger number of separate piston and cylinder air compressors can be used to produce higher compression cycle pressures, and a consequent higher engine fuel efficiency, but increases engine cost and complexity.

The maximum operating revolutions per minute (RPM) of the air compressor crankshaft can also be selected arbitrarily. Higher values of (RPM) will yield smaller air compressors of lower compression efficiency. Lower values of air compressor crankshaft RPM can yield more complete reaction of primary air with coke fuel, in the coke reactor, due to longer contact time periods. More complete reaction of primary air with coke fuel also results from a larger number of separate piston and cylinder air compressors.

The number of two step coke burning units (ncbu) is to be at least equal to the number of separate piston and cylinder air compressors (nac) so that each air compressor final last stage is always connected to but one two step coke burning unit during each delivery compression stroke of the last stage piston.

A coke burning engine of this invention can be sized for an intended rated net horsepower output (NHP), starting from the following approximate relations:

$$(NHP) = [(XHP) - (CHP)] \cong \frac{(A)(B)(RPM)(ATEFF)}{42,42}$$

Wherein:
(XHP)=Net expander horsepower output.
(CHP)=Air compression means horsepower required to drive at rated air compressor crankshaft (RPM)
(A)=(man)(QR)(PFR)
(man)=Primary air compressed into a single coke reactor during each compression cycle time interval, lb mols air per cycle per reactor, a function of coke reactor volume and cycle pressures.
(QR)=Heat of reaction of the complete reaction of coke fuel with air to form fully reacted carbon dioxide, Btu per lb mol of primary air reacted.
(PFR)=Fraction of primary air actually reacted with coke in the coke reactor. Usually assumed close to 1.0.
(B)=Number of Compression Cycles per air compressor crankshaft revolution. Also the number of blowdown cycles per air compressor crankshaft revolution. Total number for all air compressor groups.

An air compressor group contains one or more piston and cylinder air compressors, all of which compress air into all of an equal or greater numbers of coke burning units, one coke burning unit at a time for each piston and cylinder air compressor.

For each compressor group the number of compression cycles per air compressor crankshaft revolution can be determined from the cycle timing diagram or as follows:

$$(B) = \left(\frac{nac}{ncsc}\right)$$

(nac)=Number of separate piston and cylinder air compressors in the group.
(ncsc)=Number of air compressor piston delivery strokes from last air compressor stages into each coke burning unit during each compression cycle time interval.
(ATEFF)=Actual thermal efficiency of the coke burning engine which is unknown until the cycle calculations are completed.

Net engine torque varies linearly with the primary air quantity per compression cycle (man), which varies linearly with the gas space volume in each coke reactor, (VCOR), including the pore spaces inside the coke chunks, since the amount of coke reacted per compression cycle varies essentially linearly with the air quantity per cycle (man). Hence the air compressor volume, the final reactor volume, the secondary air chamber volume, the cooling air chamber volume, and the expander engine size, all vary linearly with the coke reactor gas space volume, (VCOR). A reasonably direct sizing procedure can thus use an arbitrary initial value for (VCOR), for example, 1.0 cubic feet, and after completing the cycle calculations to determine efficiency, all sizes can be rescaled linearly to the intended design value of net engine torque. Net engine power will vary essentially linearly with air compressor crankshaft RPM, since the time rate of coke reaction varies linearly with the number of compression cycles per minute.

The compression cycle maximum pressure (pf), and minimum pressure, (ps), are also selected arbitrarily. Increasing both the maximum and minimum pressures increases the engine thermal efficiency. Increasing the difference between maximum and minimum pressures increases the amount of coke reacted during each compression cycle time interval, and increases net engine torque. Unusually low minimum cycle pressures can create excessive quantities of excess secondary air in the final reactor as described hereinbelow.

K. The Coke Reactor

Each increment of primary air (dman), is compressed into the gas space of the coke reactor at a different pressure (Pn), and hence at a different air temperature, (Tmas). Each primary air increment then reacts with the hot coke, to form largely carbon monoxide, and release the heat of this primary reaction (QRP). The resulting reacted gas increment (dmRn), expands and compresses additionally those reacted gases already inside the coke reactor. Subsequently, each such reacted gas increment is further compressed by similar reaction and expansion of later entering primary air increments. This air compression, coke reaction, and related gas compression process is illustrated graphically on FIG. 21, for a coke reactor compression cycle, whose minimum cycle pressure, (ps), is 250 psia, and whose maximum cycle pressure (Pf), is 500 psia. The first primary air increment to enter the coke reactor reacts at the lowest temperature, but reaches the highest temperature at the end of compression at maximum pressure (Pf). This first primary reacted gas increment is also compressed most deeply into the pore spaces of the coke fuel, and will be the last primary reacted gas increment to leave the coke reactor during blowdown. The last primary air increment to enter the coke reactor reacts at the highest temperature, but is at the lowest temperature at the end of compression at maximum pressure. This last primary reacted gas increment is also compressed least deeply into the coke fuel pores, and will be the first primary reacted gas increment to leave the coke reactor during blowdown.

An approximate analysis of this primary air compression, coke reaction and expansion, and reacted gas further compression process, for many separate primary air increments, yields the following coke reactor sizing relations:

$$\frac{d(man)}{d(pn)} = \frac{(6.22)(VCOR)}{(R)[(QRP)+(CP)(TMAS)]}$$

$$(man) = \int_{ps}^{pf}\left[\frac{d(man)}{d(Pn)}\right](dPn), \text{ lb mols primary air per cycle}$$

Wherein:
d(man)=Primary air increment, lb. mols air
d(Pn)=Coke reactor pressure increment due to compression, reaction, and expansion of d(man), psfa.
(VCOR)=Gas space volume in each coke reactor, cubic feet.
(R)=Gas constant=1545 ft. lbsf per lb.mol per degree Rankine.
(QRP)=Heat of reaction of primary air with coke to form carbon monoxide, Btu per lb mol of primary air.
(CP)=Specific heat at constant pressure for air, Btu per lb mol air per degree Rankine.
(Tmas)=Temperature of compressed air at primary air increment entry into coke reactor, degrees Rankine.

$$(Tmas) = (TO)\left(\frac{Pn}{Po}\right)^{\frac{KA-1}{KA}}$$

(TO)=Air temperature at air compressor intake, degrees Rankine.
(Pn)=Pressure in the coke reactor, psfa, at which primary air increment entered and reacted, and varying between (Ps) and PF).
(KA)=Isentropic compression exponent for air.
(Ps)=Minimum pressure in the coke reactor at the start of each compression cycle, psfa.
(Pf)=Maximum pressure in the coke reactor at the end of each compression cycle, psfa.

Analytical integration of this relation for primary air quantity per cycle (man), yields an infinite series, whose convergence appears uncertain. Numerical integration can be used, or graphical integration, as illustrated in FIG. 22. In FIG. 22, an example single compression cycle, of a coke reactor having a one cubic foot gas space volume (VCOR), is illustrated, with coke reactor compression starting at (Ps)=250 psia and ending at (PF)=500 psia. The area under the line for (dman/dPn) can be measured as equal to the integral for (man) or can be estimated by the following approximate relation assuming a straight line:

$$(man) \cong \frac{(6.22)(VCOR)[(pf)-(ps)]}{(R)[(QRP)+(CP)(Tavg)]}$$

$$(Tavg) = \left[\frac{pf+ps}{2po}\right]^{\frac{KA-1}{KA}}$$

For this FIG. 22 example:

$$\frac{(man)}{(VCOR)} = .00458 \text{ lb mol primary air,}$$

mols primary air, per compression cycle, per cubic foot gas space volume in coke reactor, for the example compression process illustrated on FIG. 21.

The relation of (dman)/(dpn), to compression pressure (Pn) is not exactly a straight line. Thus, for coke burning engine compression cycles greatly different from that illustrated in FIG. 22, full numerical or graphical integration may be needed.

Solving for coke reactor gas space volume (VCOR), and substituting for primary air mass required per cycle (man), yields the following relations for sizing the coke reactor:

$$(VCOR) \cong \frac{(6.82)(NHP)(R)[(QRP)+(CP)(Tavg)]}{(B)(RPM)(ATEFF)(QR)(PFR)(pf-ps)}$$

Of the total primary air mass compressed into the coke reactor (man), very nearly all will likely react with the large carbon surface area available in the pores of the coke chunks. Hence, for preliminary coke burning engine sizing, the fraction of primary air actually reacted (PFR) can be estimated as lying between about 0.90 and 1.0.

The total interior volume of each coke reactor container (VSCO) needed to supply the required gas space volume (VCOR) and enclose the coke chunks, can be estimated from the following approximate relation:

$$(VSCO) = \frac{(VCOR)}{[1-(CPF)+(CPF)(CPV)]}$$

Wherein:
(VSCO)=Coke reactor container interior volume, cu.ft.
(CPF)=Coke chunk packing factor, ratio of total coke chunk exterior volume to container interior volume.
(CPV)=Coke pore volume fraction of coke chunk exterior volume.

Experiments indicate that for coke chunks of usual shape, and roughly equal size, the packing factor (CPF) is about 0.74. Theoretically, higher packing factors could be obtained with coke chunks having two or more selected sizes to fill in the interchunk voids. But the uncertain cooperation of these smaller chunks is required.

Different coke fuels can vary appreciably in pore volume fraction (CPV). For use in engines of this invention, cokes may be preferred whose pore volume fraction is of the order of 0.50, or greater, so that more of the primary reaction to carbon monoxide occurs within the carbon rich pore spaces, rather than within the interchunk spaces.

Each mol of primary air, compressed into the coke reactor during compression, reacts therein to form approximately 1.21 mols of a carbon monoxide rich primary reacted gas.

$$\left[\frac{d(mRn)}{dpn}\right] = 1.21\left[\frac{d(\text{man})}{dpn}\right]$$

d(mRn)=Primary reacted gas increment, lb mols.

A blowdown cycle follows after the end of each compression cycle. Since it was the addition of each air mass increment, and its reaction with coke to form an increment of primary reacted gas (dmRn), which caused the pressure rise in the coke reactor, the removal of each primary reacted gas increment during blowdown will cause an approximately equal pressure drop.

$$\frac{d(mRn)}{dPB} = \frac{(dmRn)}{(dpn)} = 1.21\left[\frac{d(\text{man})}{dpn}\right]$$

$$\frac{d(mRn)}{dPB} = \frac{(7.53)(VCOR)}{(R)\left[(QRP)+(CP)(TO)\left[\frac{PB}{PO}\right]^{\frac{KA-1}{KA}}\right]}$$

Wherein:
(PB)=Pressure in the coke reactor during blowdown, psfa, a variable.

This equivalence of blowdown flow rate to compression flow rate assumes that the first primary reacted gas increment, formed during compression, is compressed deeply into the pore spaces, and that the last primary reacted gas increment formed during compression is at the exit end of each pore space. As a result the first gas to leave the coke reactor during blowdown tends to be the last gas formed during compression, and the last gas to leave the coke reactor during blowdown tends to be the first gas formed during compression. Some mixing of reacted gas increments must surely occur during both compression and blowdown. However, for purposes of preliminary sizing of a coke burning engine of this invention, the effects of such primary reacted gas mixing are not included in the approximate sizing relations presented herein.

The temperature of the primary reacted gas increment, $$\frac{dmRn}{dPB},$$

when leaving the coke reactor during blowdown, (TmRn), can be estimated from the following approximate relation:

$$(TmRn) \cong \frac{\left[(QRP)+(CPB)(TO)\left(\frac{PB}{PO}\right)^{\frac{K-1}{K}}\right]}{(10.37)}; °R$$

As each primary reacted gas increment leaves the coke reactor, during blowdown, it is mixed with an increment of secondary air from the secondary air chamber. This resultant fuel air mixture increment flows into the final reactor, where it is ignited and burned to a fully reacted gas increment. So that essentially all of the carbon monoxide fuel, in each primary reacted gas increment leaving the coke reactor, be reacted to carbon dioxide in each fully reacted gas increment, each secondary air increment needs to provide at least a stoichiometric air quantity, and preferably an excess air quantity, for that primary reacted gas increment with which it is mixed during blowdown. The ratio of secondary air flow rate to primary reacted gas flow rate varies during blowdown, as described hereinbelow.

L. The Secondary Air Chamber

The total air mass inside the secondary air chamber at the end of compression consists of a residual air mass (masr), and a secondary reaction air mass, (mas):

$$(mas)+(masr) = \frac{(VSAC)(Pf)}{(R)(Tf)} = \frac{(VSAC)(Pf)}{(R)(TO)}\left(\frac{Po}{Pf}\right)^{\frac{KA-1}{KA}}$$

Wherein:
(VSAC)=Volume of secondary air chamber, cu.ft.
(Tf)=Secondary air temperature at the end of compression, at (Pf) pressure, and at start of blowdown, ° R, $$(Tf) = (To)\left(\frac{Pf}{Po}\right)^{\frac{KA-1}{KA}}.$$

(masr)=Residual air mass remaining inside the secondary air chamber at the end of blowdown at (Ps) pressure; lb mols air per cycle.
(mas)=Secondary reaction air, which leaves the secondary air chamber during blowdown, to mix and react with primary reacted gas, and is replaced in the secondary air chamber by the air compressor during each compression cycle, lb mols air per cycle.

$$(masr) = \left(\frac{VSAC}{RTo}\right)^{(PS)}\left(\frac{PO}{PS}\right)^{\frac{KA-1}{KA}}$$

$$(mas) = \frac{(VSAC)(PO)}{(RTo)}\left[\left(\frac{Pf}{Po}\right)^{\frac{1}{KA}} - \left(\frac{ps}{po}\right)^{\frac{1}{KA}}\right]$$

The pressure rate of flow of secondary air during blowdown, dmas/dPB, is as follows:

$$\left(\frac{dmas}{dPB}\right) = \frac{(VSAC)}{(KA)(RTo)}\left(\frac{PO}{PB}\right)^{\frac{KA-1}{KA}}$$

During blowdown, the coke reactor and secondary air chamber are fully open flow connected together, via the secondary air blowdown cycle valve, and blowdown pressure decrease equally in both chambers. During blowdown, primary reacted gas and secondary reaction air flow together to form a fuel gas in air mixture, which flows into the final reactor, via the fuel air mixture blowdown cycle valve. To assure full burnup of the carbon monoxide fuel, in the primary reacted gas, to carbon dioxide, during final burnup in the final reactor, the pressure rate of flow of secondary reaction air needs to be somewhat in excess of stoichiometric relative to the pressure rate of flow of primary reacted gas, in order to supply some excess air throughout blowdown. But this excess air is to remain within the spark ignitability limits of carbon monoxide. The required ratio of secondary air chamber volume, (VSAC), to coke reactor gas space volume (VCOR), is determined by these requirements on the ratio of the pressure rate of flow of secondary reaction air (dmas/dPB), to the pressure rate of flow of primary reacted gas (dmRN/dPB) during blowdown:

$$\frac{\left(\frac{dmas}{dPB}\right)}{\left(\frac{dmRn}{dPB}\right)} = \frac{(VSAC)}{(VCOR)} \frac{\left[(QRP)\left(\frac{PO}{PB}\right)^{\frac{KA-1}{KA}} + (CP)(TO)\right]}{(7.53)(KA)(TO)}$$

$$= \frac{(dmas)}{(dmRn)}$$

$$= \frac{4.76}{5.76}(1 + XSA)$$

Wherein:
(XSA)=Excess Air Fraction, which varies during blowdown, increasing as blowdown progresses and blowdown pressure (PB) decreases.

Minimum excess air (XSA Min), occurs at the start of blowdown, with (PB)=(Pf), and this is the design point for selecting the ratio of secondary air volume, (VSAC), to coke reactor gas space volume (VCOR), in order to assure adequate excess air throughout the blowdown cycle.

$$\left(\frac{dmas}{dmRN}\right)\text{Design} = \frac{4.76}{5.76}(1 + XSA \text{ Min})$$

$$\left(\frac{VSAC}{VCOR}\right)\text{Design} = \frac{(6.22)(KA)(TO)(1 + XSA \text{ Min.})}{\left[(QRP)\left(\frac{PO}{Pf}\right)^{\frac{KA-1}{KA}} + (CP)(TO)\right]}$$

Figure 23:
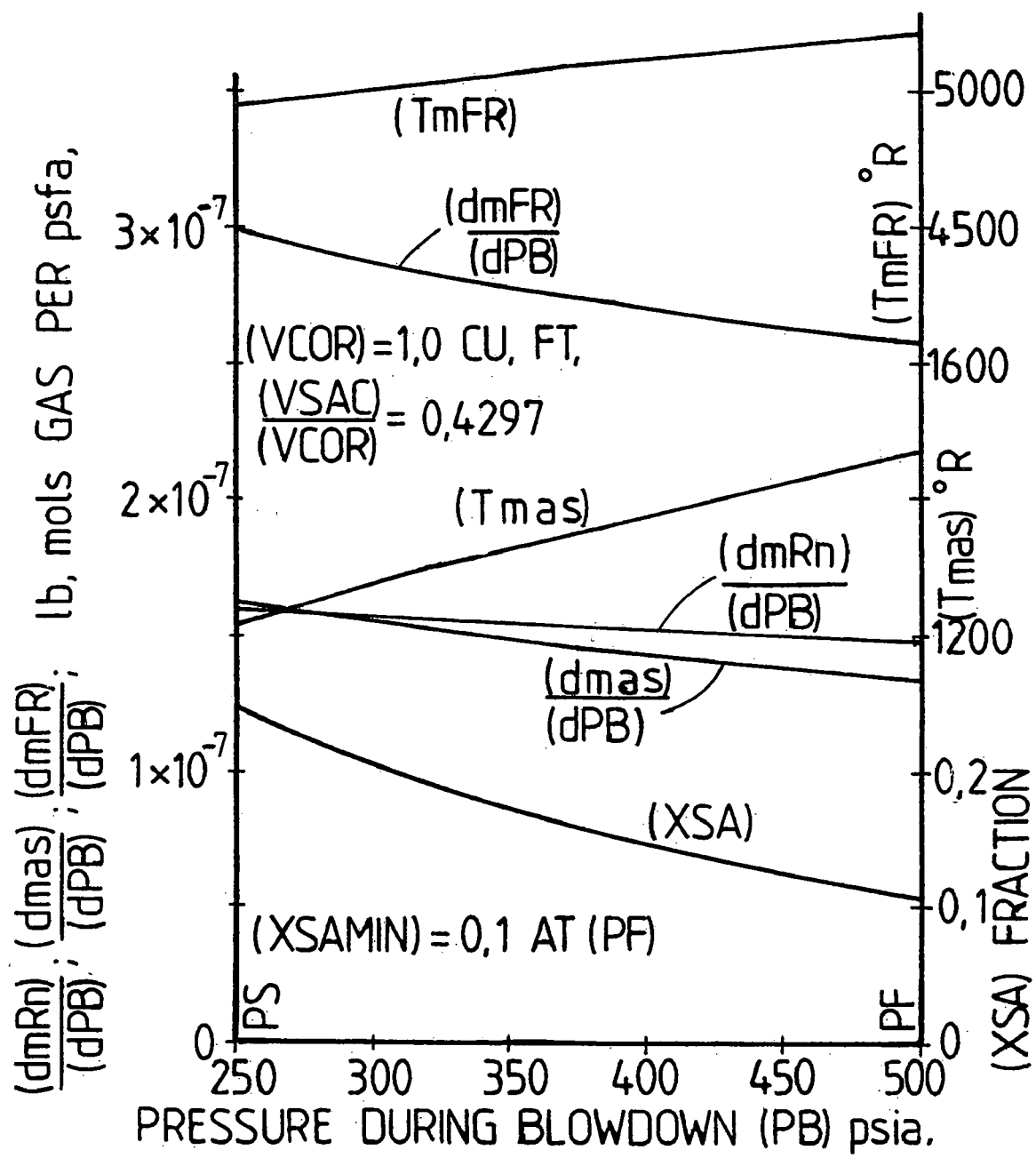

An example blowdown cycle is shown graphically in FIG. 23 for a particular example coke burning engine with the following operating conditions:

$(Pf) = 500$ psia; $ps = 250$ psia;

$(XSA \text{ min}) = 0.10$; For which $\left(\frac{VSAC}{VCOR}\right) = .4297$ $(To) = 540° R$ For a blowdown cycle ending at (Ps)=250 psia, the excess air fraction starts at 0.10, and ends at 0.249, at (Ps)=PB)=250 psia, with adequate excess air being provided throughout each blowdown cycle.

On the other hand, for a blowdown cycle ending at a pressure less than (PB)=(Ps<25 psia), the excess air fraction at the end of the cycle will exceed the spark ignitable limit of (XSA Ign. Limit)≈1.02, and the carbon monoxide in the remaining primary reacted gas will not be fully burned to carbon dioxide. Undesirable carbon monoxide emissions will result. In general, use of unusually low blowdown ending pressure is also undesirable as fuel efficiency is appreciably reduced.

For a particular coke reactor interior volume (VSCO), the gas space volume (VCOR), available for primary air, can vary appreciably with variations in coke porosity, and variations in coke chunk size distribution. Thus, for those coke burning engines intended to operate with a wide variety of coke fuels, a secondary air chamber volume adjustor can be used, as illustrated in FIG. 19, by elements, 64, 65, 66. Secondary air chamber volume (VSAC), can be adjusted to eliminate carbon monoxide emissions in the fully burned gases entering the expander engine inlets.

M. The Secondary Reaction to Fully Reacted Gas

An energy balance on the secondary reaction of primary reacted gas and secondary air yields the following approximate relations for the pressure rate of formation of fully reacted gas $\left(\frac{dmFR}{dPB}\right)$ and the temperature, (TmFR) of these gases:

$$\left(\frac{dmFR}{dPB}\right) = 0.826[2 + (XSAB)]\left(\frac{dmRn}{dPB}\right)$$

$$(TmFR) = \frac{\left[\left(\frac{QRS}{CPB}\right)(.826) + (TmRn) + (.826)(1 + XSAB)(Tmas)\right]}{[(1.653) + (.826)(XSAB)]}$$

Wherein:
(QRS)=Heat of reaction of secondary reaction per lb mol of secondary air reacted, Btu per lb mol;
(CPB)=Specific heat of reacted gases at constant pressure, Btu per lb mol per ° R;
(TmRn)=Variable temperature of primary reacted gas when leaving the coke reactor at (PB) pressure, ° R, as illustrated on FIG. 21.
(Tmas)=Variable temperature of secondary air when leaving the secondary air chamber at (PB) pressure, ° R, as illustrated on FIG. 21.
(XSAB)=Variable excess air fraction in the mixture of primary reacted gas and secondary air entering the final reactor at (PB) pressure.

$$[1 + (XSAB)] = \left(\frac{VSAC}{VCOR}\right) \frac{\left[(QRP)\left(\frac{PO}{PB}\right)^{\frac{KA-1}{KA}} + (CP)(TO)\right]}{(6.222)(KA)(TO)}$$

These several variable quantities are illustrated on FIG. 23 for an example secondary reaction during a blowdown, starting at (Pf)=500 psia, and ending at (Ps)=250 psia, with a minimum excess air fraction (XSA Min)=0.10, at, (PB)=Pf)= 500 psia. The resulting very high values of the temperature of the fully reacted gases (TmFR) require the subsequent addition of cooling fluid, to reduce the gas temperatures to a level which available expander materials can accept and survive. Low cost cooling fluids, such as air or water, will be preferred for use in coke burning engines.

H. Air Cooling of Fully Reacted Gases

As illustrated in FIG. 1, a cooling air chamber, 122, can be used on each coke burning unit, CBU1, and is connected to the common air intake manifold, 46, to receive compressed air from the air compressors, C1, C2, during each compression cycle time period, and is connected to the final reactor, 22, via the cooling air connection, 13, to deliver cooling air into the final reactor, 22, during each blowdown cycle time period of the connected coke burning unit, CBU1. Preferably the cooling air is admitted into the final reactor, 22, sufficiently downstream from the secondary reaction, that cooling air is mixed only into fully reacted gases, which have completed their secondary reaction, in order to avoid cooling air dilution of reacting gases. Also, preferably the cooling air chamber, 122, is separate from the secondary chamber, 10, so that these two air flow streams enter the final reactor at their two different entry points, and at their two different flow rates. The cooling air chamber and final reactor volumes are to be sized to add sufficient cooling air into the fully reacted gas that the expander inlet temperature (TBTI) during blowdown does not exceed the preselected maximum allowable expander inlet temperature (TBTI Max), during each blowdown cycle time period. An energy balance on this process of mixing cooling air into fully reacted gases from the secondary reaction yields the following approximate relations for estimating the required combined volume of the cooling air chamber (VCAC) and the final reactor chamber (VFRC).

$$(TBTI) = \frac{\left[\left(\frac{dmFR}{dPB}\right)(TmFR) + \left(\frac{dma\ cool}{dPB}\right)(TmasB)\right]}{\left[\left(\frac{dmFR}{dPB}\right) + \left(\frac{dma\ cool}{dPB}\right)\right]}$$

Maximum expander inlet temperature (TBTI Max), occurs at the start of blowdown when fully reacted gas temperature (TmFR) is a maximum, and cooling air flow, (dmascool/dPB) is a minimum, and this is the design point, at (PB)=Pf), for sizing the combined volume of the final reactor chamber (VFRC) and cooling air chamber (VCAC).

$$\frac{[(VCAC) + (VFRC)]}{(VSAC)} = \frac{\left(\frac{dmFR}{dPB}\right)[(TmFR) - (TBTI\ Max)]}{\left(\frac{dmas}{dPB}\right)[(TBTI\ max) - (Tmas)]}$$

These relations are approximate and constant values of gas specific heat were assumed.

As blowdown progresses to lower values of pressure, (PB) <(Pf), the various factors vary approximately as follows:

$$\left(\frac{dma\ cool}{dPB}\right) = \left(\frac{dmas}{dPB}\right)\left[\frac{(VCAC) + (VFRC)}{(VSAC)}\right]$$

$$\left(\frac{dmCR}{dPB}\right) = \text{Flow rate of cooled,}$$

fully reacted gas into the expander inlet, lb mols gas flow per *psfa* pressure drop.

$$\left(\frac{dmCR}{dPB}\right) = \left(\frac{dmFRB}{dPB}\right) + \left(\frac{dma\ cool}{dPB}\right)$$

Figure 24:
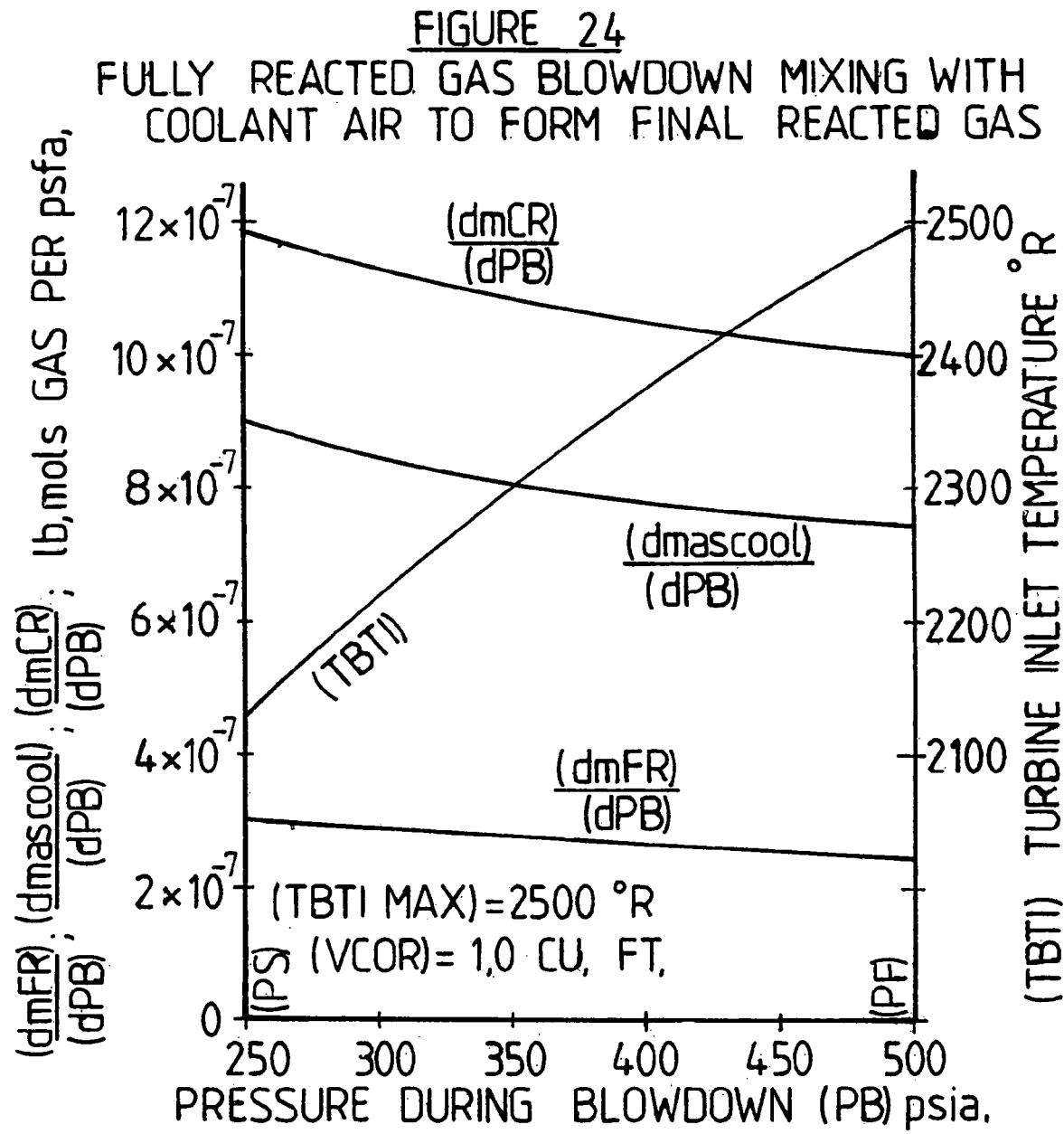

The variation of these several factors during blowdown for the example case where (PF)=500 psia) and (Ps)=250 psia, and (TBTI Max)=2500° R, is illustrated on FIG. 24.

Total cooling air flow per blowdown cycle (ma cool), and total flow of gas into expander inlet (mCR), can be evaluated by approximate graphical integration of these lines on FIG. 24.

For the illustrative example sizing calculation presented hereinbelow, the several approximate integrations of the gas flow rates per unit change of pressure yield the following gas quantities per cycle for a coke reactor gas space volume (VCOR), of one cubic foot:

$$\frac{VSAC}{VCOR} = 0.4297,$$

For a minimum excess air fraction of 0.10 for the secondary reaction.

$$\frac{[(VCAC) + (VFRC)]}{(VSAC)} = 5.442,$$

For a maximum expander inlet temperature of 2500° R.
(Pf)=Maximum cycle pressure of 500 psia.
  (Ps)=Minimum cycle pressure of 250 psia.
  (ma cool)=0.0291 lb mols of cooling air per blowdown cycle.
  (MFR)=0.0098 lb mols of fully reacted gas formed during the secondary reaction per blowdown cycle.
  (MCR)=0.0389 lb mols of cooled fully reacted gas flow into expander inlet per blowdown cycle.

These gas quantities result from the following gas quantities formed in the coke reactor and the secondary reaction to fully reacted gases:
  (man)=0.00458 lb mols primary air compressed into the coke reactor during each compression cycle.
  (mRn)=0.00554 lb mols primary reacted gas formed in coke reactor during each compression cycle.
  (mas)=0.00524 lb mols secondary air compressed into the secondary air chamber during each compression cycle.
  (mat)=0.0389 lb mols total air per each compression cycle.

Use of compressed air as the cooling fluid, while relatively simple and inexpensive, requires a larger air compressor to supply the extra cooling air and somewhat reduces the thermal efficiency of the coke burning engine.

O. Air Compressor Sizing

The air compression unit is to supply all of the air quantities (mat) needed to compress air into the coke reactor, the secondary air chamber, the final reactor, and the cooling air chamber if used, during each compression cycle pressure rise, from starting pressure, (Ps) up to final pressure (Pf), on each coke burning unit.

$$(mat) = (man) + (mas) + (ma\ cool)$$

The air compression process is essentially similar for compressing air into the secondary air chamber, the final reactor, and the cooling air chamber, for which the following relations can be used:

$$(mas) + (ma\ cool)] = [(VSAC) + (VFRC) + (VCAC)](Z)$$

$$Z = \left(\frac{Po}{RTo}\right)\left[\left(\frac{Pf}{po}\right)^{\frac{1}{k}} - \left(\frac{Ps}{po}\right)^{\frac{1}{k}}\right]; \frac{\text{lbmols}}{\text{cu. ft.}}$$

While the process for compressing air into the coke reactor differs from that for the several air chambers, the following approximation can be used for purposes of air compression unit sizing:

$(man) = (VRE)(Z)$ (VRE)=Volume of an air tank whose compression is essentially equivalent to that of the coke reactor volume (VCOR):

$$\frac{(VRE)}{(VCOR)} = \frac{(6.22)(K)(TO)\left(\frac{pn}{po}\right)^{\frac{K-1}{K}}}{\left[(QRP) + (CP)(TO)\left(\frac{pn}{po}\right)^{\frac{K-1}{K}}\right]}$$

Over most of the range of compression pressures this ratio $\left(\frac{VRE}{VCOR}\right)$, is approximately constant, as shown on FIG. 25, and average values can be used over the operating pressure range of the compression cycle, unless very low starting pressures (Ps), are used.

The following relations can be used to estimate the required first inlet low pressure stage piston displacement volume (VD1) of each separate piston and cylinder-air compressor of the air compression unit:

$$(mat) = (VCOR)\left[\left(\frac{VRE}{VCOR}\right) + \left(\frac{VSAC}{VCOR}\right) + \left(\frac{VFRC}{VCOR}\right) + \left(\frac{VCAC}{VCOR}\right)\right](Z)$$

$$(mat) = \sum_1^C \left(\frac{po}{RTo}\right)(VD1)(Vol.\ Eff.)$$

$$(Vol.\ Eff.) = 1 - (a)\left[\left(\frac{pd}{po}\right)^{\frac{1}{mk}} - 1\right]; \text{Fractional}$$

Wherein:
(mat)=Total lb. mols of air to be compressed by the air compression unit into each coke burning unit during each compression cycle time interval.

(VD1)=Piston displacement required for first low pressure air intake stage of each separate piston and cylinder air compressor, cu.ft. per stroke.

(C)=Number of separate piston and cylinder air compressors in the air compression unit.

(m)=Number of stages in each separate piston and cylinder air compressor.

(a) = Clearance volume ratio $= \frac{VCL}{VDI}$ assumed equal for all stages.

(VCL)=Compressor stage clearance volume, cu.ft.

(pd)=Final delivery pressure from last high pressure stage of each separate piston and cylinder air compressor, psfa.

Where but a single piston and cylinder air compressor is used (pd), equals final compression cycle pressure (pf). Where two or more separate piston and cylinder air compressors are used (pd), equals the last final stage discharge pressure, at the end of the delivery stroke, of the last stage, which differs for each of the separate piston and cylinder air compressors. Where the piston displacement of the first low pressure intake stage is the same for all of the separate piston and cylinder air compressors, the approximation can be used that the pressure rise is equal across each of the separate compressors. More accurate methods for estimating the values for (pd) will be described hereinbelow for an example air compression unit.

Compression cycle pressures are preferably in the range from 200 psi, minimum, up to as much as 800 psia, or greater, in order to obtain a reasonably high value of fuel energy to network efficiency. If typical pressure rise ratios of 4 to 7 per compressor stage are to be used, then each separate piston and cylinder air compressor can be a two stage air compressor, as illustrated in FIG. 18, where by use of double acting pistons, two separate two stage air compressors are used in this air compression unit. The piston displacement volume of the final stages of these two piston and cylinder air compressors can be estimated from the following approximate relations:

$$\left(\frac{VD2}{VD1}\right) = \left(\frac{1}{u}\right)^{\frac{1}{k}}$$

Wherein:
(VD2)=Piston displacement volume of the second and last final stage, cu.ft.

(u)=Pressure rise ratio across each compressor stage.

The intercompressor pressure (pi), can be roughly estimated as half way between the starting pressure (ps), and the final pressure (pf), of each air compression cycle. A somewhat more accurate estimate of this intercompressor pressure, prevailing in the coke reactor after the first piston and cylinder air compressor has completed the first part of the compression cycle, can be calculated via the following relation:

$$\left(\frac{pi}{po}\right)^{\frac{1}{k}}\left\{(2+2a)-(a)\left[\left(\frac{pf}{po}\right)^{\frac{1}{2k}}+\left(\frac{pi}{po}\right)^{\frac{1}{2k}}\right]\right\}=\left[\left(\frac{pf}{po}\right)^{\frac{1}{k}}+\left(\frac{ps}{po}\right)^{\frac{1}{k}}\right](2+2a)-$$
$$(a)\left(\frac{pf}{po}\right)^{\frac{1}{k}}\left[\left(\frac{ps}{po}\right)^{\frac{1}{k}}+\left(\frac{pi}{po}\right)^{\frac{1}{k}}\right]$$

A cut and try calculation can be used to calculate a value for (pi) which can be used to yield a more accurate value of both this intercompressor pressure and the volumetric efficiencies of the first piston and cylinder air compressor.

The total air compressor work per compression cycle (WA) to compress primary air into the coke reactor, secondary air into the secondary air chamber, and cooling air into the final reaction chamber and cooling air chamber, if used, can be estimated from the following approximate relations:

$$(WA)=(VCOR)\left[\frac{\left(\frac{VRE}{VCOR}\right)+\left(\frac{VSAC}{VCOR}\right)+}{\left(\frac{VFRC}{VCOR}\right)+\left(\frac{VCAC}{VCOR}\right)}\right][U+V-Y]$$

Wherein:
(WA)=Total air compressor work per compression cycle, ft. lbsf. per cycle.
(VFRC)=Interior volume of final reaction chamber, cu.ft.

$$(U)=\left(\frac{po}{k-1}\right)\left[\left(\frac{pf}{po}\right)^{\frac{1}{k}}-\left(\frac{ps}{po}\right)^{\frac{1}{k}}\right]\left[\left(\frac{pf}{po}\right)^{\frac{k-1}{k}}-1\right]; psfa$$

$$(V)=\left(\frac{po}{k-1}\right)\left[\left(\frac{pf}{po}\right)^{\frac{k-1}{k}}-\left(\frac{ps}{po}\right)^{\frac{k-1}{k}}\right]\left(\frac{ps}{po}\right)^{\frac{1}{k}}; psfa$$

$$(Y)=(po)\left[\left(\frac{pf}{po}\right)^{\frac{1}{k}}-\left(\frac{ps}{po}\right)^{\frac{1}{k}}\right]; psfa$$

The horsepower needed to drive the air compression unit (CHP) can be estimated from the following approximate relations:

$$(CHP)=\frac{(WA)(B)(RPM)}{33000(ACEFF)}$$

Wherein:
(RPM)=Air compressor crankshaft revolutions per minute;
(ACEFF)=Mechanical efficiency of air compressor unit drive means;
(B)=Number of compression cycles per crankshaft revolution and number of blowdown cycles per crankshaft revolution.

For the example cycle operating conditions of (pf)=500 psia, (ps)=250 psia, (po)=15 psia, (VCOR)—1.0 cu.ft., (XSA Min.)=0.10, and (TBTI Max)=2500° R. The air compressor sizing values are as follows:

(VDI)=7.88 cu.ft. in each piston and cylinder air compressor.

(WA)=168324 ft.lbsf per compression cycle.

(CHP)=(5.05)(RPM) air compressor drive horsepower for (B)=1.0.

$$\frac{\text{Air Compressor First Stage Piston}}{\text{Diameter For Equal Stroke}}=2.16\text{ ft.}$$

P. Water Cooling of Fully Reacted Gases

Use of liquid water, instead of compressed air, to cool the final reacted gases to acceptable expander inlet temperatures, substantially reduces the required size and cost of the air compression unit. A significant portion of the water cooling effect results from taking the latent heat of evaporation of the water out of the fully reacted gases, and this latent heat energy is lost as increased turbine exhaust gas energy loss, with a consequent reduction in ideal engine efficiency. This ideal engine efficiency loss is partly offset since, with water cooling, expander inlet temperature can be maintained at maximum usable value throughout blowdown, whereas with compressed air cooling, expander inlet temperature and ideal efficiency decrease as blowdown progresses. The actual engine thermal efficiency with water cooling essentially equals the actual efficiency with compressed air cooling, since the smaller air compressor and expander engine, used with water cooling, have smaller air compressor and expander losses, for the same net engine output.

An energy balance on this liquid water cooling of the fully reacted gases yields the following approximate relations for estimating the cooling water flow rate for maintaining a constant expander inlet temperature (TBTI) throughout each blowdown cycle:

$$\left(\frac{dmWC}{dPB}\right)=\frac{\left(\frac{dmFR}{dPB}\right)(CPB)[(TmFR)-(TBTI)]-\left(\frac{dmaFR}{dPB}\right)(CPA)[(TBTI)-(Tmas)]}{(37264)}$$

Wherein:

$\frac{dmwc}{dPB}$ = cooling water pressure rate of flow required to maintain constant expander inlet temperature of $(TBTI°R)$ lb mols water per psfa blowdown pressure drop.

$\frac{dnaFR}{dPB}$ = Assumed pressure rate of mixing of air, compressed into the final reactor chamber during compression, and leaving the final reactor as coolant during blowdown, lb mols air per psfa blowdown pressure drop.

$$\left(\frac{dmaFR}{dPB}\right)=\left(\frac{dmas}{dPB}\right)\left(\frac{VFRC}{VSAC}\right)$$

The total gas flow rate of fully reacted and cooled gas into the expander inlet, dmTW/dPB, is the sum of the separate flow rates:

$$\left(\frac{dmTw}{dPB}\right) = \left(\frac{dmFR}{dPB}\right) + \left(\frac{dmaFR}{dPB}\right) + \left(\frac{dmWC}{dPB}\right) \frac{\text{lbmols gas}}{\text{per } psfa}$$

For the FIG. 14 example coke burning engine, described hereinabove, the variation of these several flow rates during each blowdown cycle is illustrated on FIG. 26. Graphical integration yields the following gas flow quantities per blowdown cycle.

(mFR)=0.0099 lb mols fully reacted gas per cycle.

(maFR) = .00079 lb mols air per cycle in final reactor chamber for assumed chamber volume ratio, $\left(\frac{VFRC}{VSAC}\right) = 0.15$ (mwc)=0.00635 lb mols water per cycle.

(mTw)=0.01704 lb mols fully reacted and cooled gas flow into expander engine inlet per cycle.

Water being a more effective cooling agent than compressed air, the total gas flow into the turbine inlet nozzle, per blowdown cycle, is much less for water coolant than for compressed air coolant. As a result the turbine inlet nozzle throat area for water coolant (ANW) is less than for air coolant. For the FIG. 14 example coke burning engine, using water coolant, the required turbine inlet nozzle throat area can be estimated as follows for each nozzle, assuming the usual case of sonic velocity of gas flow at nozzle throat:

$$\frac{ANW}{\text{Air comressor Crankshaft RPM}} = (G)(H)(L); \frac{ft^2}{RPM}$$

Wherein:

$(G) = \left[-\ln e\left(\frac{ps}{pf}\right)\right][\sqrt{TBTI}](326)$ $(H)$ = Averaged Value of $\left(\frac{dmTW}{dPB}\right)$; $\frac{\text{lb mols}}{psfa}$ $(L) = \left[\frac{1}{\text{Blowdown Duration in Crank Angle Degrees}}\right]$ $[TBTI]$ = Arbitrarily Selected Constant
Value of Turbine Nozzle Inlet Temperature, °R.

$(ANW)$ = Turbine Inlet Nozzle Throat Area, ft².

Various types of water pump systems can be used to deliver the water coolant into the final reactor, at the rate needed to assure only the required extent of cooling of the fully reacted gases. For example, the cam driven, positive displacement, piston and cylinder, water pump shown in FIG. 13, could be used with a cam driven at a fixed multiple of air compressor crankshaft RPM. For use with the FIG. 14 example coke burning turbine engine, a separate water pump and cam could be used for each of the four coke burner units, with the camshaft, 168, driven at one half of air compressor crankshaft, 103, RPM. This pump and cam can be sized with the following approximate relations:

$$(AWP)\left(\frac{drD}{d\theta}\right) = (M)(S)(U)$$

$$(AWP)[(rD \text{ at } \theta PB) - (ro)] = \sum_{\theta=0}^{\theta PB}(M)(S)(U)(\Delta\theta); ft^3$$

Wherein:

(AWP)=Water pump piston area, ft²

(rd at θPB)=Water pump cam radius ft, at cam angle (θPB), degrees, when blowdown pressure is (PB) psfa.

(ro)=Water pump cam base circle radius, ft, at cam angle θ-zero degrees at start of blowdown cycle when blowdown pressure is (pf) psfa.

$(M) = \left(\frac{dmWC}{dPB}\right)(PB)$; value at $(PB)$; lbmols $(S) = \left(\frac{\text{Air Compressor Crankshaft RPM}}{\text{Water Pump Camshaft RPM}}\right)(L); \frac{1}{\text{degrees}}$ $(U) = \left[-\ln e\left(\frac{ps}{pf}\right)\right]\left[\frac{\text{Water Molecular Wt}}{\text{Water Density}}\right]$ (Δθ)=Small interval of cam angle θ, degrees, for finite increment summation, from θ=0 at pf, to θ=θPB at PB.

$(L) = \frac{1}{[\text{Blowdown Crank Angle Degrees}]}$ (Water Density) in lbs *mass* per cu. ft.

$(\theta PB) = (\Delta\theta \text{ Blowdown}) \frac{\left[-\ln e\left(\frac{PB}{pf}\right)\right]}{\left[-\ln e\left(\frac{PS}{pf}\right)\right]}$ (Δθ Blowdown)=(Blowdown Cam Angle Degrees)

Figure 27:
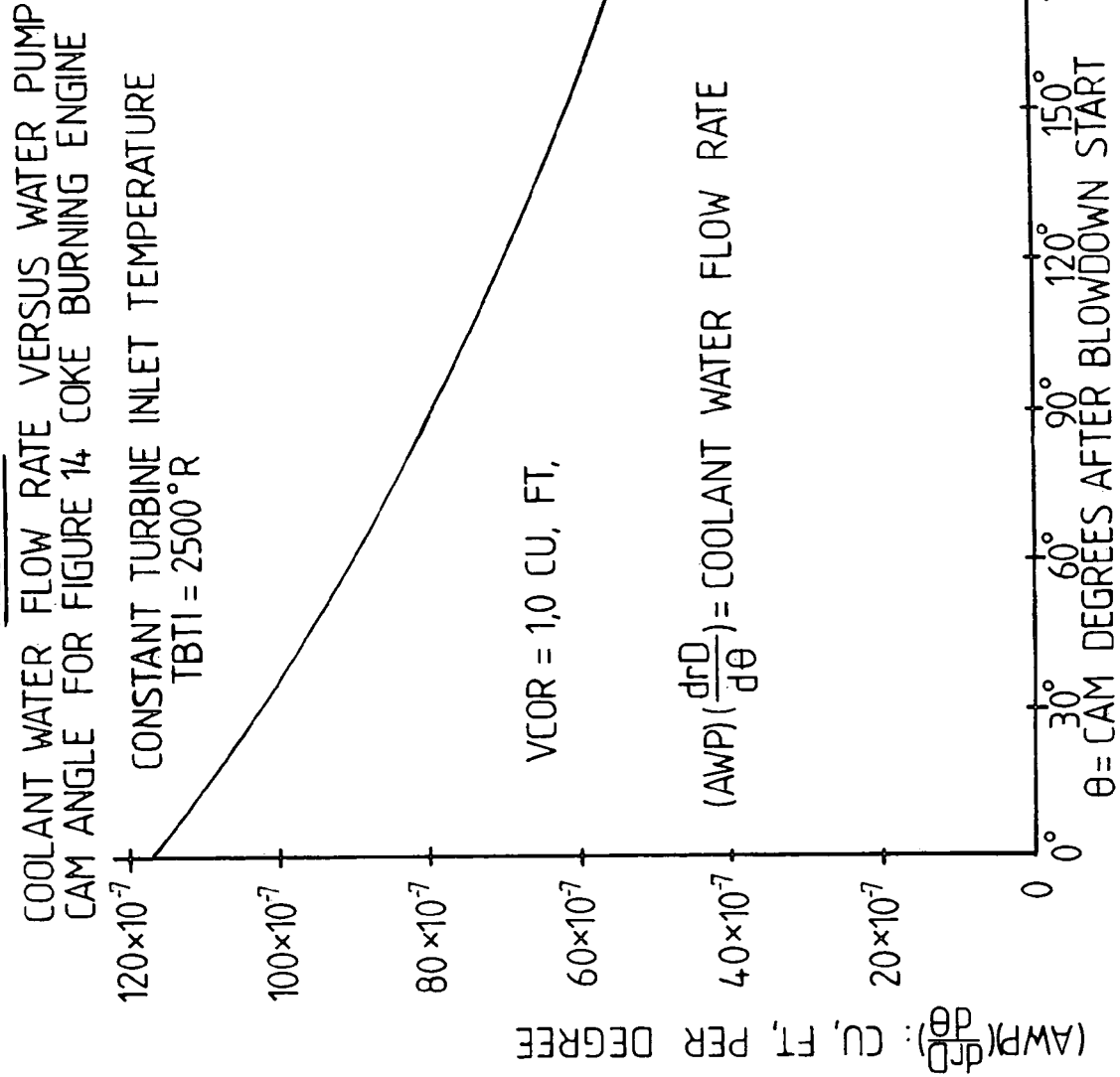
Figure 28:
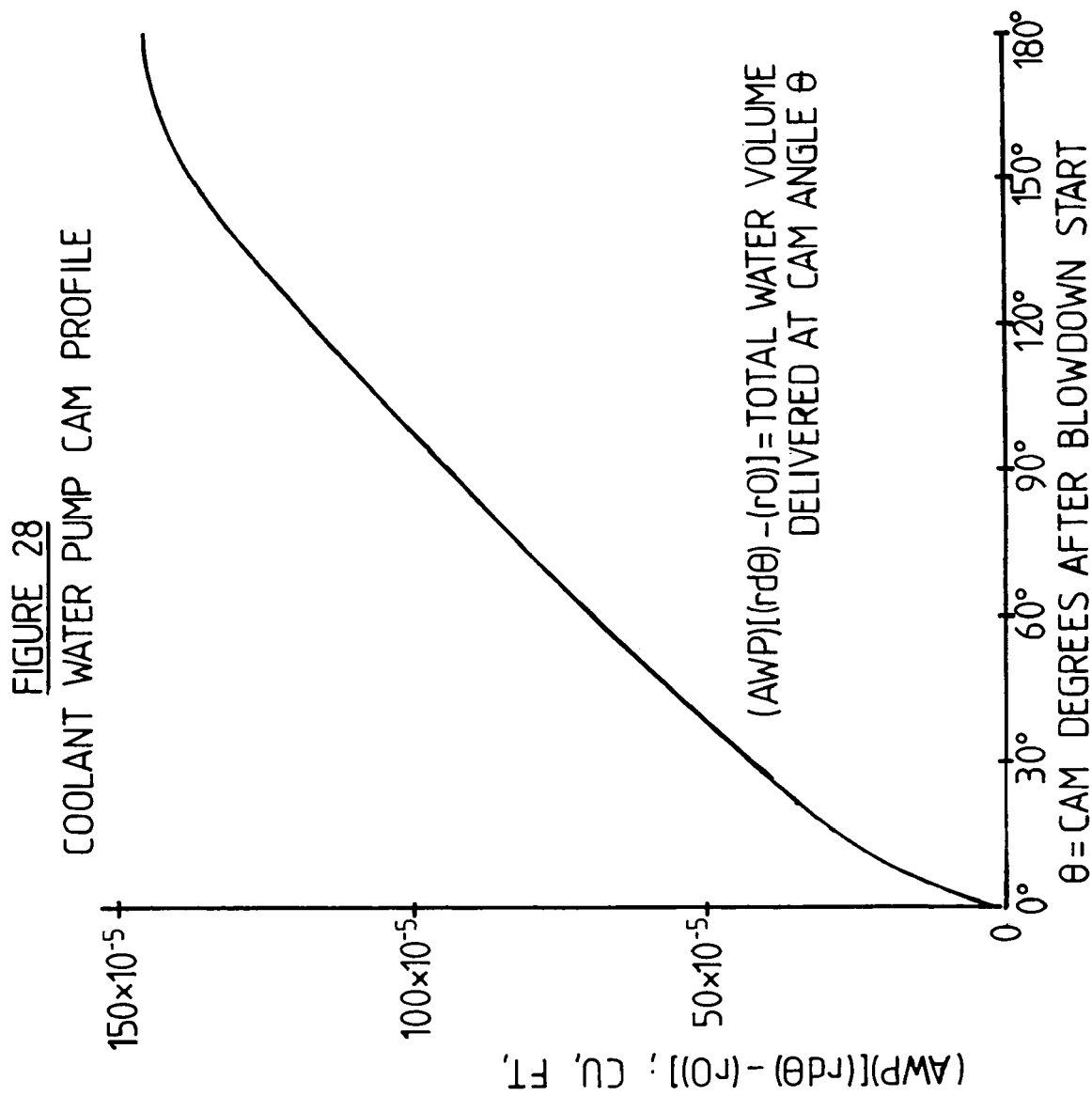

This finite cam angle interval calculation is illustrated graphically on FIG. 27, where $$(AWP)\left(\frac{drD}{d\theta}\right)$$

is plotted against θ, and on FIG. 28, where the areas, under the FIG. 27 graph are summed up to show the water pump cam profile during the blowdown time interval (Δθ Blowdown). Any reasonable cam profile can be used for the return suction stroke of the water pump piston to return the pump cam follower to the cam base circle for the start of the next blowdown cycle.

Q. Expander Engine Work Output

The ideal isentropic work done by the blowdown gases on the expander engine piston, or on the expander turbine blades, during each blowdown cycle time interval can be estimated from the following relations:

$$\frac{d(WX)}{dPB} = \left(\frac{dmCR}{dPB}\right)\left(\frac{k}{k-1}\right)(R)(TBTI)\left[1 - \left(\frac{PO}{PB}\right)^{\frac{k-1}{k}}\right]$$

-continued $$(WX) = \int_{ps}^{pf} \left(\frac{dWX}{dPB}\right) dPB; \text{ ft lbsf per blowdown cycle}$$

Wherein:

R=Gas constant, 1545, ftlbsf per ° Rankine per lb. mol of gas expanded.

(WX)=Isentropic expander engine work ft lbsf per blowdown cycle.

(po)=Pressure at engine exhaust, usually atmospheric, psfa.

This graphical integration is illustrated on FIG. 29.

Ideal isentropic expander engine power output equals the work per blowdown cycle times the blowdown cycles per minute:

$$(IXHP) = \frac{(WX)(B)(\text{Air Compressor Crankshaft RPM})}{(33000)}$$

Wherein:

(IXHP)=Ideal expander engine horsepower output (B)=Blowdown cycles per air compressor crankshaft revolution $$(CHP) = \frac{(WA)(B)(\text{Air Compressor Crankshaft RPM})}{(33000)}$$

Figure 30:
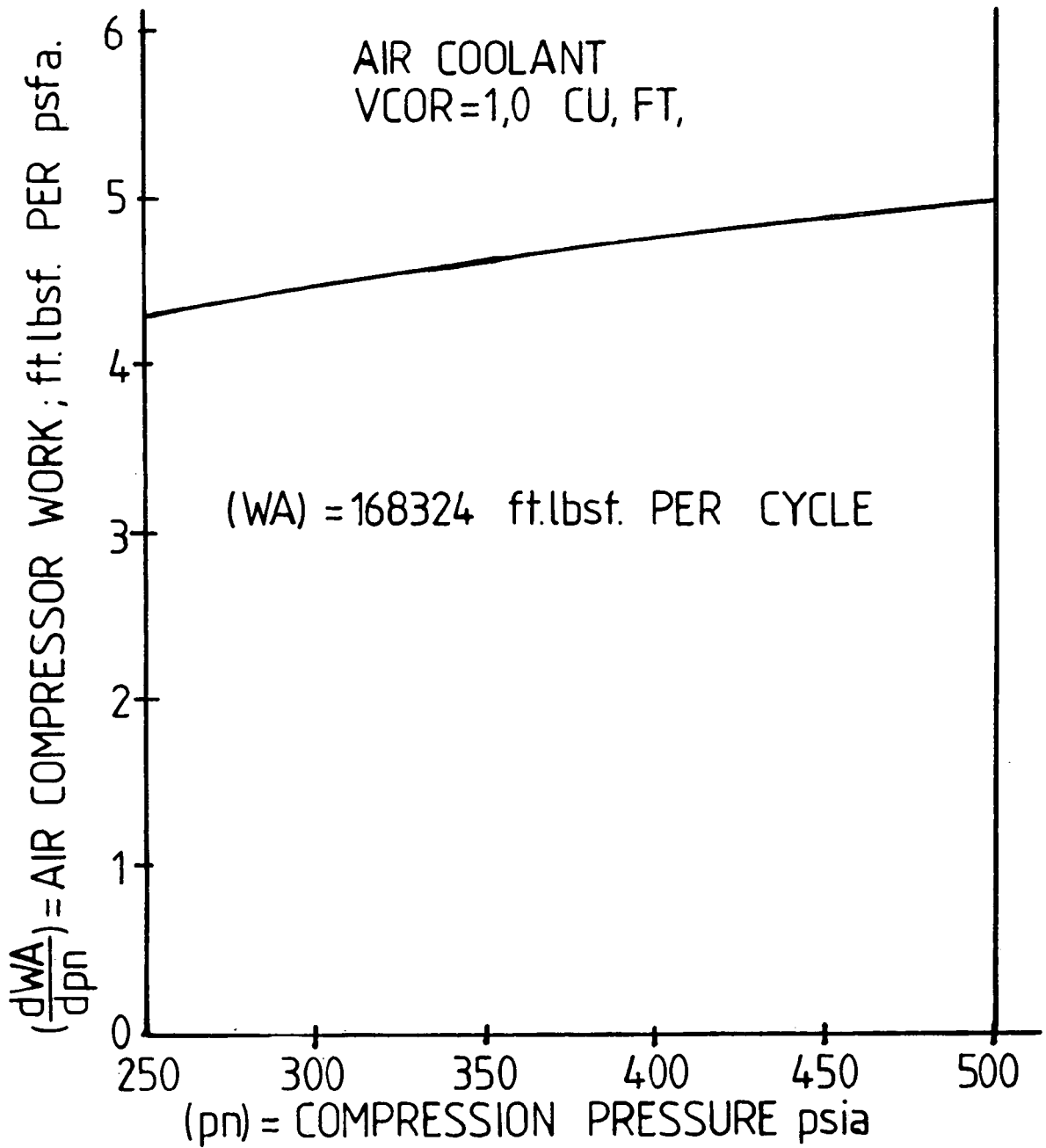

(WA)=Air compressor work input per blowdown cycle as shown on. FIG. 30

The net ideal expander engine power output (NIXHP) equals the ideal expander engine power output less the air compressor power input (CHP):

(NIXHP)=(IXHP)−(CHP)

The variation of ideal expander engine net power output with air compressor crankshaft RPM is illustrated in FIG. 32, for the FIG. 14 example coke burning engine.

The ideal expander engine thermal efficiency (ITEFF), can be estimated from the following relations:

$$(ITEFF) = \frac{[(IXHP) - (CHP)](42.42)}{(\text{man})(QR)(B)(\text{Air Compressor RPM})}$$

The actual net expander engine power output (ANXHP) and thermal efficiency (ATEFF) can be estimated from the following approximate relations:

$$(ANXHP) = \left[(IXHP)(\text{Expander } \textit{Eff}) - \frac{(CHP)}{(\text{Compressor } \textit{Eff}).}\right]$$

$$(ATEFF) = \frac{(ANXHP)(42.42)}{(\text{man})(QR)(B)(\text{Air Compressor RPM})}$$

For the FIG. 14 example coke burning engine, each separate group of two coke burning units, compressed with air from the connected two separate air compressors, produces one blowdown cycle for each air compressor crankshaft revolution, and B=1 for each of the two separate groups:

(B total)=(B1)+(B2)=2, as shown on FIG. 15.

For a turbine expander engine, with piston air compressor, at rated torque, the following efficiencies were assumed:

Turbine Efficiency=0.85

Air Compressor Efficiency=0.90

The resulting values of actual net power output (ANXHP), and actual thermal efficiency (ATEFF) are illustrated on FIG. 32, for a turbine expander engine using air cooling as illustrated for the FIG. 14 example coke burning engine.

The following table compares the power and fuel efficiency of two coke burning engines, of the type shown on FIG. 14, one using compressed air as coolant, and the other using liquid water as coolant, both at 1500 compressor RPM, with (VCOR)=1.0 cu.ft.:

|  | Air Coolant Engine | Water Coolant Engine |
| --- | --- | --- |
| Ideal (IXHP) | 27726 | 12631 |
| (CHP) | 15302 | 4174 |
| Ideal (NIXHP) | 12424 | 8457 |
| Ideal (ITEFF) | 0.54 | 0.37 |
| Actual (ANXHP) | 6565 | 6098 |
| Actual (ATEFF) | 0.28 | 0.26 |

To size an engine for a design power output differing from the above values, all volume dimensions of compressors, and reaction chambers, and engines, can be scaled in direct proportion to the ratio of power output.

Note that the relative efficiency lost to water latent heat of evaporation is appreciably offset by the reduced air compressor losses, together with an efficiency increase due to maintenance of maximum turbine inlet temperature throughout blowdown expansion. For equal design power output the engine using water as coolant will be smaller and less expensive than the engine using air as coolant.

R. Gas Flow Through Turbine

Opening of the turbine blowdown cycle valve, at the start of blowdown, allows primary reacted gas and secondary air to flow out of their chambers, mix and react via the secondary reaction in the final reactor, be cooled by cooling air from the cooling air chambers, and leave the final reactor to flow through the turbine inlet nozzle. In the turbine, these fully reacted and cooled gases are accelerated by pressure drop through the nozzles, and decelerated by flow across moving turbine blades, this deceleration creating the force on the moving blades which creates the turbine power output. Frequently gas velocity is sonic in the throat of at least the turbine inlet nozzle, in order to avoid a large number of expensive turbine stages. A wide variety of turbine types can be used on coke burning engines of this invention.

Each turbine inlet nozzle throat area (AN) is to be sufficient that the total gas flow therethrough (mcr) will drop the pressure in each coke burning unit, from blowdown starting pressure (PB)=pf, down to blowdown ending pressure (PB)= (ps), during each blowdown cycle time interval (tB). Thus as air compressor RPM is increased, for example on the FIG. 14 type of engine, the blowdown cycle time interval is shortened, and a larger turbine inlet nozzle throat area is needed to pass the same quantity of gas in this shorter time interval.

The following relations can be used to estimate the required turbine inlet nozzle throat area (AN) as a function of blowdown cycle time interval (tB), and air compressor RPM, for the assumed sonic gas velocity (a), in the turbine inlet nozzle throat.

$$-\left(\frac{dmCR}{dPB}\right)\left(\frac{dPB}{dt}\right) = \frac{(AN)(a)}{(vt)(\text{mol. wt.})} = \left(\frac{d_{mCR}}{dt}\right)$$

Wherein:

$\left(\frac{dmCR}{dt}\right)$ = Flow rate of fully reacted and cooled gas through turbine inlet nozzle throat, lb mols per sec.

(AN)=Nozzle throat area, ft$^2$
(a)=Sonic gas velocity in nozzle throat feet per sec
(a)=$\sqrt{kgR(Tthroat)}$
(vt)=Specific volume of gas in nozzle throat, cu.ft. per lb. mass
(mol wt.)=Molecular weight of fully reacted and cooled gas, lbs mass per lb mol $$(vt)(\text{mol wt}) = \frac{(1545)(Tthroat)}{(Pthroat)}$$

(Pthroat)=(0.525)(PB)
(Tthroat)=(TBTI)(Pthroat/PB)$^{k-1/k}$
(Tthroat)=(0.831)(TBTI)

$$\left(\frac{dmCR}{dt}\right) = \frac{(.0184)(PB)(AN)}{\sqrt{TBTI}} = \left(\frac{d_{mCR}}{dPB}\right)\left(\frac{dPB}{dt}\right)(-1)$$

$\left(\frac{dPB}{dt}\right)$ is a negative quantity $$(-1)\left(\frac{dPB}{PB}\right)\frac{1}{(AN)(tB)} = \left[\frac{.0184}{\left(\sqrt{TBTI}\right)\left(\frac{dmCR}{dPB}\right)}\right]\left(\frac{dt}{tB}\right)$$

(tB)=Blowdown time interval, secs per cycle, from cycle timing diagrams, such as FIG. 15 for the FIG. 14 engine $$(tB) = \frac{\text{Blowdown crank degrees per cycle}}{\text{Air Compressor Crankshaft degrees per sec.}}$$

(Crankshaft degrees per sec)=(6)(Crankshaft RPM)
The quantity, $$\frac{(.0184)}{\left(\sqrt{TBTI}\right)\left(\frac{dmCR}{dPB}\right)}$$

is approximately constant over a blowdown pressure range of 500 psia down to 250 psia, and varies inversely with coke reactor gas space volume (VCOR), since the term $$\left(\frac{dmCR}{dPB}\right)$$

varies directly with (VCOR).
The approximate integration yields the following relation:

$$(AN)(tB) \cong \frac{\ln\left(\frac{pf}{ps}\right)}{\left[\frac{.0184}{\sqrt{TBTI}\left(\frac{dmCR}{dPB}\right)}\right]}$$

Thusly calculated values of turbine inlet nozzle throat area, required at various values of air compressor crankshaft RPM, are plotted on FIG. 33 for the FIG. 14 example of coke burning engine, using compressed air as coolant, and also for using liquid water as coolant.

Various control mechanisms can be used to thusly adjust turbine inlet nozzle throat area in direct proportion to air compressor crankshaft RPM, an example being illustrated on FIG. 17, and described hereinabove.

S. Piston Expander Engine Displacement

The piston expander engine displacement is directly related to the air compression unit first intake stages displacement per compression cycle. The air compressed into each two step coke burning unit during compression, emerges as the fully reacted and cooled gas during the following blowdown. For full reaction of primary air in the primary reactor, the mols of fully reacted and cooled gas essentially equals the mols of air compressed into the coke burning unit when air is used as coolant. Thus the ratio of the volume of fully reacted and cooled gas at piston expander exhaust to air compression unit first stage displacement can be estimated as follows:

$$\frac{\text{(Volume of } mCR \text{ gas at exhaust}}{(nc)(VDI)(\text{Vol. Eff.})} \cong \frac{(TXA)}{(TO)}$$

Wherein:
(Volume of mCR gas) in cu.ft.
(nc)=Number of separate piston and cylinder air compressors of first stage displacement volume (VDI) cu.ft., supplying air to the piston expander engine per cycle.
(Vol Eff)=Fractional volumetric efficiency of first intake stage of air compressors.
(TO)=Air compressor intake air temperature, ° R.
(TXA)=Average temperature, ° R, of fully reacted and cooled gases, mCR, when fully expanded to atmospheric pressure in a piston expander engine:

$$(TX) = (TBTI)\left(\frac{PO}{PB}\right)^{\frac{K-1}{K}}; °R$$

Where compressed air is used as coolant fluid the values of (TX) are essentially the same for all increments of fully reacted and cooled gas, dmCR, and for this air coolant case:

$$(TXA) = (TBTl\,\text{Max})\left(\frac{PO}{pf}\right)^{\frac{k-1}{k}}; \,°R$$

To this volume of (mCR) gas at exhaust must be added the volume of exhaust gas (VRC) to be recompressed up to maximum cycle pressure (pf), before the end of the engine piston exhaust stroke, in order to avoid throttling losses, when the engine intake valve is opened at the start of the next blowdown expansion.

$$(VRC) = (VCLE)\left(\frac{pf}{po}\right)^{\frac{1}{k}}; \,\text{ft.}^3$$

Wherein:
(VCLE)=Clearance volume between cylinder and piston when engine piston is at top dead center, cu.ft.

Engine clearance volume (VCLE) is needed to avoid mechanical interference, and is usually a few percent of the piston displacement volume (VDPX).

The required piston displacement volume for complete gas expansion down to exhaust pressure (po), then becomes the following:

$$(VDPX)=[(\text{Vol. of }mCR\text{ at exhaust})+(VRC)]$$

This piston displacement required for complete gas expansion calls for a very large piston and cylinder expander, with consequent greater limitations on maximum usable crankshaft RPM and hence maximum usable power output. Also, at reduced engine torque, over expansion of gas will occur and substantially reduce engine efficiency. Best overall engine operation can usually be achieved by use of a smaller piston displacement volume (VDPXA), while accepting the consequent loss of work, due to incomplete expansion, at maximum torque.

The work loss due to incomplete expansion at maximum torque (Wix), can be estimated using the following approximate relations:

$$(Wix) = (AB) + (AC)$$
$$(AB) \cong \frac{[(pix)(VDPXA+VCLE) - (po)(VDPX+VCLE)]}{(k-1)}$$
$$(AC) \cong (po)[(VDPX) - (VDPXA)]$$

Wherein:
(Wix)=Work loss per cycle due to incomplete expansion, ftlbsf per cycle.
(VDPXA)=Actual expander engine piston displacement with incomplete expansion, cu.ft.
(pix)=Ideal expansion pressure at (VDPXA), psfa.

$$(pix) = (po)\left[\frac{(VDPX)+(VCLE)}{(VDPXA)+(VCLE)}\right]^k.$$

This work lost to incomplete expansion is illustrated on FIG. 34 as a fraction of ideal piston expander work with complete expansion (WX), ftlbsf per blowdown cycle, over a range of values of the ratio of actual piston displacement volume (VbPXA), to complete expansion piston displacement volume (VDPX). For example, with actual expander piston displacement volume equal to total air compressor displacement volume a seven percent loss of torque and efficiency results from incomplete expansion.

Various features of the operation of a piston expander engine of this invention are illustrated on the pressure-volume diagram of a single engine cycle shown on FIG. 35. The work per cycle is proportional to the area enclosed by the diagram. Intake valve opening, IVO, to start the cycle, occurs at piston top dead center, TDC, at crank angle of zero degrees. Intake valve closing, IVC, occurs subsequently to end the transfer of fully reacted and cooled gases from the connected coke burning unit. The exhaust valve opening, XVO, to start the exhaust process, occurs at, or slightly before piston bottom dead center, at crank angle of 180 degrees. The exhaust valve closing, XVC, occurs sufficiently prior to the end of the exhaust stroke that the remaining gas will be recompressed up to maximum cycle pressure, pf, prior to intake valve opening. The work lost to incomplete expansion, when actual piston displacement (VDPXA), is less than complete expansion piston displacement (VDPX) is shown as the lost portion of the enclosed area.

Having thus described my invention what I claim is:

1. A coke burning engine for generating power from the burning of carbonaceous fuel with compressed air, and comprising:
a source of carbonaceous fuel chunks, a portion of which are porous;
a receiver of ashes;
at least one two step coke burning means for reacting carbonaceous fuel chunks with compressed air, each said two step coke burning means comprising:
a coke reactor comprising a pressure vessel shell enclosing a coke reactor chamber, refuel means for periodically transferring carbonaceous fuel chunks from said source of carbonaceous fuel chunks, into said coke reactor chamber, ash removal means for periodically transferring ashes from said coke reactor chamber into said receiver of ashes,
a coke reactor air intake pipe,
a primary reacted gas discharge pipe;
a secondary air chamber comprising a pressure vessel shell enclosing a secondary air chamber,
a secondary air chamber air intake pipe,
a secondary air chamber air delivery pipe;
a final reactor comprising a pressure vessel shell enclosing a final reaction chamber, an igniter means for igniting fuel air mixtures, to react into fully reacted gases within said final reactor, a fuel air mixture inlet pipe with a fuel air mixture blowdown cycle valve, a final reactor air inlet pipe, a final fully reacted gas outlet pipe with an expander inlet blowdown cycle valve;
a common air intake manifold connected to said coke reactor air intake pipe, said secondary air chamber air intake pipe, and said final reactor air intake pipe;
wherein said air delivery pipe of said secondary air chamber is connected to said primary reacted gas discharge pipe of said coke reactor via a secondary air blowdown cycle valve to form a fuel air mixture delivery pipe; and,
wherein said fuel air mixture delivery pipe is connected to said fuel air mixture inlet pipe of said final reactor via said fuel air mixture blowdown cycle valve;
an air compression means for compressing air, from the atmosphere, into each said two step coke burning means, during a compression cycle time period for each two step coke burning means said air compression means comprising:

at least one piston and cylinder air compressor means for compressing air, and each said piston and cylinder air compressor comprising at least one air compressor stage, and each air compressor stage comprising a piston sealably reciprocal within one closed end of a cylinder, said closed end of said cylinder comprising an air compressor air intake pipe and a suction check valve, and an air compressor air delivery pipe and a delivery check valve;

each said piston and cylinder compressor means comprising, one first low pressure stage, and one last high pressure stage, these two stages being the same stage for (a) the piston and cylinder compressor means which comprises but a single stage, the air intake pipe of said first low pressure stage is connected to a source of air such as the atmosphere;

drive means for reciprocating all said pistons within said cylinders via cranks on an air compressor crankshaft rotated by said drive means, wherein each said piston carries out a compression stroke when moving toward said one closed end of said cylinder, and each said piston carries out a suction stroke when moving away from said one closed end of said cylinder, a fixed clearance volume exists between said piston and said closed end of said cylinder volume at the end of each compression stroke in order to avoid mechanical interference;

wherein (a) the coke burning engine comprises a number of two step coke burning means at least equal to the number of piston and cylinder air compressor means within said air compression means;

a number of compression cycle valves equal to the product of the number of two step coke burning means multiplied by the number of piston and cylinder air compressor means;

each said compression cycle valve connects one common air intake manifold, of one two step coke burning means, to the air delivery pipe of the last high pressure stage of said one piston and cylinder air compressor means, when opened during each compression cycle time period of said connected two step coke burning unit;

a cycle timer and control means for opening and closing said compression cycle valves, and said blowdown cycle valves, so that:

said common air intake manifold of each two step coke burning means is connected to the air delivery pipe of the last high pressure stage of each piston and cylinder air compressor means, only one last stage at a time, only during said compression stroke of each last stage, in time order of increasing last stage pressure, each said sequence of compression cycle connections constituting a compression cycle time period, for each two step coke burning means;

all said blowdown cycle valves of each two step coke burning means are concurrently opened only during a blowdown cycle time period, for each two step coke burning means;

for each two step coke burning means, each compression cycle time period is followed by a blowdown cycle time period, and each blowdown cycle time period is followed by a compression cycle time period;

said cycle timer and control means are driven by said crankshaft of said air compression means, and is timed relative to said cranks on said crankshaft;

an expander engine for producing a useful work output, by the expansion of the fully reacted gas, from each final reactor of each two step coke burning means, during each blowdown cycle time interval, with pressure decreasing, while fully reacted gas flows through said expander engine, from maximum pressure at start of each blowdown cycle time interval, down to atmospheric pressure at expander engine exhaust, when the fully reacted gas flows out of the engine and into the atmosphere;

wherein a primary air is compressed into the coke reactor of each two step coke burning means to react therein by a primary reaction with carbonaceous fuel chunks, and form a primary reacted gas during each compression cycle time interval;

and further wherein said primary reacted gas is mixed with secondary air from said secondary air chamber and is ignited and reacts therewith, by a secondary reaction, in said final reactor chamber to form fully reacted gas during each blowdown cycle time interval; and, further wherein said fully reacted gas flows out of said final reactor, and through said expander engine, and into the atmosphere, while generating a useful work output from said expander engine during each blowdown cycle time interval.

2. The coke burning engine as described in claim 1, and further comprising cooling means for reducing the temperature of the fully reacted gas, leaving each said final reactor during each blowdown cycle; wherein said cooling means comprise a source of cooling fluid;

cooling fluid delivery means for transferring cooling fluid from said source, and mixing said transferred cooling fluid into said fully reacted gases as these gases flow out of said final reactor into said expander engine, during each blowdown cycle time interval, of each two step coke burning means; and, wherein said cooling fluid is selected from the group of cooling fluids consisting of, liquid water, compressed air, steam.

3. The coke burning engine, as described in claim 2, wherein said igniter means for igniting fuel air mixtures, in said final reactor chamber, comprises a compression ignition igniter means, said compression ignition igniter means comprising:

a source of high cetane number liquid igniter fuel;

an igniter fuel common rail;

an igniter fuel high pressure pump for transferring liquid igniter fuel from said source of igniter fuel into said igniter fuel common rail at high pressure;

a number of igniter fuel spray nozzles, equal to said number of two step coke burning means, and each said two step coke burning means being equipped with one said igniter fuel spray nozzle, installed in said final reactor chamber, of said coke burning unit so that igniter fuel, delivered at high pressure to said igniter fuel spray nozzle will be sprayed into fuel air mixture passing into said final reactor chamber;

each said igniter fuel spray nozzle being connected to said igniter fuel common rail via an igniter fuel blowdown cycle valve opened and closed by said cycle timer and control means, so that said igniter means blowdown cycle valve, is opened during all blowdown cycle time intervals, and is closed during all compression cycle time intervals;

wherein high cetane igniter fuel is sprayed into a large number of separate igniter fuel droplets, which compression ignite when within the fuel air mixture entering the final reactor chamber at high temperature and pressure; and, further wherein the fuel air mixture entering said final reactor is thusly ignited at many separate regions throughout the mixture, and is rapidly burned to fully reacted gas.

4. The coke burning engine as described in claim 3, and further comprising starter fuel driver and preheater means for driving said air compression means, and for preheating the air being compressed by said air compression means, during engine starting, said starter fuel driver and preheater means comprising:

a source of liquid starter fuel at high pressure;

a number of starter fuel spray nozzles, equal to said number of two step coke burning units, and each said two step coke burning unit being equipped with one said starter fuel spray nozzle installed in said final reactor chamber of said coke burning unit, so that starter fuel, delivered at high pressure to said starter fuel spray nozzle, will be sprayed into gases passing into said final reactor chamber;

each said starter fuel spray nozzle being connected to said starter fuel source via a starter fuel blowdown cycle valve with drive means for opening said valve, during each blowdown cycle time interval, when said engine is to be started, and for closing said starter fuel blowdown cycle valve when said coke burning engine is running;

wherein said igniter means for igniting fuel air mixtures within said final reactor chamber additionally comprises electric spark igniter means for generating an electric spark across the starter fuel spray from said starter fuel spray nozzle, said electric spark igniter means comprising spark igniter switch means for turning on said electric spark igniter means, when said coke burning engine is to be started, and for turning off said electric spark igniter means when said coke burning engine is running;

wherein, during each blowdown cycle time interval, starter fuel is sprayed into that compressed air, previously compressed by the air compression means into the coke reactor and the secondary air chamber, and flowing into the final reactor during each blowdown cycle time period, and this starter fuel spray in compressed air is ignited by said electric spark igniter means and burned to combustion products which releases the energy of this reaction into a final burned gases; and, further wherein said final burned gases expand through said expander engine, and at least a portion of the resulting expander useful work output is used to drive said air compression means during the starting of said coke burning engine; and, further comprising starting heat exchanger means for transferring heat, from said fully burned gases leaving said expander engine, into said intake air entering each said first low pressure stage of each piston and cylinder air compressor means of said air compression means, only during engine starting, wherein the air being compressed into said coke reactor is preheated prior to compression, during engine starting, and in turn preheats said carbonaceous fuel chunks within said coke reactor up to their rapid reaction temperature, after which the coke burning engine is started and can run itself;

wherein the flow of said fully burned gases leaving said expander engine is diverted away from said starting heat exchanger means after the engine is started;

wherein said liquid starter fuel is selected from the group of liquid fuels consisting of, a liquid hydrocarbon fuel, said igniter fuel.

5. The coke burning engine as described in claim 4, wherein said expander engine is a turbine expander engine comprising:

a number of turbine inlet nozzles equal to the number of two step coke burning units, and each said turbine inlet nozzle being connected to but one two step coke burning unit via a turbine inlet blowdown cycle valve, and each said turbine inlet nozzle comprising a minimum area nozzle throat;

a set of radial rotating turbine blades, on one or more turbine discs connected to a turbine power output shaft, said turbine power output shaft being connected to a turbine driven power absorbing means;

wherein each turbine inlet nozzle is aligned relative to said radial rotating turbine blades, so that gases expanded to a high velocity while flowing through said turbine inlet nozzle, during each blowdown cycle time interval, are directed to flow across a surface of said radial rotating turbine blades and create a force upon said radial rotating blades and produce a work thereon;

a turbine exhaust pipe to discharge gases, leaving said radial rotating turbine blades, into the atmosphere.

6. The coke burning engine, as described in claim 5, and further comprising: coke burning engine power output control means for controlling the revolutions per minute of the crankshaft of said air compression means, by controlling the power input to said drive means for rotating said air compressor crankshaft;

and further comprising: turbine inlet nozzle throat area control means for controlling a throat area of (each said) a turbine inlet nozzle, of said turbine expander engine; said turbine inlet nozzle control means being responsive to a sensor of air compression means crankshaft revolutions per minutes, and being operative to increase the throat area of each said turbine inlet nozzle when air compression means crankshaft revolutions per minute are increased, and to decrease the throat area of each said turbine inlet nozzle when air compression crankshaft revolutions per minute are decreased.

7. The coke burning engine as described in claim 5, wherein said crankshaft of said air compression means is driven by gears from said turbine expander engine power output shaft, and further comprising engine torque control means for adjusting a primary air quantity, which is compressed into each coke reactor during each compression cycle time interval, so that engine power output torque can be controlled, said engine torque control means comprising:

air compressor volumetric efficiency adjustment means for adjusting the volumetric efficiency of each piston and cylinder air compressor of said air compression means; and, turbine inlet nozzle throat area adjustment means for adjusting the throat area of each turbine inlet nozzle, so that the ratio of turbine inlet nozzle throat area to air compressor means volumetric efficiency can be kept essentially constant;

each said compressor volumetric efficiency adjustment means comprising, a piston sealably moveable within a cylinder, with an adjustable volume enclosed between the piston and cylinder being connected only to a fixed clearance volume of one stage of a piston and cylinder air compressor, and each stage of the piston and cylinder air compressors being thusly equipped with one compressor volumetric efficiency adjustment means;

wherein the primary air quantity compressed into each coke reactor, during each compression cycle time interval, can be adjusted by adjusting the volumetric efficiency of the air compression means, and a coke quantity reacted as well as the energy of reaction of this reduced air quantity are thusly adjusted, and in turn adjust the torque on the engine power output shaft;

said turbine inlet nozzle throat area adjustment means being responsive to a sensor of peak pressure in said two step coke burning unit, at the end of each compression cycle time interval, and being operative to increase the turbine inlet nozzle throat area whenever said peak pressure rises above a set maximum value, and to decrease the turbine inlet nozzle throat area whenever said peak pressure drops below a set minimum value;

wherein, as the primary air quantity compressed into each primary reactor, during each compression cycle time interval, is adjusted by adjusting the volumetric efficiency of the air compression efficiency of the air compression means, a corresponding adjustment of the connected turbine inlet nozzle throat area can be made, so that the consequently adjusted quantity of fully reacted and cooled gases can be blowndown starting from an essentially constant maximum pressure at the end of each compression cycle time interval.

8. The coke burning engine as described in claim 4 wherein said expander engine comprises at least one piston expander engine, each piston expander engine comprising:

an expander piston sealably reciprocal within an expander cylinder, and connected by a connecting rod to a crank on a common engine power output crankshaft; said expander cylinder comprising a closed end, opposite the crankshaft, and said closed end comprising a gas inlet port connected to said expander inlet blowdown cycle valve, and an exhaust gas port containing an expander exhaust valve, for discharging gas to the atmosphere;

wherein said expander piston carries out an exhaust stroke, when moving toward said closed end of said expander cylinder, and carries out an expansion stroke when moving away from said closed end of said expander cylinder;

wherein the number of said piston expander engines equals the number of two step coke burning means, and each piston expander engine is connected to but one two step coke burning means via the expander inlet blowdown cycle valve thereof, and each two step coke burning means is thusly connected to but one piston expander engine;

wherein said common engine power output crankshaft is also the drive means for driving said air compressor crankshaft at a fixed multiple of an RPM of said common engine power output crankshaft;

and further wherein the cranks, on said common engine power output crankshaft, are angularly positioned, relative to the cranks on said air compressor crankshaft, so that, for each piston expander engine, the expander piston is starting an expansion stroke whenever the connected two step coke burning unit is starting the blowdown cycle time interval, and is starting an exhaust stroke whenever the connected two step coke burning means is starting a compression cycle time interval;

and further comprising a blowdown cycle timer and control means for opening and closing said expander inlet blowdown cycle valve, and said expander exhaust valve, so that said expander inlet blowdown cycle valve is opened at the start of each expander piston expansion stroke, and is closed no later than the end of that same expander piston expansion stroke, and further so that said expander exhaust valve is opened no later than the end of each expander piston expansion stroke, and is closed no later than the end of the next following expander piston exhaust stroke and prior to said end of said expander piston exhaust stroke;

wherein, during each blowdown time interval, fully reacted and cooled gases flow out of each two step coke burning unit, into the piston and cylinder expander engine, and the pressure of these gases acts upon the moving expander piston, during each piston expander stroke, to create a work quantity, and a portion of this work quantity is used to drive the air compression means, the remainder of the work quantity being a useful work output for driving a pump, or an electric generator, or a vehicle; and, further wherein, during each expander piston exhaust stroke, the fully reacted and cooled and expanded gases are discharged to the atmosphere via the expander exhaust valve; and, preferably wherein said expander exhaust valve is closed sufficiently prior to the end of each expander piston exhaust stroke, that the gases thus remaining inside the expander cylinder are recompressed to essentially maximum compression cycle pressure, when said expander inlet blowdown cycle valve is next opened, at the start of the next following expander piston expansion stroke.

9. The coke burning engine as described in claim 8, further comprising engine torque control means for adjusting the primary air quantity, compressed into each said coke reactor, during each compression cycle time interval, so that an engine torque can be controlled, said engine torque control means comprising:

air compressor volumetric efficiency adjustment means for adjusting a volumetric efficiency of each piston and cylinder air compressor of said air compression means;

and blowdown angular duration adjustment means for adjusting an engine crankshaft angular duration of each blowdown cycle of each two step coke burning means; each said compressor volumetric efficiency adjustment means comprising:

a piston sealably moveable within a cylinder, with the adjustable volume enclosed between the piston and cylinder being connected only to the fixed clearance volume of one stage of a piston and cylinder air compressor, and each stage of all piston and cylinder air compressors being thusly equipped with one compressor volumetric efficiency adjustment means;

wherein the primary air quantity compressed into each coke reactor, during each compression cycle time interval, can be adjusted by adjusting the volumetric efficiency of the air compression means, and the coke quantity reacted as well as the energy of reaction of this reduced air quantity are thusly adjusted, and in turn adjust the torque on the engine power output shaft;

each said blowdown angular duration adjustment means comprising a dual cam opener and closer of said expander inlet blowdown cycle valve, said dual cam opener and closer comprising:

a valve opener cam, driven by said common engine crankshaft, and timed to open said expander inlet blowdown cycle valve whenever said engine piston reaches top dead center at the end of each exhaust stroke;

a valve closer cam, also driven by said common engine crankshaft via an adjustable timing drive, to close said expander inlet blowdown cycle valve an adjustable crank angle interval following each opening of said expander inlet blowdown cycle valve by said valve opener cam;

wherein, as the primary air quantity compressed into each primary reactor, during each compression cycle time interval, is adjusted by adjusting the volumetric efficiency of the air compression means, a corresponding adjustment of the angular duration of the following blowdown cycle can be made, so that the consequently adjusted quantity of fully reacted and cooled gases can be blowndown starting from an essentially constant maximum pressure at the end of each compression cycle time interval.

10. The coke burning engine as described in claim 2, wherein said igniter means for igniting fuel air mixtures within said final reactor chambers comprises spark igniter means with energizer means for energizing said spark igniter during each blowdown cycle time interval;

and further comprising startup primary air heater means for preheating the primary air while being compressed into each coke reactor, during each compression cycle time interval, in order to preheat carbonaceous fuel chunks in each coke reactor up to their rapid reaction temperature during engine starting, said startup primary air preheater means being operative only during engine starting until the engine can run itself, and further comprising a source of energy for driving said air compressor during engine starting;

wherein said startup primary air heater means is one selected from the group: electric heaters with electric energy source and on off energy switch; starting fuel in primary air burners and igniters for burning starting fuel in primary air and on off fuel valve and igniter switch.

11. The coke burning engine as described in claim 10, wherein said expander engine is a turbine expander engine comprising:

a number of turbine inlet nozzles equal to the number of two step coke burning units, and each said turbine inlet nozzle being connected to but one two step coke burning means via a turbine inlet blowdown cycle valve, and each said turbine inlet nozzle comprising a minimum area nozzle throat;

a set of radial rotating turbine blades, on one or more turbine discs connected to a turbine power output shaft, said turbine power output shaft being connected to a turbine driven power absorbing means;

wherein each turbine inlet nozzle is aligned relative to said radial rotating turbine blades, so that gases expanded to a high velocity while flowing through said turbine inlet nozzle, during each blowdown cycle time interval, are directed to flow across the surface of said radial rotating turbine blades and create a force upon said radial rotating blades and produce a work thereon;

a turbine exhaust pipe to discharge gases, leaving said radial rotating turbine blades, into the atmosphere.

12. The coke burning engine, as described in claim 11, and further comprising: coke burning engine power output control means for controlling the revolutions per minute of the crankshaft of said air compression means, by controlling the power input to said drive means for rotating said air compressor crankshaft;

and further comprising: turbine inlet nozzle throat area control means for controlling the throat area of each said turbine inlet nozzle, of said turbine expander engine; said turbine inlet nozzle control means being responsive to a sensor of air compression means crankshaft revolutions per minutes, and being operative to increase the throat area of each said turbine inlet nozzle when air compression means crankshaft revolutions per minute are increased, and to decrease the throat area of each said turbine inlet nozzle when air compression crankshaft revolutions per minute are decreased.

13. The coke burning engine as described in claim 11, wherein said crankshaft of said air compression means is driven by gears from said turbine expander engine power output shaft, and further comprising engine torque control means for adjusting the primary air quantity, compressed into each coke reactor during each compression cycle time interval, so that engine power output torque can be controlled, said engine torque control means comprising:

air compressor volumetric efficiency adjustment means for adjusting the volumetric efficiency of each piston and cylinder air compressor of said air compression means;

and, turbine inlet nozzle throat area adjustment means for adjusting the throat area of each turbine inlet nozzle, so that the ratio of turbine inlet nozzle throat area to air compressor means volumetric efficiency can be kept essentially constant;

each said compressor volumetric efficiency adjustment means comprising a piston sealably moveable within a cylinder, with the adjustable volume enclosed between the piston and cylinder being connected only to the fixed clearance volume of one stage of the piston and cylinder air compressor, and each stage of all piston and cylinder air compressors being thusly equipped with one compressor volumetric efficiency adjustment means;

wherein the primary air quantity compressed into each coke reactor, during each compression cycle time interval, can be adjusted by adjusting the volumetric efficiency of the air compression means, and the coke quantity reacted as well as the energy of reaction of this reduced air quantity are thusly adjusted, and in turn adjust the torque on the engine power output shaft;

said turbine inlet nozzle throat area adjustment means being responsive to a sensor of peak pressure in said two step coke burning means, at the end of each compression cycle time interval, and being operative to increase the turbine inlet nozzle throat area whenever said peak pressure rises above a set maximum value, and to decrease the turbine inlet nozzle throat area whenever said peak pressure drops below the set minimum value;

wherein, as the primary air quantity compressed into each primary reactor, during each compression cycle time interval, is adjusted by adjusting the volumetric efficiency of the air compression means, a corresponding adjustment of the connected turbine inlet nozzle throat area can be made, so that the consequently adjusted quantity of fully reacted and cooled gases can be blowndown starting from an essentially constant maximum pressure at the end of each compression cycle time interval.

14. The coke burning engine as described in claim 10 wherein said expander engine comprises at least one piston expander engine, each piston expander engine comprising:

an expander piston sealably reciprocal within an expander cylinder, and connected by a connecting rod to a crank on a common engine power output crankshaft;

said expander cylinder comprising a closed end, opposite the crankshaft, and said closed end comprising a gas inlet port connected to said expander inlet blowdown cycle valve, and an exhaust gas port containing an expander exhaust valve, for discharging gas to the atmosphere;

wherein said expander piston carries out an exhaust stroke, when moving toward said closed end of said expander cylinder, and carries out an expansion stroke when moving away from said closed end of said expander cylinder;

wherein the number of said piston expander engines equals the number of two step coke burning means, and each piston expander engine is connected to but one two step coke burning means via the expander inlet blowdown cycle valve thereof, and each two step coke burning means is thusly connected to but one piston expander engine;

wherein said common engine power output crankshaft is also the drive means for driving said air compressor crankshaft at a fixed multiple of the RRPM of said common engine power output crankshaft;

and further wherein the cranks, on said common engine power output crankshaft, are angularly positioned, relative to the cranks on said air compressor crankshaft, so that, for each piston expander engine, the expander piston is starting an expansion stroke whenever the connected two step coke burning means is starting a blowdown cycle time interval, and is starting an exhaust stroke whenever the connected two step coke burning means is starting a compression cycle time interval;

and further comprising a blowdown cycle timer and control means for opening and closing said expander inlet blowdown cycle valve, and said expander exhaust valve, so that said expander inlet blowdown cycle valve is opened at the start of each expander piston expansion stroke, and is closed no later than the end of that same expander piston expansion stroke, and further so that said expander exhaust valve is opened no later than the end of each expander piston expansion stroke, and is closed no later than the end of the next following expander piston exhaust stroke and preferably somewhat prior to said end of said expander piston exhaust stroke;

wherein, during each blowdown time interval, fully reacted and cooled gases flow out of each two step coke burning means, into the piston and cylinder expander engine, and the pressure of these gases acts upon the moving expander piston, during each piston expander stroke, to create a work quantity, and a portion of this work quantity is used to drive the air compression means, the remainder of the work quantity being a useful work output for driving a pump, or an electric generator, or a vehicle;

and further wherein, during each expander piston exhaust stroke, the fully reacted and cooled and expanded gases are discharged to the atmosphere via the expander exhaust valve;

and preferably wherein said expander exhaust valve is closed sufficiently prior to the end of each expander piston exhaust stroke, that the gases thus remaining inside the expander cylinder are recompressed to essentially maximum compression cycle pressure, when said expander inlet blowdown cycle valve is next opened, at the start of the next following expander piston expansion stroke.

15. The coke burning engine as described in claim 14, and further comprising engine torque control means for adjusting the primary air quantity, compressed into each coke reactor, during each compression cycle time interval, so that engine torque can be controlled, said engine torque control means comprising:

air compressor volumetric efficiency adjustment means for adjusting the volumetric efficiency of each piston and cylinder air compressor of said air compression means;

and blowdown angular duration adjustment means for adjusting the engine crankshaft angular duration of each blowdown cycle of each two step coke burning means;

each said compressor volumetric efficiency adjustment means comprising, a piston sealably moveable within a cylinder, with the adjustable volume enclosed between the piston and cylinder being connected only to the fixed clearance volume of one stage of a piston and cylinder air compressor, and each stage of all piston and cylinder air compressors being thusly equipped with one compressor volumetric efficiency adjustment means;

wherein the primary air quantity compressed into each coke reactor, during each compression cycle time interval, can be adjusted by adjusting the volumetric efficiency of the air compression means, and the coke quantity reacted as well as the energy of reaction of this reduced air quantity are thusly adjusted, and in turn adjust the torque on the engine power output shaft;

each said blowdown angular duration adjustment means comprising a dual cam opener and closer of said expander inlet blowdown cycle valve, said dual cam opener and closer comprising:

a valve opener cam, driven by said common engine crankshaft, and timed to open said expander inlet blowdown cycle valve whenever said engine piston reaches top dead center at the end of each exhaust stroke;

a valve closer cam, also driven by said common engine crankshaft via an adjustable timing drive, to close said expander inlet blowdown cycle valve an adjustable crank angle interval following each opening of said expander inlet blowdown cycle valve by said valve opener cam;

wherein, as the primary air quantity compressed into each primary reactor, during each compression cycle time interval, is adjusted by adjusting the volumetric efficiency of the air compression means, a corresponding adjustment of the angular duration of the following blowdown cycle can be made, so that the consequently adjusted quantity of fully reacted and cooled gases can be blowdown starting from an essentially constant maximum pressure at the end of each compression cycle time interval.

\* \* \* \* \*